(12) United States Patent
Muhanna et al.

(10) Patent No.: US 9,131,330 B2
(45) Date of Patent: Sep. 8, 2015

(54) M2M SERVICES ENABLEMENT ARCHITECTURE FOR CELLULAR ACCESS NETWORKS

(75) Inventors: Ahmad Muhanna, Richardson, TX (US); George Foti, Dollard des Ormeaux (CA); Rikard Eriksson, Jörlanda (SE); Octavio Jose De Franca Lima, The Colony, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 532 days.

(21) Appl. No.: 13/517,790

(22) Filed: Jun. 14, 2012

(65) Prior Publication Data

US 2013/0017827 A1 Jan. 17, 2013

Related U.S. Application Data

(60) Provisional application No. 61/508,243, filed on Jul. 15, 2011, provisional application No. 61/510,301, filed on Jul. 21, 2011.

(51) Int. Cl.
*H04W 4/00* (2009.01)
*H04W 84/02* (2009.01)
*H04W 80/04* (2009.01)
*H04W 84/18* (2009.01)

(52) U.S. Cl.
CPC .............. *H04W 4/005* (2013.01); *H04W 80/04* (2013.01); *H04W 84/18* (2013.01)

(58) Field of Classification Search
USPC .............. 455/426.1, 435.1, 466, 411; 370/229
See application file for complete search history.

(56) References Cited

U.S. PATENT DOCUMENTS

2009/0217348 A1* 8/2009 Salmela et al. .................... 726/2
2013/0188515 A1* 7/2013 Pinheiro et al. ............... 370/254

FOREIGN PATENT DOCUMENTS

WO    WO 2011/082150 A1    7/2011

OTHER PUBLICATIONS

Paul L. Russell, Jr., Addressing Unique M2M Challenges with Converged Gateways, Oct. 19-20, 2010, ETSI TC M2M Workshop, pp. 1-20.*
Ericsson, St-Ericsson. Mapping Aspects for ETSI M2M Architecture. 3GPP TSG SA WG2 Meeting #85. TD S2-112291. May 16-20, 2011.
Machine-to-Machine Communications (M2M); Functional Architecture. Draft ETSI TS 102 690 v0.12.3 (Jun. 2011).
(Continued)

*Primary Examiner* — Omar Ghowrwal

(57) ABSTRACT

A Machine-to-Machine (M2M) services enablement architecture for a cellular Access Network (AN) that allows the cellular AN operator to not only deploy its M2M Services Capabilities (SC) as an M2M SC Server within its network domain, but to also use its M2M SC to work as an M2M SC Proxy when communicating with an M2M Service Provider (SP) network that also deploys an M2M SC Server. The M2M SC Proxy in the cellular AN relays all signaling plane communications between an M2M device's/gateway's SC and the SP's M2M SC Server. The M2M SC Proxy provides the cellular AN with an access to all of the Across-Layers (Transport and Service Layers) information needed for the M2M services enablement in the cellular AN. This proxy-based solution allows the cellular AN to serve all types of M2M SPs, and relieves the M2M SP from the need to support different cellular AN interworking interfaces.

11 Claims, 15 Drawing Sheets

(56) References Cited

OTHER PUBLICATIONS

Muhanna, et at. Proposal: 3GPP2 Supporting ETSI M2M Architecture. 3GPP2, Mar. 29, 2011.

Russell, Paul L., Jr.; InterDigital; "Addressing Unique M2M Challenges with Converged Gateways," ETSI TC M2M Workshop, Oct. 19-20, 2010, Sophia Antipolis, France.

ETSI TS 102 690 V1.1.1.; Machine-to-Machine communications (M2M); Functional architecture; Oct. 2011, Sophia Antipolis, France.

3GPP2 X.P0067-0; 3rd Generation Partnership Project 2, Machine to Machine (M2M) Architecture and Enhancements Study for cdma2000 Networks; Jun. 13, 2012.

3GPP TR 23.888 V1.3.0; 3rd Generation Partnership Project; Technical Specification Group Services and System Aspects; System Improvements for Machine-Type Communications; (Release 11); Sophia Antipolis, France.

Liu, et al., "Current and Future Trends in Hybrid Cellular and Sensor Networks," Huawei Technologies Co., Ltd.; ETSI TC M2M Workshop; Oct. 19-20, 2010, Sophia Antipolis, France.

\* cited by examiner

M2M SERVICES ENABLEMENT ARCHITECTURE FOR CELLULAR ACCESS NETWORKS

CROSS-REFERENCE TO RELATED APPLICATIONS

This application claims the priority benefit under 35 U.S.C. §119(e) of U.S. Provisional Application No. 61/508,243 filed on Jul. 15, 2011, and U.S. Provisional Application No. 61/510,301, filed on Jul. 21, 2011, the disclosures of both which are incorporated herein by reference in their entireties. This application is related to co-pending, commonly-assigned U.S. patent application titled "Dynamic M2M Services Enablement Solution Over 3GPP Access Networks" having Ser. No. 13/517,733.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not applicable

TECHNICAL FIELD

The present disclosure relates to Machine-to-Machine (M2M) communications. More particularly, and not by way of limitation, particular embodiments of the present disclosure are directed to a system and method that allows a cellular Access Network (AN) to be used to enable an access-agnostic M2M Services Architecture that supports provision of M2M Services by an M2M Service Provider (SP).

BACKGROUND

Machine to Machine (M2M) communications involve the communication (using wired or wireless means, or a combination of both) between two machines without human intervention. It is noted here that the term "M2M communication" is also referred to as "Machine Type Communication (MTC)" in certain literature. However, for the sake of consistency, only the term "M2M communication" is used in the discussion herein. Some examples of M2M communications are: smart metering (e.g., remote reading of a utility meter), healthcare monitoring (e.g., remote monitoring of a patient's heart rate), agricultural monitoring (e.g., monitoring of a crop condition), fleet management tracking (e.g., monitoring current status of trucks on road), security surveillance (e.g., automatic, real-time monitoring of a building or complex), billing transactions, inventory management (e.g., through monitoring of Point of Sale (POS) transactions in a supermarket) etc. These M2M communications typically use M2M communications-capable sensors or diagnostic devices (which may perform the metering, monitoring, etc., mentioned earlier) on one end and an M2M user device or receiver on the other end to receive data (e.g., wirelessly via a cellular Access Network as discussed below with reference to FIG. 1) from the sensor devices and process the data as per desired M2M service (e.g., utility metering service, healthcare monitoring service, billing preparation service, etc.).

All of the too many different M2M services use certain common M2M Services Capabilities (SC) such as SCs related to routing, security, allocation of respective resources, discovery and reachability of other entities in the cloud (e.g., a carrier network), etc. These M2M Services Capabilities are usually used by all different M2M services (e.g., on M2M user devices, in an M2M Service Provider (SP) network, etc.) while communicating with the M2M Application(s) Server (AS) in the M2M Service Provider (SP) network.

In general, the M2M communications also may be referred to as M2M services that are bound to a "Service Layer," while a cellular Access Network (AN) (which is discussed in more detail below) may provide a "Transport Layer" for the M2M communications to take place. In order for any M2M services enablement architecture to work in a very flexible way and with the ability to offer the M2M services freely and independently of the access network operator, it may be preferable for any such M2M services enablement architecture to rely on the separation between the Transport (AN-based) and the Service (SP network-based) Layers. With this preference in mind, a European Telecommunications Standards Institute M2M Technical Committee (ETSI M2M TC) has been working on defining an M2M Service Layer (SL) Architecture that comprises the following main principles:

(I) Overall Aspects:
(a) An M2M service enablement architecture that is access agnostic (i.e., significantly independent of underlying cellular AN technology). (b) Loosely coupled architecture between the transport and the service layers. (c) No M2M service changes required when moving from one Access Network to another. (d) Simultaneous access to the same M2M Service Layer from different Access Networks.

(II) Access and Device Aspects:
An M2M service enablement architecture that supports the following types of devices: (a) A Direct Access M2M Device that supports direct access to a cellular network. (b) An M2M Gateway that supports the cellular network access with Indirect Access M2M Devices (discussed below) connected to it. This gateway may work as a concentrator (e.g., of data received from multiple Indirect Access devices connected thereto). (c) An Indirect Access M2M Device that is connected to an M2M Gateway and that does not support direct access to a cellular network.

(III) Network Aspects:
An M2M service enablement architecture that makes use of the following: (a) Transport and Service Layers separation (as much as possible). (b) M2M services can be offered independent of specific access network operator. (c) Common M2M Services Capabilities (SC) are defined to be used by all M2M applications. This common M2M SC could be deployed separate from the M2M specific Application(s) Server (AS).

FIG. 1 illustrates an existing M2M services enablement architecture 10 using a cellular Access Network 12. The architecture 10 in FIG. 1 shows a cellular AN 12 connecting to an M2M Service Provider (SP) network 14 while taking into account the above-mentioned three principles defined by ETSI M2M TC. For the sake of convenience and ease of discussion, the terms "Access Network" or "Transport Network" may be used herein to include not only a Radio Access Network (RAN) portion (comprising, for example, a base station with or without a base station controller) of a cellular carrier network, but other portions (e.g., cellular backhaul and core network) as well. Similarly, the terms "M2M Service Provider" or "M2M SP" and "M2M SP network" may be used interchangeably herein to refer to the M2M SP network 14 (and similar other networks shown in other figures herein and discussed below). It may be possible that the M2M service provider is also the operator or provider of the cellular AN 12.

On the other hand, the M2M SP may be independent of the cellular AN provider, but may have a business relationship with the cellular network operator for interoperability purposes.

As shown in FIG. 1, the cellular AN 12 may include multiple cell sites 16-18, each under the radio coverage of a respective base station (BS) or base transceiver station (BTS) 20-22. These base stations 20-22 may receive wireless communication (as indicated by exemplary radio links 23A-23C) from various M2M communication entities 24-32 (discussed in detail below with reference to FIG. 2) operating in an M2M device domain 34, and forward the received communication to an M2M core portion 36 of the cellular network 12. The M2M core 36 may include a cellular backhaul portion 38 and a cellular Core Network (CN) 40. In case of a Third Generation (3G) base station 20-22, for example, the cellular backhaul 38 may include functionalities of a 3G Radio Network Controller (RNC) or Base Station Controller (BSC). Portions of the backhaul 38 (such as, for example, BSC's or RNC's) together with base stations 20-22 may be considered to comprise the RAN portion of the network 12. Examples of such RANs include Universal Terrestrial Radio Access Networks (UTRAN), Evolved-UTRAN (E-UTRAN), GSM/EDGE RAN (GERAN) where "GSM" refers to Global System for Mobile communications and "EDGE" refers to Enhanced Data Rate for GSM Evolution systems, Worldwide Interoperability for Microwave Access (WIMAX) systems based on Institute of Electrical and Electronics Engineers (IEEE) standard IEEE 802.16e, etc. The Core Network (CN) 40, on the other hand, may provide logical, service, and control functions (e.g., subscriber account management, billing, subscriber mobility management, etc.), Internet Protocol (IP) connectivity and interconnection to other networks (e.g., the Internet) or entities, roaming support, etc. The CN 40 may be, for example, a Third Generation Partnership Project (3GPP) CN, a Third Generation Partnership Project 2 (3GPP2) CN (for Code Division Multiple Access (CDMA) based cellular systems), or an ETSI TISPAN (TIPHON (Telecommunications and Internet Protocol Harmonization over Networks) and SPAN (Services and Protocols for Advanced Networks)) CN.

As mentioned earlier, ETSI's proposed M2M services enablement architecture (such as the architecture 10 in FIG. 1) relies on a common M2M SC enablement application 42 (e.g., related to routing, security, etc.) that is defined to be used by all M2M applications. This M2M SC enablement application, referred to herein as simply the M2M SC, may provide M2M functions that can be shared by different M2M applications (whether residing on an M2M AS 44 or on an M2M communication entity 50 shown in FIG. 2 and discussed later below), and expose these functions through a set of open interfaces (not shown). The M2M SC 42 may utilize Core Network functionalities, while simplifying and optimizing M2M application development and deployment through hiding of network specificities. Various M2M applications provide program code, which, upon execution by respective M2M communication entities or user device, may provide application-specific M2M services such as the smart metering service, the healthcare monitoring service, etc., discussed earlier. Relevant portions of the M2M SC 42 may reside on each M2M communication entity (as shown, for example, in FIG. 2) as well as on the M2M user device 44. Thus, an M2M application (e.g., the M2M application 52 in FIG. 2) may run the service logic (not shown) and use corresponding M2M SC (e.g., the M2M SC 54 in FIG. 2) accessible via an open interface to facilitate provision of an M2M service supported by the M2M SP 14. The M2M SC 42 may interact with an M2M Application(s) Server (AS) 46 in the M2M SP 14 using an appropriate Application Programming Interface (API) (which may include a complete interface, a single function, or a set of application-specific APIs) to thereby facilitate provision of various M2M services associated with M2M applications supported by the M2M SP 14.

FIG. 1 also shows an M2M User 44 (which is also referred to herein as "M2M user device," and may also be referred to as "MTC User" in certain literature) in communication with the M2M AS 46. The M2M User 44 may be an MTC capable device that can communicate with various M2M communication entities 24-32 in the M2M device domain 34 and may even (remotely) control or operate them. For example, if an M2M communication entity is a building surveillance sensor or unit, the M2M User 44 in that case may be a remote data collection/processing unit that may instruct the surveillance sensor to transmit surveillance data thereto at predefined time intervals (so as, for example, not to overload cellular network resources or not to allow an M2M communication entity to randomly access M2M SC 42). The combination of M2M AS 46 and the M2M SC 42 may facilitate transfer of relevant application-specific data or other content between the M2M User 44 and respective M2M communication entity/entities in the M2M device domain 34.

FIG. 2 shows a logical block diagram of an existing M2M communication entity 50 that may operate from the M2M device domain 34. The M2M communication entity 50 may be a Direct Access M2M Device, an Indirect Access M2M Device, or an M2M Gateway mentioned earlier. For example, in the configuration in FIG. 1, each of the M2M communication entities 24-25 (e.g., fleet tracking or route management devices) may be a Direct Access M2M Device, whereas each of the M2M communication entities 27-32 may be Indirect Access M2M Devices (e.g., surveillance sensors in a building) communicating with an M2M Gateway 26 that may function as a concentrator of data received from various such Indirect Access M2M Devices. Some of the M2M communication entities 27-32 may be interconnected with one another, with other similar entities (not shown), or with one or more M2M Gateways (e.g., the M2M Gateway 26) via "local" M2M area networks 47-49, which could be IEEE 802.15.1, Bluetooth®, or other similar local networks. In certain cases, an M2M communication entity may even access the cellular network 12 via one or more such M2M area networks 47-49.

In the discussion below, the terms "M2M communication entity," "M2M entity," and "M2M Device" may be used interchangeably for ease of discussion. For example, depending on a given context, the term "M2M Device" may refer to an M2M Device (whether Direct Access or Indirect Access) or an M2M Gateway or both. However, if context dictates otherwise, a device and a gateway may be specified individually rather than through the common terms "M2M entity" or "M2M Device." Furthermore, it is noted here that the M2M communication entity or Device 50 may represent a User Equipment (UE) or Mobile Station (MS) (also known by various analogous terms such as "mobile handset," "wireless handset," "wireless device," "terminal," etc.) properly configured for M2M communications. Some examples of such mobile handsets/devices include cellular telephones or data transfer equipments (e.g., a Personal Digital Assistant (PDA) or a pager), smartphones (e.g., iPhone™, Android™, Blackberry™, etc.), computers, Bluetooth® devices, etc.

As shown in FIG. 2, the M2M entity or device 50 may include device-specific M2M Application (s) (or program code) 52 and device-specific M2M SC 54. Thus, the M2M Device 50 runs M2M Application(s) 52 using its own M2M SC 54 to provide M2M service(s) (e.g., to the M2M User 44)

for which it is designed or configured. In the discussion below, when the M2M communication entity 50 is an M2M Device (whether Direct Access or Indirect Access), such device-specific SC may be referred to "D-SC", and when the M2M entity 50 is an M2M Gateway, such device-specific SC may be referred to as "G-SC" so as to distinguish between SC's in M2M Devices and Gateways. A shortened version "D/G-SC" may be used in the discussion below to refer to both of these SC's together. The M2M Device 50 may be considered to support access to the cellular network 12 (e.g., 3GPP access) logically as if it were a combination of two logical M2M Devices—an M2M Access/Transport Device 56 and an M2M Service Device 58. (Although not specified herein or always mentioned below for the sake of brevity, it is understood that when the M2M entity 50 is an M2M Gateway, the reference numerals "56" and "58" may refer to an M2M Access/Transport Gateway and an M2M Service Gateway, respectively.) The M2M Access/Transport Device 56 may support all aspects of the 3GPP access air interface and the 3GPP access network. On the other hand, the M2M Service Device 58 may support all aspects that are related to the M2M Service Layer (SL). Such logical configuration may reflect the earlier-mentioned separation between Transport and Service Layers. Thus, for example, the M2M Access Device 56 may have a device identifier (for transport level access to the cellular network 12) that is different from the device identifier (that is used on the service level) for the M2M Service Device 58. Furthermore, the M2M Service Device 58 may include an M2M Application Identifier (not shown) and an M2M Service Subscription Identifier (not shown) to perform Service Layer operations, whereas the M2M Transport Device 56 may include M2M access network Subscription Identifier (not shown) and an M2M access network address (not shown) to support access interface with the cellular access network 12 using the Transport Layer. Thus, in case of an M2M application, one portion of the application may reside on the M2M AS 46 whereas a corresponding portion may reside on the M2M entity 50 (as part of M2M Application (s) 52). In that regard, the M2M Service Device 58 may host the M2M entity-specific portion of the application, and use the M2M Access Device 56 to access the M2M AS 46 in the SP network 14 using the cellular network 12 for transport.

SUMMARY

It is observed from the above discussion that ETSI M2M TC is specifying an access agnostic M2M Service Layer (SL) architecture (i.e., the architecture shown in FIG. 1 and discussed in more detail in ETSI Technical Specification (TS) 102.69, titled "Machine-to-Machine communications (M2M); Functional architecture") so that an M2M SP can offer M2M services independent of the specific type of access network used by an M2M communication entity. In other words, the ETSI M2M SL architecture provides a standard at the Service Layer (SL) regardless of what the Transport/Access Layer is. However, currently, there is no enablement architecture as per ETSI TS 102.69 that clearly defines "merged" or "interworking" versions of (cellular) Transport Layer and (M2M) Service Layer architectures in such a manner as to allow the cellular AN to be used to enable a common M2M services architecture that is mainly in-line with the principles of ETSI M2M SL architecture (specified in above-mentioned ETSI TS 102.69), while simultaneously allowing the cellular AN to have the proper control over what its network is being used for. Here, the term "common" refers to the access-agnostic nature of such M2M SL architecture (i.e., a common SL architecture that can function with many different IP-based access networks such as, for example, 3GPP, 3GPP2, Long Term Evolution (LTE), Evolution-Data Optimized (EV-DO), Universal Mobile Telecommunications System (UMTS), Fixed Access Forum, General Packet Radio Service (GPRS), and CDMA 2000 1x networks).

On the other hand, even though 3GPP System Architecture Working Group 2 (SA2) has identified some aspects of the enablement of the M2M architecture in a 3GPP cellular access network (in AN-controlled or SP-controlled configurations), in that architecture, 3GPP SA2 has not identified how the different possible access networks and M2M Service Provider networks would work to enable a comprehensive solution that allows the cellular access network to be aware of the type of M2M services that are being offered on top of the access network transport. For example, 3GPP SA2 has not addressed the following cases:

(1) How a 3GPP access network, which deploys an M2M SC within the access operator's network, is able to interwork, serve, and communicate with an M2M Service Provider (SP) network that also deploys an M2M SC in its network.

(2) When an M2M Device roams into a Visited Access Network that deploys M2M SC, how the Home Access Network can be used to allow the Visited Access Network to route some M2M services directly to the M2M SP network while other M2M services are routed via the Home Access Network.

(3) How a 3GPP access network that deploys M2M SC in-line with ETSI M2M SL architecture is able to offer services to other M2M Service Providers that deploy a different M2M SL architecture (i.e., not in-line with ETSI M2M SL architecture). Such non-ETSI M2M SL architecture may be variously referred to herein as "M2M Service Layer Other" or "M2M Services Other" or "M2M SL Other" or "M2M SL-OTH."

(4) How a 3GPP access network, regardless of where the M2M SC is deployed, is able to allow its transport services to be used by M2M services when the access network does not have a Service Level Agreement (SLA) with the M2M SP.

(5) How a 3GPP access network that does not deploy M2M SC is able to interwork, serve, and communicate with an M2M SP network that also does not deploy an M2M SC in its network.

Like 3GPP SA2, 3GPP2 is also trying to specify (e.g., in 3GPP2 report X.P0067-0 titled "Machine-to-Machine Architecture and Enhancement Study for cdma2000 Networks") an M2M services enablement architecture that uses 3GPP2 access networks (CDMA-based) to offer M2M services in-line with ETSI M2M SL architecture and any other M2M SL architecture. However, 3GPP2's architecture also fails to address the above-mentioned cases (listed in the context of 3GPP SA2).

Another problem not covered in the existing solutions is how an M2M service provider can use multiple IP addresses to put forward its services. For example, an M2M SP that utilizes 3GPP, 3GPP2 and fixed IP accesses to support its services.

Currently, legacy M2M services solution that is used by 3GPP access networks is not clearly defined and does not follow a specific or well-defined M2M SL architecture (such as the M2M SL architecture defined by ETSI TS 102.69). Existing proprietary or operator-specific solutions do not use a common M2M SC concept. Rather, such solutions use a specific solution for each M2M application, which is the reason behind the whole industry's effort to identify a common (i.e., "generic" or access-agnostic) M2M SL architecture that can be used by any access network for all M2M applications.

It is therefore desirable to devise an interworking solution as to how to allow the cellular AN to be used to enable a common M2M services architecture that is mainly in-line with the principles of ETSI M2M SL architecture (e.g., separation of Transport and Service Layers, common M2M SC to be used by all M2M applications, etc., as discussed earlier), while simultaneously allowing the cellular AN operator to have the proper control over what its network is being used for. In other words, it is desirable to enable the cellular AN to offer its specific services (e.g., transport services) to any M2M Services while, at the same time, being able to enforce its Service Level Agreement (SLA), to collect proper billing information, to anticipate the needed capacity management for the M2M services that are being offered, etc.

Furthermore, for such common M2M services enablement architecture to be successfully used and adopted by different cellular accesses that support, for example, 3GPP access network architecture and Core Network (CN), it is also desirable to provide a detailed solution that identifies and addresses the following concerns of interworking across Service and Transport Layers.

(a) The ability of the 3GPP access network to be aware (preferably, dynamically) of the Across-Layers (A-Layers) M2M Device/Gateway Identifier (which may be the same as what is sometimes referred to as the M2M Device/Gateway "External Identifier" which is typically used by entities (e.g., an M2M SC server in the M2M SP network) that are external to the 3GPP network to identify an M2M Device/Gateway that is used for MTC within the 3GPP system). Such an "External" Identifier may be distinguished from an "Internal" Identifier, which is a subscription-related identifier used within the 3GPP system to uniquely identify an M2M communication entity used for MTC. This "Internal" Identifier may not be necessarily known by entities external to the 3GPP network. In the discussion herein, a parameter (e.g., a Device/Gateway Identifier) or information is considered to be "Across-Layers" or "A-Layers" parameter/information, when the parameter/information is needed for the enablement of M2M services by both the Transport and the Service Layers. For ease of discussion, the term "A-Layers M2M Device Identifier" may be occasionally used to refer to A-Layers identifier of an M2M device and/or gateway.

A dynamic solution is preferred because of its flexibility to accommodate changes to various needed parameters (e.g., A-Layers parameters) "on-the-fly" and in a cost-effective manner. On the other hand, if an M2M device/gateway is pre-configured (e.g., by its M2M Services Provider) with needed parameters, then it may be difficult to change such pre-configured devices/gateways in the field, for example, when their associated M2M Services Provider changes or its M2M subscription changes.

(b) The ability of the 3GPP access network to map the A-Layers M2M Device/Gateway Identifier to the 3GPP access subscription and 3GPP Access Subscription identifier.

(c) The ability of the 3GPP access network to correctly identify and map the IP traffic that is coming from different M2M SP networks towards the same M2M Access Device (e.g., the M2M Access Device 56 shown in FIG. 2).

(d) The ability of the 3GPP access network to correctly find the reachability of the M2M Service Device (e.g., the M2M Service Device 58 shown in FIG. 2) based on traffic that is being sent to a specific A-Layers M2M Device Identifier, a specific M2M D/G-SC, and/or a specific M2M application.

(e) The ability of the 3GPP access network to know the type of the M2M application that is running on top of the M2M Access Device used by the M2M Service Device. This may be desirable in order for the 3GPP access network to identify the proper Quality of Service (QoS) that is needed for the specific M2M application.

(f) The ability of the M2M SP network to send traffic to the specific M2M Service Device, M2M DIG-SC, and/or M2M application.

(g) The ability of the M2M SP network to be able to configure the M2M communication entity with the proper A-Layers M2M Device/Gateway Identifier during the first service initial attach to the SP network. A dynamic solution may be preferable as mentioned in sub-part (a) above. The solution should ensure that the A-Layers M2M D/G Identifier configured by the M2M SP network is also available to the 3GPP AN and unique within the 3GPP AN.

(h) The M2M SP network should be aware of the M2M Services Subscription that authorizes the M2M Service Device/Gateway to receive the identified M2M service.

(i) The ability of the solution to offer simultaneous access to the same M2M Services Subscription from different access networks, while having the proper identification and distinction of the different traffics coming over such different access networks.

Particular embodiments of the present disclosure provide a solution to the above-mentioned problem of devising a common M2M services enablement architecture (which is based on ETSI's principle of separation between the Service and Transport layers) by introducing the following aspects:

(I) The use of M2M Proxy. This approach allows the cellular AN operator to not only deploy its M2M SC as an M2M SC Server within its network domain, but to also use its M2M SC to work as an M2M SC Proxy when communicating with an M2M SP network that also deploys an M2M SC Server.

(II) Allow the visited cellular AN that deploys an M2M SC within its network to route M2M services directly to the M2M SP network (which may be home M2M SP or visited M2M SP). This is based on the home cellular AN policy that may reflect the M2M Transport subscription. It also could be based on the M2M SP network policy and/or the M2M Services subscription.

(III) Allow the cellular AN operator to offer M2M Services to M2M Services Providers that deploy an M2M SL architecture that is different from the ETSI SL architecture, by defining the needed Interworking Function (IWKF).

(IV) Allow the cellular AN provider to offer its transport and other services to any M2M SP network regardless of the SP network architecture with respect to M2M SC—i.e., whether M2M SC is deployed inside the SP network or not.

(V) Allow the cellular AN provider to offer its transport and other services to any M2M SP network whether the cellular AN operator has an existing SLA with the SP or not.

Particular embodiments of the present disclosure further provide an M2M Services Enablement Solution (MSES) that addresses how to use the above-mentioned common M2M services enablement architecture in the context of an exemplary 3GPP Access Network. This solution allows a 3GPP AN to offer a transport connection for M2M Devices over its 3GPP Evolved Packet Core (EPC) to M2M Device's perchoice M2M SP. The present disclosure's solution for M2M Services Enablement does not change the existing access network procedures for establishing a transport connection over the AN using its air interface. In other words, except for small enhancements, the transport layer connection establishment may continue to use the same procedures defined by the AN standards. In addition, such solution according to the present disclosure also provides a dynamic mechanism that allows configuration of the Across-Layers M2M Device/Gateway Identifier while the 3GPP AN, the M2M SP, and the M2M Device are fully aware of this A-Layers M2M D/G Identifier. Thus, particular embodiments of the present disclosure offer a common solution for the offering of M2M Services Enablement to any M2M Device that uses any cellular access which uses 3GPP EPC for providing a transport connection.

In one embodiment, the present disclosure is directed to a cellular Access Network (AN) operatively coupled to a Machine-to-Machine (M2M) Service Provider (SP), wherein the cellular AN comprises an M2M Services Capabilities (SC) deployed inside the cellular AN and configured to function as an M2M SC Proxy when the M2M SP deploys an M2M SC Server and no M2M SC Server is deployed in the cellular AN. The M2M SC Proxy is configured to act on behalf of the M2M SC Server in the M2M SP and to relay signaling plane communication between an entity-specific SC in an M2M communication entity and the M2M SC Server in the M2M SP, wherein the M2M communication entity is in wireless communication with the cellular AN and accesses the M2M SP via the cellular AN. The cellular AN also comprises an InterWorking Function (IWKF) configured to provide an interworking interface between the cellular AN and the M2M SP.

In another embodiment, the present disclosure is directed to an improvement in an M2M communication configuration that is based on (a) separation between a Transport Layer supported by a cellular AN and a Service Layer supported by an M2M SP and (b) usage of a common M2M SC for all M2M applications. The improvement comprises: deploying the M2M SC inside the cellular AN as an M2M SC Proxy when the M2M SP deploys an M2M SC Server and no M2M SC server is deployed in the cellular AN. The M2M SC Proxy is configured to act on behalf of the M2M SC Server in the SP and to relay signaling plane communication between an entity-specific SC in an M2M communication entity and the M2M SC Server in the M2M SP, wherein the M2M communication entity is in wireless communication with the cellular AN and accesses the M2M SP via the cellular AN. The improvement also comprises co-locating an IWKF within the M2M SC Proxy, wherein the IWKF is configured to provide an interworking interface between the cellular AN and the M2M SP.

In a further embodiment, the present disclosure is directed to a method of providing M2M communication using a cellular AN that is operatively coupled to an M2M SP. The method is implemented in the cellular AN and comprises: deploying an M2M SC inside the cellular AN; configuring the M2M SC to function as an M2M SC Proxy when the M2M SP deploys an M2M SC Server; and configuring the M2M SC Proxy to act on behalf of the M2M SC Server and to relay signaling plane communication between an entity-specific SC in an M2M communication entity and the M2M SC Server in the M2M SP, wherein the M2M communication entity is in wireless communication with the cellular AN and accesses the M2M SP via the cellular AN.

In another embodiment, the present disclosure is directed to an M2M SC Proxy in a cellular AN, wherein the cellular AN is operatively coupled to an M2M SP that deploys an M2M SC Server and no M2M SC Server is deployed in the cellular AN. The M2M SC Proxy is configured to perform the following: (i) function as a proxy to the M2M SC Server in the M2M SP and act on behalf of the M2M SC Server in the M2M SP; and (ii) relay signaling plane communication between an entity-specific SC in an M2M communication entity and the M2M SC Server in the M2M SP, wherein the M2M communication entity is in wireless communication with the cellular AN and accesses the M2M SP via the cellular AN.

The common M2M services enablement architecture (that is in-line with ETSI M2M SL architecture) proposed in particular embodiments of the present disclosure enables the freedom to choose the M2M SP according to the dynamics of the market and, at the same time, provides the ability to have a loosely-coupled M2M services architecture. The M2M services enablement architecture according to certain embodiments of the present disclosure thus provides the flexibility and means for a cellular AN operator to offer its access network services—including transport layers—to be used for serving M2M Services according to the ETSI M2M SL architecture and in a way that allows the cellular AN operator to achieve the following: (a) Use a single deployment model by deploying M2M SC within its network while being able to serve all types of M2M Service operators. (b) Have an immediate and easy access to all information that is required for across-layers functionalities. This information can be used to help the cellular AN operator to offer its AN in a more intelligent bit-pipe. (c) Serve other M2M Service Providers who use non-ETSI M2M SL architecture. (d) Have the flexibility to route M2M traffic in the visited network based on (home) cellular AN operator policy and M2M subscription.

The common M2M services enablement architecture according to particular embodiments of the present disclosure also allows the M2M SP to: (a) Deploy M2M SC within its network without the need to support different cellular AN interworking interfaces. This may be achieved by allowing M2M SC proxy functionality inside the cellular AN. (b) Deploy its services on multiple access technologies simultaneously with the same deployment model.

In the exemplary case of a 3GPP Access Network, certain embodiments of the present disclosure: (a) Allow a 3GPP AN operator to offer its transport services to any M2M Device that uses the 3GPP EPC to connect to its per-choice M2M SP, while the 3GPP AN is fully aware of the A-Layers identity of the M2M Device/Gateway, the type of the traffic that is being used over the transport connection, and the M2M applications that use the provided transport connection. (b) Allow the M2M SP to offer its Initial Services Enablement to its M2M Devices that use any cellular access (e.g., 3GPP, E-UTRAN, CDMA2000 based Evolved High Rate Packet Data (eHRPD), etc.), and to dynamically configure the M2M SP's per-choice A-Layers M2M Device Identifier and at the same time to be able to reach the M2M Device as long as it is registered. (c) Provide a dynamic solution for updating the M2M Access Subscription (of an M2M device/gateway) with the dynamically allocated A-Layers M2M Device/Gateway Identifier and the updated M2M Network Services Capabilities (N-SC) Access Point Names (APNs) (e.g., SL signaling and SL Data APNs). (d) Provide a dynamic solution for updating the M2M Access Subscriber policy profile with the Policy and Charging Rules Function (PCRF) using the dynamically-allocated A-Layers M2M Device Identifier, and the M2M Applications and their associated QoS.

BRIEF DESCRIPTION OF THE DRAWINGS

In the following section, the present disclosure will be described with reference to exemplary embodiments illustrated in the figures, in which:

FIG. 3 is a generic M2M services enablement architecture (for cellular network) according to one embodiment of the present disclosure, illustrating two different possible architectural options that allow the deployment of the M2M SC separate from the M2M AS;

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of a 3GPP cellular telephone/data network, but it can be implemented in other forms of cellular wireless networks as well.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "in-line," "across-layers," etc.) may be occasionally interchangeably used with its non-hyphenated version (e.g., "inline," "across layers," etc.), a capitalized entry (e.g., "Proxy," "Services Enablement Architecture", "Access Network," "A-Layers", etc.) may be interchangeably used with its non-capitalized version (e.g., "proxy," "services enablement architecture," "access network," "A-layers", etc.), and plural terms may be indicated with or without an apostrophe (e.g., BSC's or BSCs, SC's or SCs, APN's or APNs, etc.). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

Part One

Figure 3:
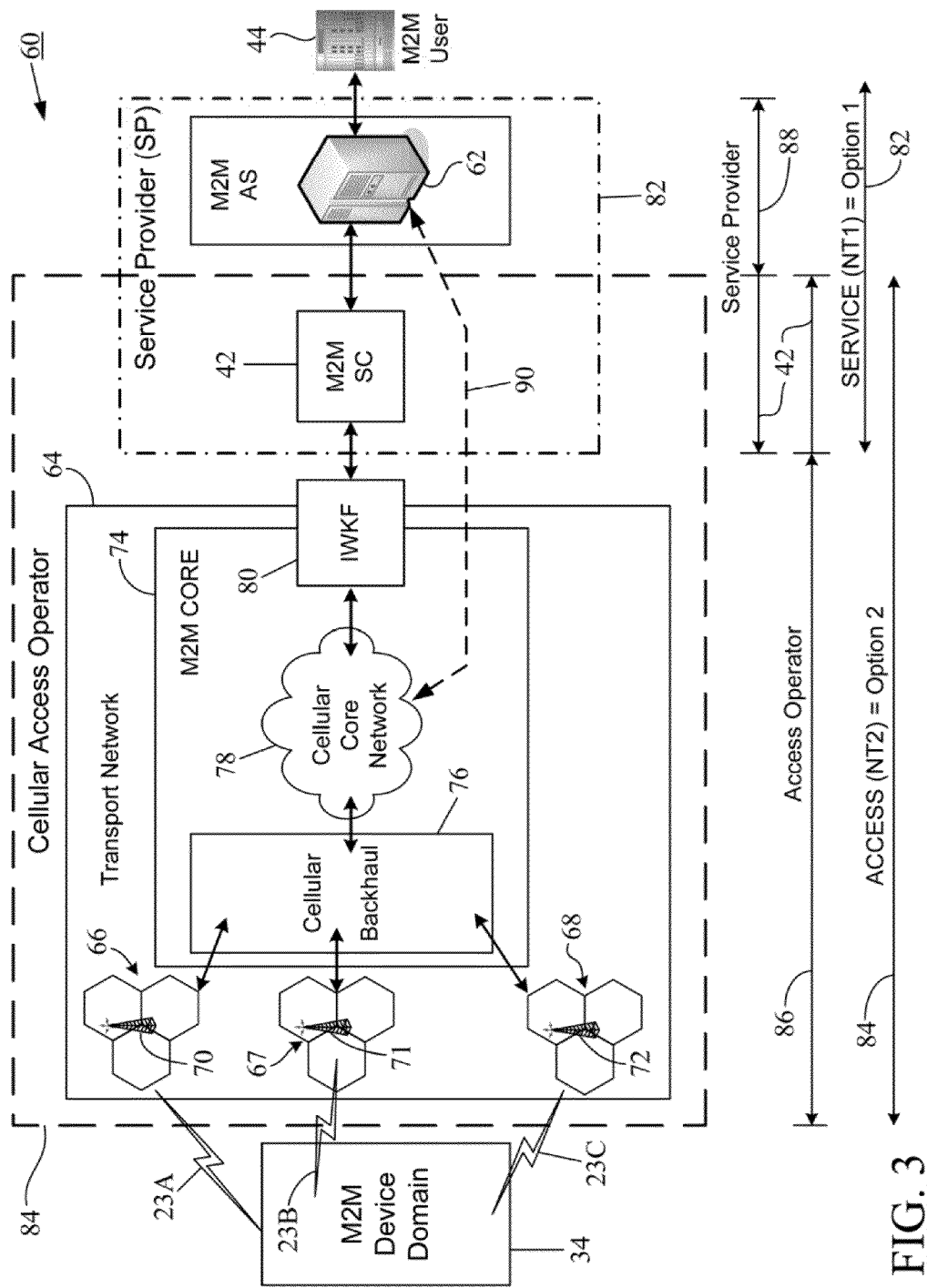

FIG. 3 is a generic M2M services enablement architecture 60 (for cellular network) according to one embodiment of the present disclosure, illustrating two different possible architectural options that allow the deployment of the M2M SC 42 separate from the M2M AS 62. From the earlier discussion, it is observed that such separate deployment makes the architecture 60 compliant with the requirements of ETSI M2M TC for an M2M SL architecture to be in-line with ETSI TS 102.69. For ease of discussion below, FIGS. 3-8 are categorized as forming Part One of the present disclosure (which discusses a generic M2M services enablement architecture for cellular access networks), whereas FIGS. 9-16 are categorized as forming Part Two of the present disclosure (which provides examples of signaling and other implementation details for the M2M services enablement architecture of Part One in the context of a 3GPP access network). However, division of the discussion in such different parts is for the sake of convenience only, and such division should not be construed to indicate lack of continuity or lack of relatedness between the discussions in these two parts. It is noted here that because of different network configurations possible in different embodiments of the present disclosure, various network elements (in the cellular AN and the SP network) common between FIGS. 1 and 3 and having generally similar functionalities are still designated by different reference numerals in FIG. 3 to distinguish them as implemented in the architecture 60 and to also emphasize that such network elements in FIG. 3 may be suitably configured or modified (in hardware, via software, or both) (from their counterparts in FIG. 1) to accomplish various functionalities (discussed in more detail below) according to particular embodiments of the present disclosure. Thus, in FIG. 3, only the M2M device domain 34, the radio links 23A-23C, the M2M SC 42, and the M2M User device 44 are identified by the same reference numerals as in FIG. 1. However, "internal" network elements of a cellular transport network 64 (i.e., that portion of the cellular AN which provides transport layer support for M2M communications from M2M devices/gateways in the M2M device domain 34), like the cellular sites 66-68, BS's 70-72, and an M2M core 74 comprising cellular backhaul 76, a core network 78, and an Interworking Function (IWKF) 80 (discussed later below), are provided with reference numerals different from those used to identify elements having similar functionality in FIG. 1. Similarly, the M2M AS 62 in the embodiment of FIG. 3 may be a modified version of the M2M AS 46 in FIG. 1 to enable its implementation in the architecture 60 of FIG. 3. Therefore, the M2M AS 62 in FIG. 3 is given a different reference numeral to distinguish it from the M2M AS 46 in FIG. 1, even if both may have substantially similar functionalities. It is noted here that although various M2M communication entities (like entities 24-32 in FIG. 1) are not shown as part of the M2M device domain 34 in FIG. 3 just for the sake of simplicity of the drawing, their presence is implied in FIG. 3 (and in similar such figures discussed later below).

As shown in FIG. 3, two different options (based on the deployment of the common M2M SC 42) may be: (a) Option 1: Tightly-coupled M2M Services Architecture (in which the M2M SC 42 is inside the SP network identified by reference numeral "82" and shown dotted in FIG. 3). This option is referred to as "Option 1" (referring to a first network configuration or NT1) at the bottom of FIG. 3. (b) Option 2: Loosely-coupled or distributed M2M Services Architecture (in which the M2M SC 42 is inside the cellular AN identified by reference numeral "84" and also shown dotted in FIG. 3). This option is indicated as "Option 2" (referring to a second network configuration or NT2) at the bottom of FIG. 3. In FIG. 3, both the SP network 82 and the cellular AN 84 are shown by different dotted lines to indicate flexible architecture options resulting from the above two deployment options for the common M2M SC 42. It is observed here that the implementation of the above two deployment options would result in two different cellular access networks 84 (with M2M SC 42) and 86 (without M2M SC 42), and two different M2M SP networks 82 (with M2M SC 42) and 88 (without M2M SC 42). Before discussing additional aspects of the architecture 60 and different combinations of such access network and SP network configurations in further detail, a brief overview of certain network elements in FIG. 3 is provided now.

Figure 1:
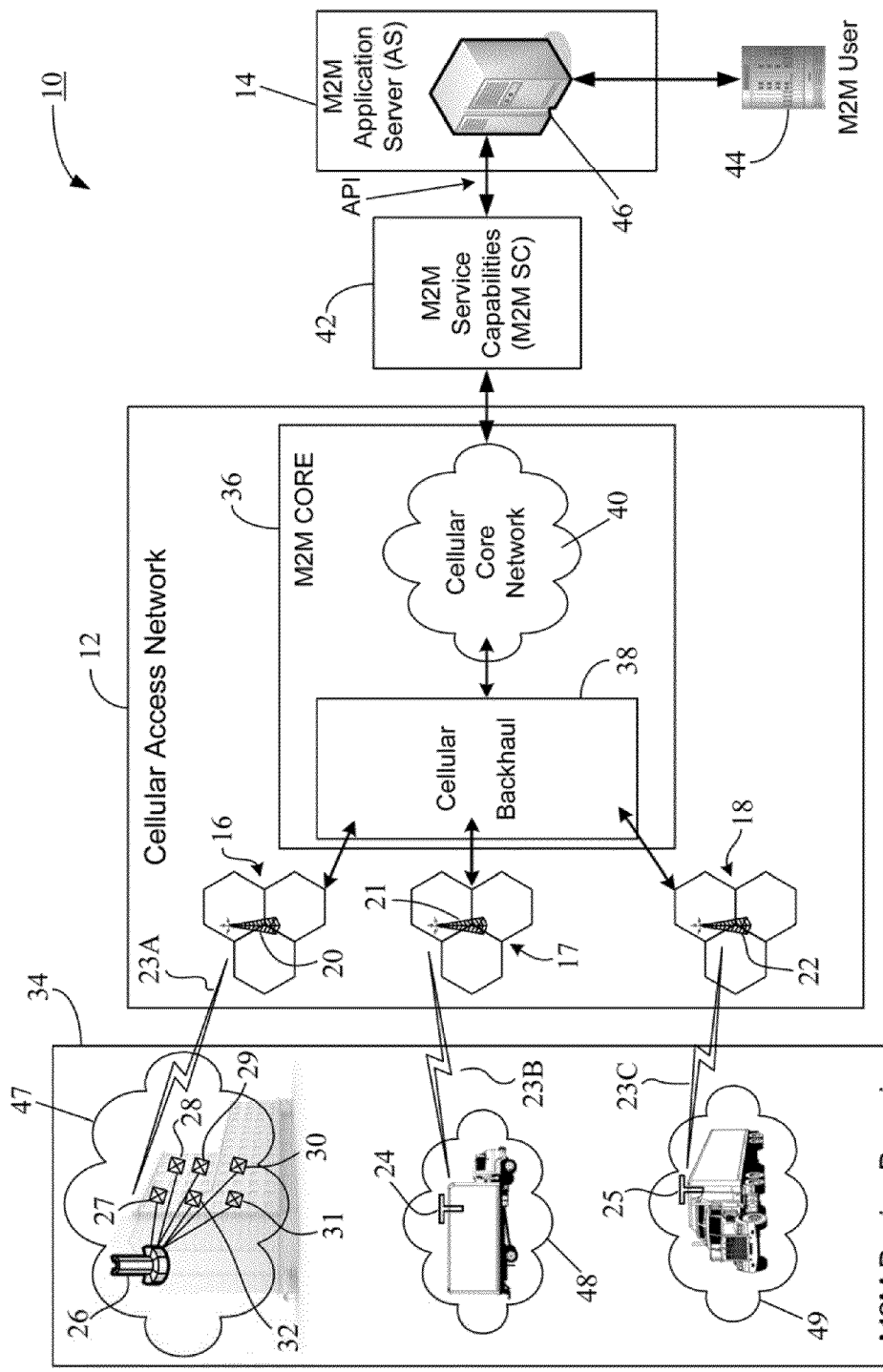
FIG. 1 illustrates an existing M2M services enablement architecture using a cellular Access Network.

For the sake of brevity, each network element or other entity in FIG. 3 is not described in detail, especially in view of earlier detailed discussion of similar elements/entities in FIG. 1 (which discussion continues to apply in the context of FIG. 3 as well). However, a few additional details are provided for certain elements in FIG. 3. For example, each of the base stations or access nodes 70-72 may be a BS in a Third Generation (3G) network, or an evolved Node-B (eNodeB) or Home eNodeB (HeNB) when the transport network 64 is a Long-Term Evolution (LTE) network. In other embodiments, one or more of the BS's 70-72 may also include a site controller, an access point (AP), a radio tower, or any other type of radio interface device capable of operating in a wireless environment. In one embodiment, one or more of the base stations 70-72 may be configured to implement an intra-cell or inter-cell Coordinated Multi-Point (COMP) transmission/reception arrangement. In case of an LTE carrier network, the core network 78 may be an Access Gateway (AGW). As is understood, the cellular AN 84 or 86 (depending on a particular configuration mentioned above) may be a cellular telephone network or a Public Land Mobile Network (PLMN) in which the M2M Devices 24-32 (shown in FIG. 1, but not shown in FIG. 3 for the sake of simplicity of the drawing) may be subscriber units. Furthermore, portions of the cellular AN 84 or 86 may include, independently or in combination, any of the present or future wireline or wireless communication networks such as, for example, the PSTN, an IP Multimedia Subsystem (IMS) based network, or a satellite-based communication link. In certain embodiments, the AN 84 or 86 may be connected to the Internet via its core network's 78 connection to an IP (packet-switched) network (not shown) or may include a portion of the Internet as part thereof. In one embodiment, a cellular AN may include more or less or different type of functional entities than those shown in the context of the cellular AN 84 or 86 in FIG. 3.

Although various examples in the discussion below are provided primarily in the context of the cellular AN 84 (or 86) being a 3GPP access network, the teachings of the present disclosure may equally apply, with suitable modifications (as may be apparent to one skilled in the art using the present teachings), to a number of different Frequency Division Multiplex (FDM) and Time Division Multiplex (TDM) based cellular wireless systems or networks (as well as Frequency Division Duplex (FDD) and Time Division Duplex (TDD) wireless systems/networks). Such cellular networks or systems may include, for example, standard-based systems/networks using Second Generation (2G), 3G, or Fourth Generation (4G) specifications, or non-standard based systems. Some examples of such systems or networks include, but not limited to, GSM networks, GPRS networks, Telecommunications Industry Association/Electronic Industries Alliance (TIA/EIA) Interim Standard-136 (IS-136) based TDMA systems, Wideband Code Division Multiple Access (WCDMA) systems, 3GPP LTE networks, WCDMA-based High Speed Packet Access (HSPA) systems, 3GPP2's CDMA based High Rate Packet Data (HRPD) or eHRPD systems, CDMA2000 or TIA/EIA IS-2000 systems, EV-DO systems, WiMAX systems, International Mobile Telecommunications-Advanced (IMT-Advanced) systems (e.g., LTE Advanced systems), other UTRAN or E-UTRAN networks, GSM/EDGE systems, Fixed Access Forum or other IP-based access networks, a non-standard based proprietary corporate wireless network, etc.

Referring back to FIG. 3, the IWKF 80 (which may also be referred to as "MTC IWKF" or "MTC IWF" in certain literature) may be implemented in the cellular AN 84 (or 86), and one or more instances of such MTC IWKF may reside in the cellular AN 84 or 86 (which may be, for example, a Home PLMN (HPLMN) for one or more M2M devices in the M2M device domain 34). The IWKF 80 may be a stand-alone entity or a functional entity of another network element (e.g., an M2M SC Proxy 100 discussed with reference to FIG. 4 below). The IWKF 80 may provide an interface and function as an intermediary entity to facilitate communication between the cellular CN 78 and an M2M SC server (also referred to in certain literature as an "MTC server") (e.g., the M2M SC server 102 shown in FIG. 4 and discussed later below). The IWKF 80 may be used for the control plane communication to hide the internal topology of the cellular AN 84 (or 86) or for relay and translation of signaling protocols used for M2M communications (to invoke specific functionality in the AN 84 or 86). In one embodiment, the IWKF 80 may authenticate the M2M SC server before communication establishment with the cellular AN 84 or 86, may authorize control plane requests from the M2M SC server, and/or may support secure communications between the cellular AN 84 (or 86) and the M2M SC server. In FIG. 3, the bi-directional dotted line 90 indicates an optional user plane signaling between an AN-based entity (here, the CN 78) and an SP-based entity (here, the AS 62). Other solid bi-directional lines (not identified individually in FIG. 3 for the sake of brevity) indicate "typical" user plane signaling (and interconnection) involving various entities in the cellular AN 84 (or 86) as well as the SP network 82 (or 88).

Section-I: Use of M2M SC Proxy in the Access Network

The use of M2M SC 42 in the cellular AN provide an entry point to the cellular AN provider to all the information that are needed for enforcing A-Layers functionalities. In other words, such use allows the cellular access network operator to have access to the needed information about the Across-Layers M2M Device/Gateway Identifier, possible M2M D/G-SC Identifier, and M2M Applications that are running on the M2M service device (e.g., the Service Device 58 shown in FIG. 2) which uses the M2M transport device (e.g., the Access/Transport Device 56 in FIG. 2) over the cellular access network air interface and Access/Transport Layer. This option may work just fine when the M2M SC 42 is deployed inside the cellular access operator network as an M2M SC Server (not shown) while the Services Provider network does not have the M2M SC deployed.

However, when the cellular AN does not deploy an M2M SC server, but the SP network deploys the common M2M SC 42—as an M2M SC server (e.g., the M2M SC Server 102 shown in FIG. 4 and discussed below), it may be desirable to allow for the functionality of an M2M SC Proxy (e.g., the M2M SC Proxy 100 shown in FIG. 4, which is discussed below) in the cellular AN in order to allow the cellular access operator to have access to all the Across-Layers information that are needed for the M2M services enablement.

Figure 4:
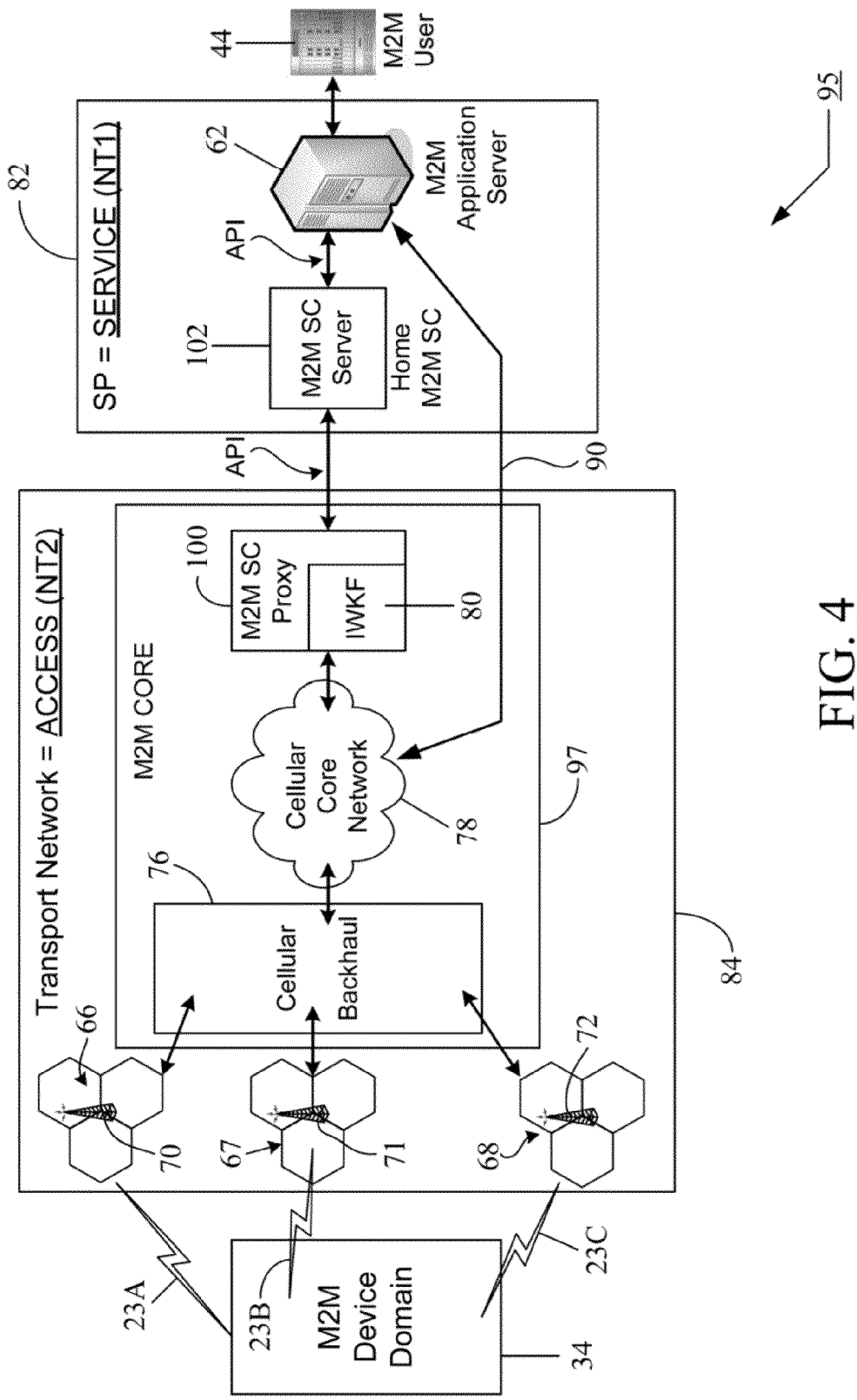
FIG. 4 shows an exemplary M2M services enablement architecture using an M2M SC proxy in the cellular AN according to one embodiment of the present disclosure.

FIG. 4 shows an exemplary M2M services enablement architecture 95 using an M2M SC proxy 100 (shown in more detail in FIG. 6) in the cellular AN according to one embodiment of the present disclosure. The architecture 95 illustrates the situation where each network—the cellular AN and the SP network—deploys the common M2M SC 42, as illustrated by two overlapping dotted network configurations 82 (Network 1 or NT1 under Option 1 mentioned above) and 84 (Network 2 or NT2 under Option 2 mentioned above) in FIG. 3. For the sake of brevity, discussion of network elements or other entities having the same functionality and common between FIGS. 3 and 4 (as identified by the same reference numerals in those figures) is not repeated herein. Also, for ease of discussion, the cellular AN 84 (from FIG. 3) is interchangeably denoted as "Transport Network" 84 in FIG. 4 to emphasize the access/transport layer support in the network 84. The transport network 84 includes a modified M2M core 97 (as opposed to the M2M core 74 in FIG. 3) that comprises the M2M SC proxy 100. The SP network 82 includes the counterpart M2M SC server 102 (which is the deployed version of SP's home M2M SC). The terms "M2M SC server," "M2M server" or "MTC server" may be used interchangeably in certain literature. However, for the sake of consistency, only the terms "M2M SC server' or "M2M server" are used in the discussion below. The M2M SC server 102 may connect to the cellular AN 84 (e.g., via the M2M SC proxy 100 in the embodiment of FIG. 4) to communicate with M2M Devices/Gateways (operating in the M2M device domain 34) used for MTC. In one embodiment, the M2M SC server 102 and the M2M user 44 may be either separate entities or co-located. The M2M SC proxy 100 and the M2M SC server 102 may interface with each other using an appropriate API as shown.

Similarly, the M2M SC server 102 and the M2M AS 62 may also interact with each other using an appropriate API as illustrated in FIG. 4. The optional user plane signaling between cellular CN 78 and the M2M AS 62 in certain embodiments of the present disclosure is also indicated by bi-directional line 90 connecting these two entities.

It is noted here that current versions of both ETSI TS 102.69 and 3GPP Technical Report (TR) 23.888 (titled "System Improvements for Machine-Type Communications") fail to discuss such joint deployment of common M2M SC 42 and related signaling and architectural details, thereby leaving certain deployment and interworking options (between the cellular AN and the SP network) unaddressed. The embodiment in FIG. 4 addresses this situation, while remaining in compliance with ETSI M2M TC's principles (regarding an access-agnostic M2M SL architecture) mentioned earlier under the "Background" section of the present disclosure. Thus, in the architecture 95 in FIG. 4, the cellular access operator's M2M SC (i.e., the common M2M SC 42 deployed in the cellular AN) acts as an M2M SC Proxy 100 which is configured to relay all signaling plane communications between the DIG-SC's (residing on respective M2M devices or gateways operating in the M2M device domain 34 as mentioned earlier) and the Services Provider's M2M SC Server 102. Not only that but the M2M SC proxy 100 also may be configured to provide the cellular access operator with the access to all of the across-layers information that are needed for the M2M services enablement in cellular access network. The use of M2M SC Proxy 100 may provide many additional functionalities, some examples of which are given below:

(1) Act as a Proxy on behalf of the M2M Services Provider's M2M SC Server. It is noted here that when the common M2M SC 42 is deployed as an M2M SC server (whether in the SP network or in the AN (as discussed in more detail later below)), the D/G-SCs use this M2M SC server to register for M2M services. Thus, here, the M2M SC proxy 100 is an M2M SC that works as a proxy to another M2M SC server (here, the M2M SC server 102 in the M2M SP network 82). This approach allows the cellular AN operator to not only deploy its M2M SC as an M2M SC Server within its network domain, but to also use its M2M SC to work as an M2M SC Proxy when communicating with an M2M SP network that also deploys an M2M SC Server.

(2) If the cellular access network's M2M SC works as an M2M SC proxy, the M2M Services Provider may not need to directly interwork with the cellular core network for further services (e.g., allocating IP addresses, M2M device/gateway discovery (i.e., identifying how to reach a particular M2M communication entity), etc.) offered by the cellular access operator network. This may allow the IWKF interface 80 to be co-located within the cellular access network's M2M SC Proxy 100 (as shown in FIG. 4), thereby providing an efficient architecture. Generally, two interworking-related possibilities arise in case of the proxy-server configuration of FIG. 4: (a) The interworking functionality is already implemented in the M2M SC server 102, in which case it does not matter to the M2M SC server 102 how the IWKF interface 80 is deployed in the AN 84. (b) The interworking functionality is not implemented in the M2M SC server 102. In this case, the M2M SC proxy 100 may provide the needed interworking through co-located IWKF 80. Thus, in either case, the SP-based M2M SC server 102 may not need to support the IWK function 80. In any event, in one embodiment, if the M2M SC Proxy 100 is enabled and supported, the M2M SP 82 may always communicate with the AN 84 over the same interface—i.e., when the SP has its own M2M SC server 102, this server may communicate with another server (here, the M2M SC proxy 100) in a routine manner and may not need to be aware of the IWKF interface or how such interface is implemented in the access network. It is observed, however, that IWKF 80 may be implemented separately from the M2M SC proxy 100 (e.g., between the CN and the M2M SC proxy in the manner illustrated in FIG. 3) in certain embodiments and, hence, may not be co-located within M2M SC proxy 100 in those embodiments.

(3) Have access to the signaling communication between the G/D-SC and the M2M Services Provider network's M2M SC server 102. This may eliminate further signaling and provide much needed optimization that may be required in the case when the M2M SC server is within the M2M Services Provider and needs any of the cellular access network services. For example, in case of a specific Device ID, the M2M SP and the cellular AN may need to agree on the specific Device ID (e.g., the A-Layers M2M Device Identifier mentioned before) that will be used between the SP and the AN provider. In that case, having an interface (e.g., the API-based interface shown in FIG. 4) between the M2M server 102 and Proxy 100 may provide the cellular AN with the chance to get this information (here, the specific Device ID) over to the SP network via this interface. Otherwise, some other signaling or procedure must be used to communicate this information between these two entities.

Figure 5:
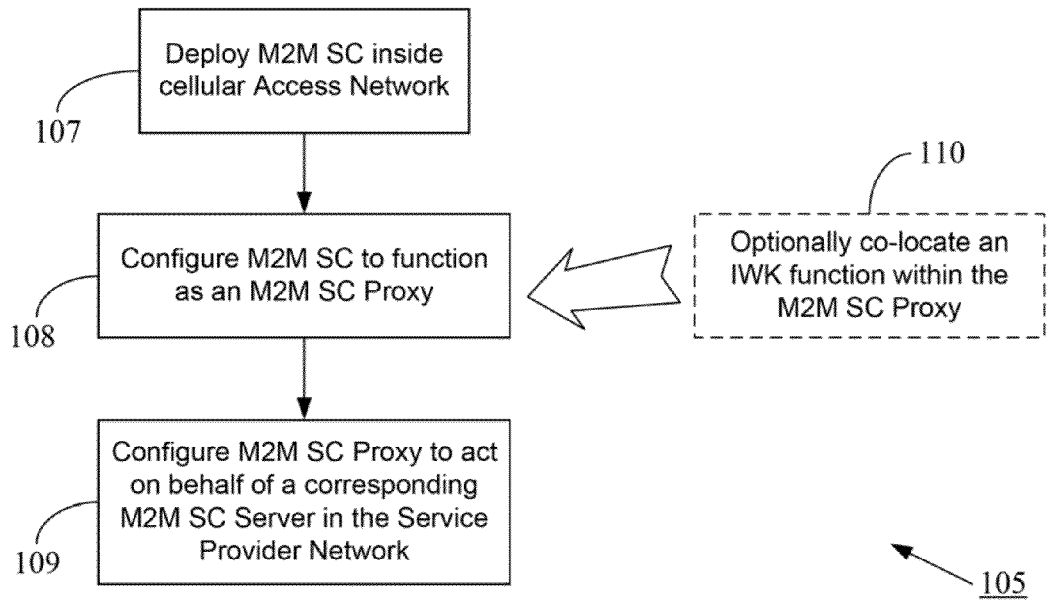
FIG. 5 illustrates an exemplary flowchart related to deployment of an M2M SC Proxy in a cellular AN according to one embodiment of the present disclosure.

FIG. 5 illustrates an exemplary flowchart 105 related to deployment of an M2M SC Proxy (e.g., the M2M SC proxy 100 in FIG. 4) in a cellular AN (e.g., the cellular AN 84 in FIG. 4) according to one embodiment of the present disclosure. The flowchart 105 in FIG. 5 is related to a method of providing M2M communication using the cellular AN 84 that is operatively coupled to an M2M SP network (e.g., the M2M SP 82 in FIG. 4). As illustrated at block 107 and mentioned earlier with reference to FIG. 4, the cellular AN operator may deploy its portion of the common M2M SC 42 (in FIG. 3) inside its cellular AN. At block 108, the AN operator may then configure the deployed M2M SC to function as the M2M SC proxy 100 when the M2M SP 82 deploys its portion of the common M2M SC 42 as the M2M SC server 102 (and when there is no M2M SC server deployed in the cellular AN 84). Furthermore, at block 109, the cellular AN operator may configure its M2M SC proxy 100 to act on behalf of the corresponding M2M SC server 102 in the M2M SP network 82 and to relay signaling plane communication between an entity-specific SC in an M2M communication entity (operating in the M2M device domain 34) (e.g., an M2M Device or an M2M Gateway shown in FIG. 1, but not shown in other figures for the sake of simplicity) and the M2M SC server 102. As mentioned before, the AN operator may also optionally co-locate the IWKF 80 within the M2M SC proxy 100 as shown by the dotted block 110 in FIG. 5. Thus, an M2M service enablement architecture using M2M SC Proxy in the cellular access network (e.g., the architecture 95 in FIG. 4) may be provided in-line with the earlier-discussed requirements of ETSI M2M SL architecture.

Figure 6:
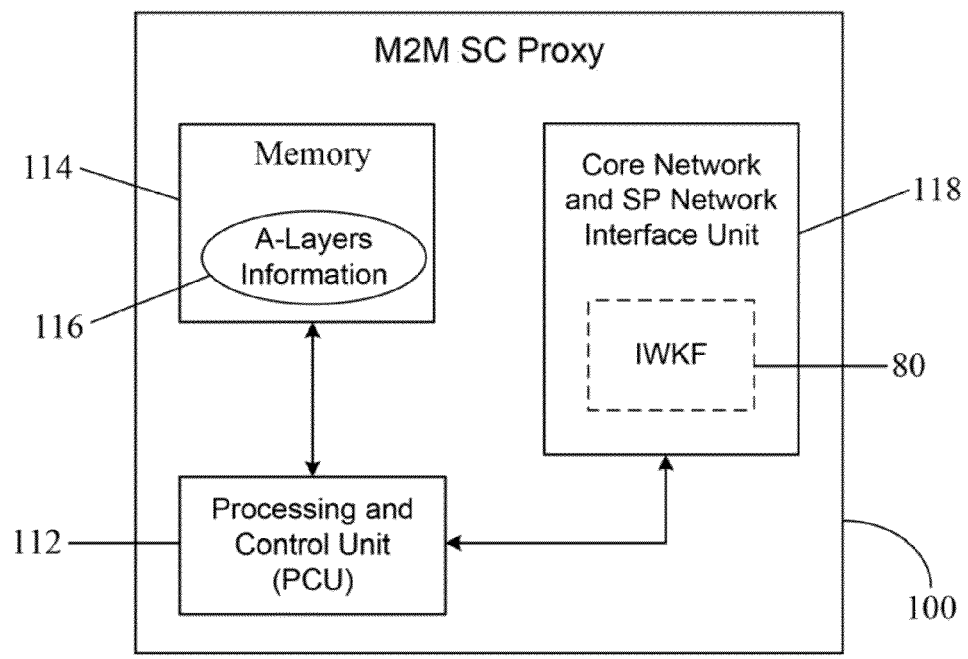
FIG. 6 is an exemplary block diagram of an M2M SC Proxy according to one embodiment of the present disclosure.

FIG. 6 is an exemplary block diagram of an M2M SC proxy (e.g., the proxy 100 shown in FIG. 4) according to one embodiment of the present disclosure. In one embodiment, the M2M SC proxy 100 may be a data processing or computing unit (e.g., a general purpose computer or PC, a workstation, etc.) that is suitably-configured (in hardware and/or software) to perform various proxy functionalities discussed herein. In that regard, the proxy 100 may include a Processing and Control Unit (PCU) 112 that may execute a proxy-related application (software or program code) to enable the proxy 100 to provide the desired proxy functionality (using, for example, a Java™ workflow engine) as per the teachings of various embodiments of the present disclosure. The M2M SC proxy 100 may also include a computer-readable data storage medium (shown and referred to herein as "memory" 114 in FIG. 6) electrically coupled to the PCU 112. The memory 114 may contain program code (not shown), which, when executed by the PCU 112, may configure the proxy 100 to provide various proxy-related functionalities discussed herein. Thus, in the discussion herein, although the M2M SC proxy 100 (or any other element or entity shown in FIGS. 3-4 or similar other figures discussed later) may be referred to as "performing," "accomplishing," or "carrying out" (or other terms having similar import) a function or process, it is evident to one skilled in the art that such performance may be technically accomplished in hardware and/or software as desired. The AN operator or a third party manufacturer/supplier of the proxy 100 may suitably configure the proxy 100 (e.g., through hardware and/or software based configuration of the processing unit 112) as per the particular requirements of the AN operator.

As shown in FIG. 6, in one embodiment, the memory 114 in the proxy 110 may also store different A-Layers information (also referred to interchangeably as "A-Layers parameters") 116 and make that information available to the PCU 112 as needed to assist the PCU 112 in enabling the cellular AN operator with the access to all of the needed across-layers information for the M2M services enablement in the cellular AN 84. As mentioned before, in one embodiment, the A-Layers parameters is a device's/gateway's "external" identifier (such as, for example, the earlier-mentioned A-Layers M2M Device/Gateway Identifier). In one embodiment, these A-Layers parameters may reside in the M2M device/gateway and the proxy may retrieve them from the M2M device/gateway. In an embodiment where an M2M server (or other similar element) in the SP network stores such information (which also may have been retrieved from the device/gateway), the proxy may then receive this information from that server. The M2M SC proxy 100 may interact with the cellular CN 78 and the SP network 82 (more specifically, the M2M SC server 102 in the embodiment of FIG. 4) via an interface unit 118, which may include the optional IWKF 80 (as shown by a dotted block in FIG. 6) in certain embodiments. The interface unit 118 also may be coupled to the PCU 112, and may accomplish the desired proxy-supported interworking functionality through instructions from the PCU 112.

The PCU 112 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The PCU 112 may employ distributed processing in certain embodiments.

As mentioned before, the proxy functionality discussed herein may be implemented in a computer program, software, or firmware incorporated in a computer-readable storage medium (e.g., the memory 114 in FIG. 6) for execution by a general purpose computer or a processor (e.g., the PCU 112 in FIG. 6). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 114 may employ distributed data storage with/without redundancy.

Alternative embodiments of the M2M SC proxy 100 may include additional components responsible for providing additional functionality, including any of the functionality identified above and/or any functionality necessary to support the solution as per the teachings of the present disclosure described above. It is noted here that additional architectural details of the proxy 100 are not shown in FIG. 6 merely for the sake of simplicity. Thus, for example, input/output (I/O) devices (e.g., a computer keyboard, a touch-screen, a computer display monitor, a computer mouse, etc.) attached to or associated with the proxy 100 are not shown in FIG. 6. However, it is understood that various I/O and other external devices/systems (which may operate in conjunction with the M2M SC proxy 100) may be used with the proxy 100 to accomplish various proxy-related functions discussed in particular embodiments of the present disclosure.

Section-II: Routing of Certain M2M Services in the Visited Access Network, while Others Through the Home Access Network When some M2M Devices and/or Gateways roam to a visited cellular Access Network (not shown) (for example when such devices/gateways are mounted on a mobile carrier such as, for example, a truck, an airplane, etc.) that deploys M2M SC (e.g., the M2M SC 42 in the generic architecture of FIG. 3) therewithin, while the home access network (of these devices/gateways) does not deploy M2M SC within its cellular access network, the home access network (not shown) may still have the chance to allow the visited cellular access operator to route some of the M2M services signaling and traffic locally (i.e., through visited network, but without going through the home access network) to the M2M Services Provider (which may be a visited M2M SP or a home M2M SP).

When the M2M Device/Gateway roams into a (visited) cellular access network, the home cellular access network—based on local home access network operator and M2M Access subscriber policy—may indicate (e.g., during user authentication, based on the Service Level Agreements (SLAs) between the home and visited network operators, etc.) to the visited access network which traffic could be routed directly and locally to the M2M Services Provider network (which, as mentioned earlier, may be a visited M2M SP or a home M2M SP). In one embodiment, the use of M2M SC (e.g., the M2M SC 42 in the generic architecture of FIG. 3, as mentioned before) as a proxy inside the visited cellular access network (similar to the configuration shown in FIG. 4) may provide the visited cellular access network the information that it needs to be able to have access to all across-layers information that are needed for allowing the visited network to locally route such traffic. In one embodiment, the decision of routing specific traffic via the visited cellular access network can also be based on M2M Services provider policy and/or (M2M Device's/Gateway's) M2M Services Subscription (which is discussed in Part Two below in more detail with reference to a 3GPP access network). These policy and subscription information may be statically configured (and stored, for example, in the M2M SC proxy in the visited access network) or dynamically communicated (from the relevant service provider to the visited access network) based on prior understanding between the M2M SP and (visited) AN operator. In this case, the proxy-based architecture of the visited cellular access network's connection to the home M2M SP may be similar to that shown in FIG. 4.

Figure 7:
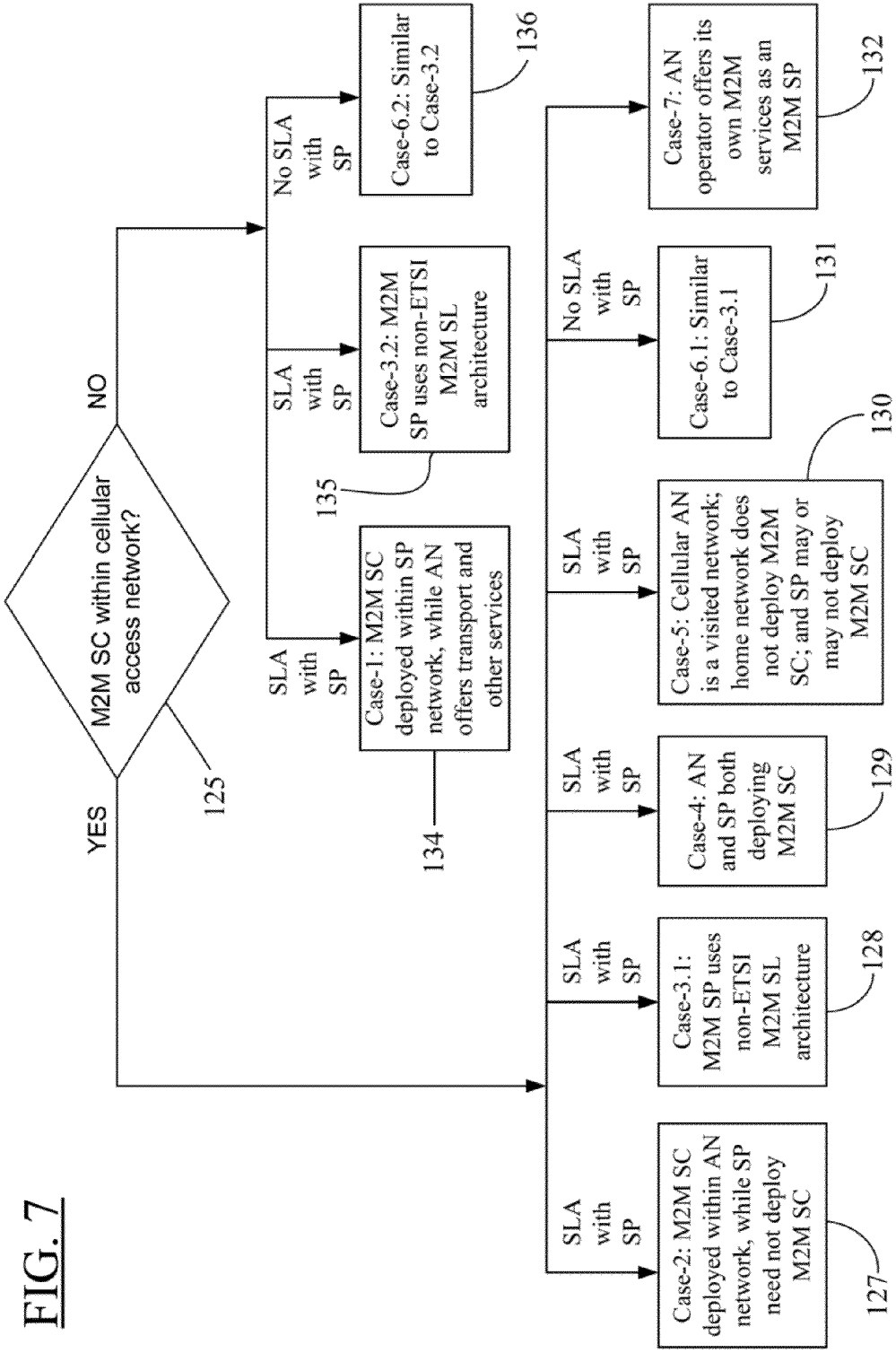
FIG. 7 provides an overview of exemplary architectural cases that address M2M services enablement for a cellular AN.

Section-III: Exemplary Architectural Cases that Address M2M Services Enablement for a Cellular Access Network FIG. 7 provides an overview of exemplary architectural cases that address M2M services enablement for a cellular AN (e.g., the AN 84 or 86 in FIG. 3). FIG. 7 is a simplified illustration for easy reference when discussing each case in detail below. As shown at block 125 in FIG. 7, the architectural cases may be divided into two broad categories based on whether the common M2M SC (e.g., the M2M SC 42 in FIG. 3) is deployed within the cellular AN or not. If the M2M SC is within the cellular AN, then four cases 127-130 address the situation where cellular AN operator has a Service Level Agreement (SLA) with the M2M Service Provider (SP): Case-2 (block 127) addresses the situation in which M2M SC is deployed within the cellular AN, while M2M SP need not correspondingly deploy M2M SC; in Case-3.1 (block 128), the M2M SP uses non-ETSI compliant M2M SL architecture; Case-4 (block 129) relates to the situation where cellular AN and M2M SP both deploy M2M SC (similar to the embodiment in FIG. 4); and Case-5 (block 130) addresses the situation where cellular AN (deploying M2M SC) is a visited access network, the home access network does not deploy M2M SC, and the M2M SP (which may be home M2M SP or visited M2M SP) may or may not deploy M2M SC. When M2M SC is deployed within the cellular AN, but the cellular network operator does not have an SLA with M2M SP, it may give rise to Case-6.1 (block 131), which may be implemented similar to Case-3.1 (block 128). Finally, the cellular AN operator may offer its own M2M Services as an M2M SP, as illustrated as Case-7 (block 132) in FIG. 7. On the other hand, when M2M SC is not deployed within the cellular AN, then two cases 134-135 address the situation where cellular AN operator has an SLA with the M2M SP: Case-1 (block 134) addresses the situation in which M2M SC is deployed within the SP network, while cellular AN offers transport and other services; and Case-3.2 (block 135) relates to a situation in which the M2M SP uses non-ETSI M2M SL architecture. Finally, when M2M SC is not deployed within the cellular AN and the cellular AN operator does not have an SLA with M2M SP, it may give rise to Case-6.2 (block 136), which may be implemented similar to Case-3.2 (block 135).

Each of the architectural cases identified in FIG. 7 is now described in detail. It is observed here that all of the architectural M2M services enablement cases discussed below (and shown in FIG. 7) may be supported when particular embodiments of the present disclosure are used in a cellular AN offering M2M Services. It is further observed here that in the cases (i.e., cases at blocks 127-132) that assume the use of M2M SC within the cellular AN, the M2M SC may be deployed either as an M2M SC Server or as an M2M SC Proxy. However, in certain embodiments, the same M2M SC may be deployed to function in two different ways depending on network architecture—as an M2M SC server for one Service Provider (SP1) and as an M2M SC proxy for another Service Provider (SP2).

Case 1:

In this case, the common M2M SC (e.g., the M2M SC 42 in FIG. 3) is deployed within M2M SP Network 82 (FIG. 3) (e.g., as an M2M SP server) while cellular AN (which may have an SLA with the M2M SP) offers Transport and other services (as indicated at block 134 in FIG. 7). This case is the earlier-referred "Option 1" in FIG. 3—i.e., the tightly-coupled M2M Services architecture in which M2M SC 42 is coupled with M2M Application(s) (through M2M AS 62) and deployed in the M2M Services Provider network 82. This option may not be flexible and may require the M2M SP network to support interfaces to interwork with every type of cellular access network in order to offer its M2M Services over that cellular access network. It may also require the M2M SP network to provide across-layers M2M device and services application information back to the cellular access network in order for the cellular access network to be able to offer M2M Services enablement in a more coordinated way. If the above across-layers information is not provided back to the cellular access network, then the cellular access network may be required to provide a bit-pipe for the M2M SP network (i.e., the cellular AN may provide a transport to the (SP's) Service Layer above it, but without knowledge of what is running over its Transport Layer). Such an option is neither flexible nor provides variety of M2M service offering choices.

Case 2:

In this case, M2M SC 42 is deployed (as an M2M SC server (not shown)) within cellular AN 84 (FIG. 3) while serving M2M Service Provider 88 (which may have an SLA with the cellular AN operator) need not deploy M2M SC within its network (as indicated at block 127 in FIG. 7). This case is the earlier-referred "Option 2" in FIG. 3—i.e., the loosely-coupled or distributed M2M Services architecture in which M2M SC 42 is separate from M2M Application(s) and M2M AS 62 (i.e., M2M SC is not deployed in the same network with M2M application(s)). This architecture deployment option allows the M2M SP 88 the flexibility not to support an interworking function (e.g., the IWKF 80 in FIG. 3) with the cellular access network except at the application level between the M2M AS 62 (in the SP network) and the M2M SC server (not shown) that resides inside the cellular access network. This option may allow the cellular access network operator an access to all across-layers information that enables the cellular access network to offer M2M Services enablement in a more intelligent manner. This option may also allow the M2M Services Provider to offer its M2M services across multiple access networks as long as the access network supports the same M2M SL architecture (e.g., ETSI-compliant architecture). Furthermore, this case may allow greater flexibility for billing inside the cellular access network and for providing the proper Quality of Service (QoS) as per the M2M application characteristics.

Cases 3.1 and 3.2:

These cases (blocks 128 and 135 in FIG. 7) relate to supporting M2M Services for an M2M SP network that uses a non-ETSI M2M SL architecture. Both of these cases assume AN operator's SLA with the M2M SP. Case 3.1 addresses the situation when an M2M SP supports an M2M SL architecture that is different from what is specified by ETSI (e.g., the common M2M SC-based ETSI-preferred architecture 10 in FIG. 1) and the cellular AN deploys M2M SC (e.g., the common M2M SC 42 in FIG. 3) as an M2M SC server. Whereas, Case 3.2 relates to the situation when the AN does not deploy M2M SC (i.e., AN does not have the M2M SC server like Case 3.1), but the SP network still supports a non-ETSI M2M SL architecture.

Figure 8A:
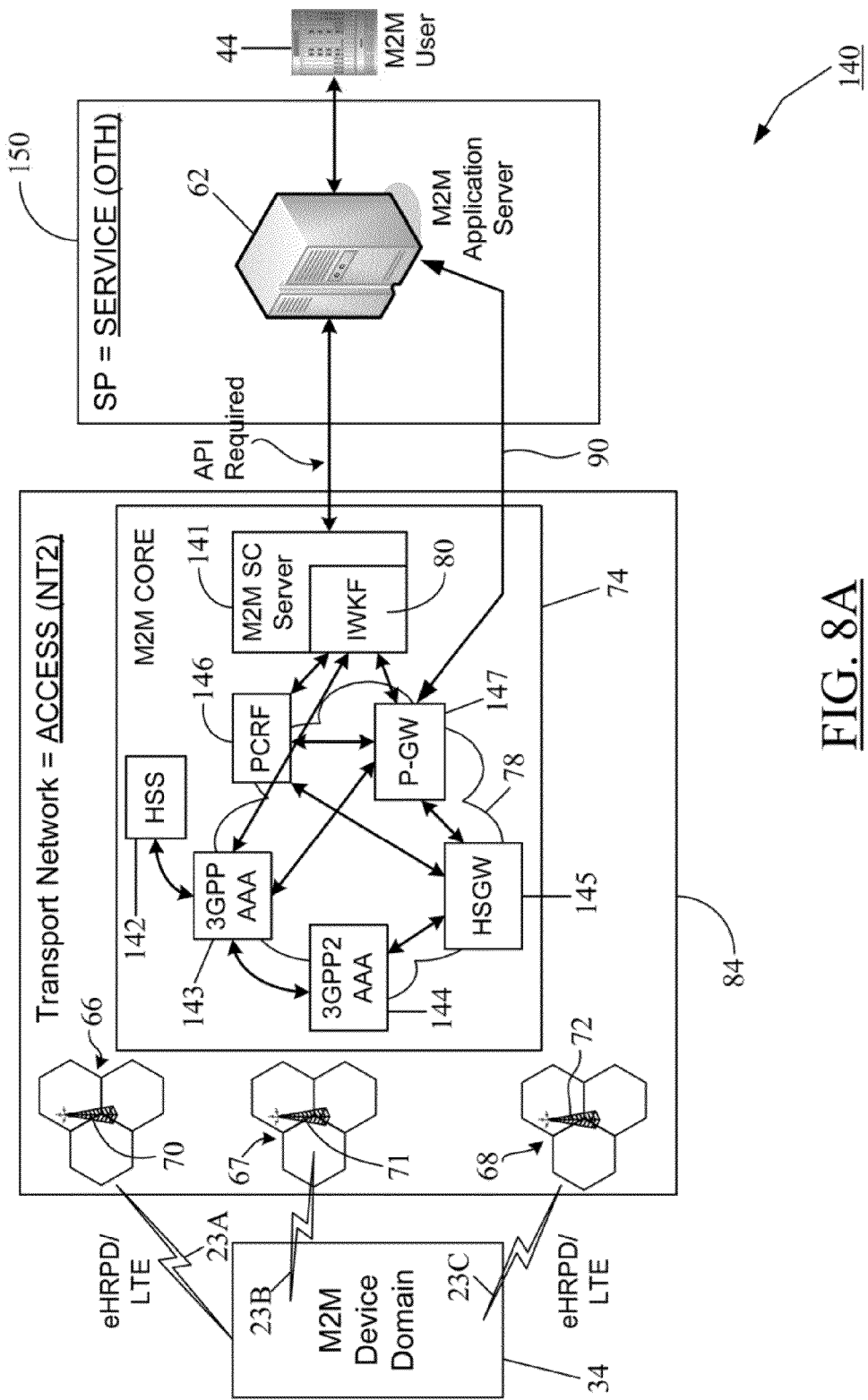
FIG. 8A illustrates an exemplary M2M services enablement architecture (non-ETSI) for a cellular AN related to Case 3.1 in FIG. 7.
Figure 8B:
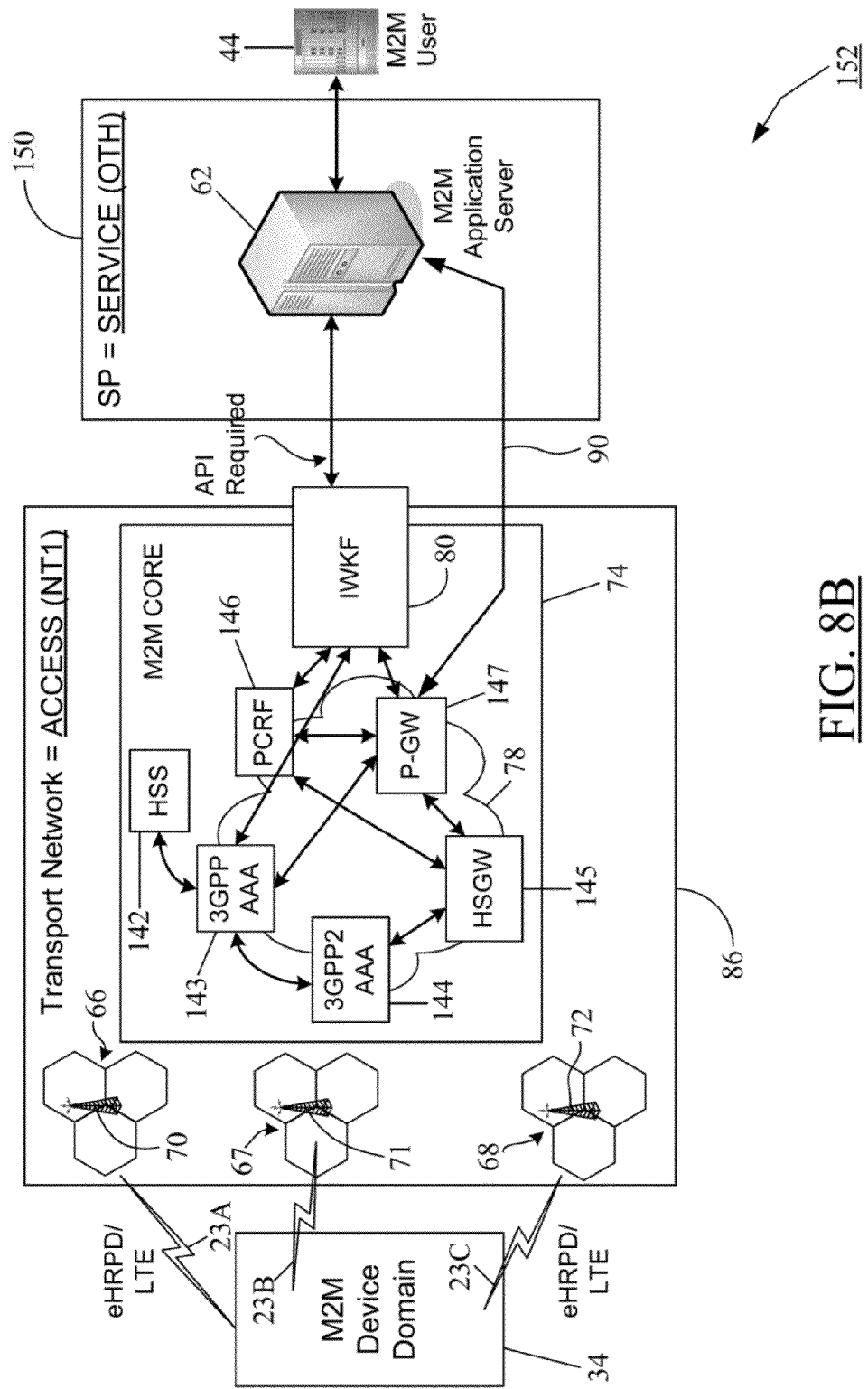
FIG. 8B illustrates an exemplary M2M services enablement architecture (non-ETSI) for a cellular AN related to Case 3.2 in FIG. 7.

FIG. 8A illustrates an exemplary M2M services enablement architecture (non-ETSI) 140 for a cellular AN (e.g., the AN 84 in FIG. 3) related to Case 3.1 in FIG. 7, whereas FIG. 8B illustrates another exemplary M2M services enablement architecture (non-ETSI) 152 for a cellular AN (e.g., the AN 86 in FIG. 3) related to Case 3.2 in FIG. 7. Although various 3GPP network elements and different M2M SC deployments are shown in FIGS. 8A-8B, and although such depiction may technically differentiate the architectures in FIG. 3 and those in FIGS. 8A-8B, for ease of discussion, similar network elements or components (e.g., core network 78, M2M AS 62, M2M core 74, etc.) between FIG. 3 and FIGS. 8A-8B are referred to using the same reference numerals. Thus, the core network 78 in FIGS. 8A-8B may be considered as a specific (3GPP-based) implementation of the generic CN 78 in FIG. 3. Similarly, the M2M core 74 in FIGS. 8A-8B also may be considered a specific (3GPP-based) version of the generic M2M core 74 in FIG. 3. However, such specific implementations are exemplary in nature and are not distinguished herein (using different reference numerals) from their generic counterparts in FIG. 3 for the sake of simplicity, ease of discussion, and to provide a contextual reference against FIG. 3. On the other hand, because the SP network in FIGS. 8A-8B is not based on an ETSI-compliant M2M SL architecture, this SP network is identified using a reference numeral "150" that is different from reference numerals used for an SP network in FIG. 3.

As shown in FIG. 8A, the cellular AN 84 (conveniently referred to here as "Transport Network") may represent the architecture associated with "Option 2" in FIG. 3 (discussed earlier). Thus, the access/transport network 84 represents the second network configuration (NT2) from FIG. 3, which configuration deploys M2M SC in the AN—here, in the form of an M2M SC server 141 in FIG. 8A. As mentioned earlier, when the common M2M SC 42 is deployed as an M2M SC server (here, as the M2M SC server 141), the D/G-SCs use this M2M SC server to register for M2M services. For the sake of simplicity, the cellular backhaul portion 76 is not shown in FIGS. 8A and 8B. The M2M core 74 in FIGS. 8A-8B is shown to include a Home Subscriber Server (HSS) 142 along with other elements of a 3GPP Evolved Packet Core (EPC) 78 such as, for example, a 3GPP Authentication Authorization and Accounting (AAA) server 143, a 3GPP2 AAA 144, an eHRPD Serving Gateway (HSGW) 145 (where "eHRPD" refers to Evolved High Rate Packet Data), a Policy and Charging Rules Function (PCRF) 146, and a PDN Gateway (P-GW) 147 (wherein "PDN" refers to Packet Data Network). The interconnections among these EPC elements 143-147 are also illustrated in FIGS. 8A-8B. Functionalities of these EPC elements 143-147 are well-known and, hence, these elements are not discussed in any appreciable detail herein because such detail is not relevant to the present discussion. However, it is noted here that additional messaging details involving certain of these elements are provided in FIGS. 14-16, which are discussed later under Part Two below.

In the embodiment of FIG. 8A, the IWKF 80 is shown co-located within the M2M SC server 141. In other embodiments, as mentioned before, the IWKF 80 may be inside the cellular AN, but may not be co-located within AN's M2M server. In FIGS. 8A-8B, the API-based interconnection (between the M2M SC server 141 and the M2M AS 62 in FIG. 8A and between the IWKF 80 and the AS 62 in FIG. 8B) is also noted, along with eHRPD/LTE based radio links 23A-23C. The non-ETSI based M2M SP network 150 in FIGS. 8A-8B is identified as "Service (Other)" (or M2M Services Other or M2M SL-OTH as mentioned before) to distinguish it from ETSI-compliant configurations 82, 88 in FIG. 3. As mentioned before, FIG. 8B relates to Case 3.2—i.e., the situation when the AN does not deploy M2M SC (i.e., AN does not have the M2M SC server like Case 3.1), but the SP network still supports a non-ETSI M2M SL architecture. Hence, in FIG. 8B, the reference numeral "86" from FIG. 3 is used to identify an Access/Transport Network configuration (which is referred to in FIG. 8B as first network configuration or NT1) that does not deploy M2M SC. Because of the absence of an M2M SC server or proxy in cellular AN 86 in FIG. 8B, the IWKF 80 may be used in the AN 86 to interwork with the non-ETSI compliant SP network 150 to enable M2M service provision in the cellular AN 86. The rest of the network elements or entities in FIG. 8B are the same as those shown in FIG. 8A and, hence, discussion of such elements/entities is not repeated herein for the sake of brevity.

Cases 3.1 and 3.2 illustrate that, in certain embodiments, it may not matter whether the AN has M2M SC server or not. In other words, Cases 3.1 and 3.2 address the case that regardless of whether ETSI M2M SC is deployed inside cellular access network (e.g., as an M2M SC server 141 in FIG. 8A), the cellular AN may still provide M2M services enablement to an M2M service provider network that deploys an M2M SL architecture other than ETSI. Hence, this option (i.e., Cases 3.1 and 3.2) may be considered similar to Case 1 (discussed above) where the M2M services are tightly coupled and the cellular access network is being used as a bit-pipe. In order for this option (i.e., Cases 3.1 and 3.2) to support the possibility of allowing the M2M service provider network to feedback across-layers M2M information to the cellular access network, it may be necessary for the M2M services provider network to support an interworking interface (e.g., the IWKF 80) to provide the information back to the cellular access network. This may be in addition to the interworking interface (not shown) that is needed to allow the M2M Services Provider network to use other (non-M2M or non-MTC) cellular access network services.

Case 4:

This case (block 129 in FIG. 7) represents an M2M Services Enablement architecture in which the cellular Access Network deploys M2M SC and the M2M Services Provider also deploys M2M SC. An SLA between AN operator and M2M SP is assumed. Such an architecture may include the arrangements shown in Option 1 as well as Option 2 in FIG. 3—i.e., the cellular AN 84 and the M2M SP network 82. Thus, in one embodiment, this Case 4 may represent the architecture 95 shown in FIG. 4 where the cellular access network 84 utilizes M2M SC 42 as an M2M SC Proxy 100 to the M2M SC Server 102 inside the M2M Services Provider network 82. This Case 4 may give greater flexibility where the cellular access network is able to offer M2M services enablement to all M2M Services Providers' deployments that are inline with ETSI M2M SL Architecture. It is also possible for this Case 4 to support non-ETSI M2M SL Architecture with the minimum changes possible so that the M2M SC (i.e., the M2M SC proxy in the AN) would also support the minimum requirements of the Non-ETSI M2M SL functionalities. For example, when the non-ETSI M2M SP network has an M2M server deployed, then the cellular AN may deploy and configure the M2M SC to function as an M2M SC proxy to this server. On the other hand, even when cellular AN deploys M2M SC as an M2M SC server, this AN's M2M server may have to be configured to function as a proxy for the non-ETSI SP's M2M server so as to facilitate "communication" between these two different entities—one ETSI-based, and the other non-ETSI based.

Case 5:

This case (block 130 in FIG. 7) addresses the situation when M2M Devices/Gateways roam. In this case, the cellular AN is a visited AN (not shown) that deploys M2M SC (in one of the manners illustrated in FIG. 3), the home network does not deploy M2M SC, and the M2M SP may or may not deploy M2M SC. In addition to appropriate SLA with the visited AN, the home network operator may also have an SLA with the M2M SP (which may be a visited M2M SP or a home M2M SP) or, in one embodiment, the home and visited SPs may have an SLA with each other. Such an arrangement is discussed under Section-II hereinbefore. In summary, it is noted that this case allows M2M Services to be routed via the visited cellular Access Network based on home AN's policy and (M2M Device's/Gateway's) M2M subscription. This option may offer greater flexibility and more control, which enable the home cellular access network to allow the visited cellular access network to directly (i.e., without home network's intervention) route some M2M services via its visited network using visited network's M2M SC (which may be configured to function as a server and/or proxy as mentioned before).

Cases 6.1 and 6.2:

These cases (blocks 131 and 136 in FIG. 7) relate to M2M service enablement by a cellular Access network in which the AN operator has no SLA with the M2M Services Provider. For these cases in which the cellular access network operator does not have an existing SLA with the M2M Services Provider, the M2M services enablement for the cellular access network becomes similar to the situation in FIGS. 8A and 8B (i.e., cases 3.1 and 3.2 discussed above) in which the cellular access network provides transport and other services to an M2M Services Provider that deploys a non-ETSI M2M SL architecture. Hence, in this option, it may not matter whether the cellular access network has an M2M SC (server/proxy) or not; the cellular access network may continue to provide M2M services enablement as discussed earlier with reference to FIGS. 8A-8B. However, if SLA is established dynamically (e.g., at the time of provisioning an M2M Service to an M2M communication entity) between the AN operator and the SP, then the cellular AN may provide M2M services enablement under one of the different cases discussed above.

Case 7:

In this case, a cellular Access Network operator offers its own M2M Services as an M2M Services Provider. Here, two sub-cases may arise: (A) When the cellular Access network deploys M2M SC (as an M2M SC server) within its own network (block 132 in FIG. 7), the following can be expected: (i) No changes for the cellular AN operator and it can use the M2M services enablement architecture as Option 2 in FIG. 3, with M2M Services network being part of the cellular access operator network. (ii) The cellular AN operator already has M2M SC deployed as an M2M server in its network and could co-locate IWKF 80 within that M2M server. (iii) The cellular access operator can use the Access Network Subscription Identifier (of an M2M communication entity) to reference the M2M services subscription. (B) In the case when the cellular AN operator does not deploy M2M SC within its own network, the following can be expected: (i) In order to comply with ETSI M2M architecture, the AN operator may need to deploy M2M SC in its network anyway to be able to provide its own M2M services to its own subscribers. (ii) If the AN operator still chooses not to deploy M2M SC, then the AN operator may face scalability problems in order to support different M2M services in an ETSI-compliant manner.

Section-IV: Exemplary Embodiments of M2M Services Enablement by Cellular Access Network as Per Teachings of the Present Disclosure The following provides a summary of exemplary embodiments of the present disclosure (which allows greater flexibility in deploying M2M services enablement by a cellular AN or any other access network as long as the access network supports the ETSI M2M SL Architecture or any architecture that is similar in concepts to the ETSI architecture) discussed hereinbefore under different sections (and illustrated as different cases in FIG. 7) in this Part One.

Embodiment 1

In this embodiment, M2M SC (e.g., the common M2M SC 42 shown in FIG. 3) is deployed and used inside the cellular AN as an M2M SC Proxy in the signaling path between the G/D-SC and an M2M SC server inside the M2M SP network as illustrated in FIG. 4, thereby optimizing M2M services enablement architecture for the cellular AN. In this embodiment, the M2M SC supports the M2M SC server functionality and is also used as a proxy to the M2M SC server that resides inside the M2M Services Provider network. The M2M SC Proxy may have access to all the M2M Devices and/or Gateways Across-Layers information that is used to enforce M2M Services enablement (in the cellular AN) and ensure proper synchronization between the M2M SP network and the cellular access network (e.g., as to QoS enforcement, M2M Device/Gateway reachability, proper billing, etc.). The use of M2M SC as a proxy may reduce M2M signaling and interworking traffic between the M2M SP network and the cellular AN by providing (the cellular AN) easy access to the M2M device and/or gateway across-layers information. In this embodiment, the M2M SP network can communicate with the cellular access network over the API interface between the M2M SC Server and the M2M SC Proxy inside the M2M cellular access network. This interface may hide the cellular access network-specific services (e.g., RAN support, switching, routing, billing, etc.) from the M2M SP network.

Embodiment 2

In this embodiment, M2M SC Proxy is used to facilitate routing of some M2M Services traffic through the visited access network when the M2M D/G roams into a cellular access network (i.e., the visited network) other than its home access network (as discussed under Section II hereinbefore). In this embodiment, the home cellular access network may use an M2M SC server in the M2M SP network (which may be a home M2M SP or a visited M2M SP). When the M2M Device and/or Gateway roams into a visited cellular access network which deploys and uses M2M SC Proxy, the home cellular access network may be able to indicate to the visited cellular access network that a specific M2M Services can be routed directly by the visited network (i.e., without home network's intervention) to the M2M SP network. This indication from the home cellular access network to the visited cellular access network may be based on the home cellular access network policy and/or the M2M Access/Transport Subscription (of the M2M device/gateway). It also could be based on the M2M Services Provider network policy and/or M2M Services subscription (of the M2M device/gateway). Some of the M2M services may be routed via the visited cellular access network to the visited M2M SP network based on an SLA agreement between home and visited M2M Services Providers.

Embodiment 3

This embodiment is from the perspective of an M2M SP in the context of FIG. 4 (like embodiment 1 discussed above). In this embodiment, the M2M SP network uses an M2M SC Proxy inside the cellular AN to provide the cellular AN with a direct access to SP's M2M Device and/or Gateway A-Layers information (e.g., an A-layers M2M Device Identifier that is used to identify an M2M device over the interface between the AN operator and M2M SP) for M2M services enablement purposes (e.g., routing, device discovery and reachability, QoS, billing, etc.). The M2M SC server inside the M2M SP network may interwork with the M2M SC Proxy inside the cellular access network at the application level. Hence, the M2M SP network may not need to support the needed interworking functionality to the cellular access network.

Embodiment 4

This embodiment is from the perspective of a cellular AN operator in the context of FIG. 4 (like embodiment 1 discussed above). An M2M SC proxy is used inside the cellular Access Network to enable M2M services enablement and communication with an M2M SP network that deploys and uses an M2M SC Server. In this embodiment, the M2M SC proxy inside the cellular AN is used to provide the cellular access network with all needed across-layers information for the M2M Device and/or Gateway that are being serviced by the M2M Services Provider network which deploys and uses an M2M SC server.

Embodiment 5

This embodiment relates to an M2M SP network that uses a non-ETSI compliant M2M SL architecture (e.g., similar to configurations in FIGS. 8A-8B) and also uses an interworking interface to feed the M2M Device and/or Gateway Across-Layers Information back to the cellular access network for M2M services enablement purposes (such as, for example, routing, device discovery and reachability, QoS, billing, etc.). In this embodiment, the M2M SP network is referred to as "M2M Services Other". Here, the M2M SP network may run its M2M services traffic (signaling and data) on the top of the transport layer, i.e., cellular access network. In this case, the M2M SP network may support an interworking interface to the cellular access network to feed back the Across-Layers information of M2M Devices and/or Gateways that are registered with the SP and may also use the cellular access network transport to allow the cellular access network to enforce the enablement of M2M services architecture (for purposes such as, for example, routing, device discovery and reachability, QoS, billing, etc.). The interworking interface between the M2M SP network and the cellular access network could be through communications with the M2M SC Server/Proxy inside the cellular access network. This means that the M2M SC Server/Proxy in the cellular AN may support interworking (e.g., through the IWKF 80) having functionality that is compatible with the M2M SL architecture that is supported by the M2M Services Provider network.

Embodiment 6

In this embodiment, like Case 1 in FIG. 7, the M2M SP network uses an M2M SC Server and an interworking interface to feed the M2M Device and/or Gateway Across-Layers Information back to the cellular access network for M2M services enablement purposes (e.g., routing, discovery and reachability, QoS, billing, etc.). In this embodiment, the cellular AN does not deploy nor use M2M SC Server/Proxy while the M2M SP network deploys and uses an M2M SC Server. In this case, the M2M SP network supports and uses an interworking interface with the cellular AN to feedback all the needed Across-Layers information to the cellular access network. This means that when an M2M application on an M2M Device and/or Gateway registers with the M2M SP network's M2M SC Server, the M2M SC Server may access (and retrieve) the A-Layers information that are related to the M2M Devices and/or Gateway (and stored, e.g., on the device/gateway) through M2M SL signaling (between the device/gateway and the M2M server) and may consequently send this information to the cellular AN over the interworking interface.

Embodiment 7

In this embodiment, the M2M SP—which does not have an existing SLA with the cellular AN operator (as discussed earlier, for example, in the context of Cases 6.1 and 6.2 in FIG. 7)—uses an interworking interface to feed the M2M Device and/or Gateway Across-Layers information back to the cellular access network for M2M services enablement purposes (e.g., routing, discovery and reachability, QoS, billing, etc.). In this embodiment, the M2M SP network does not have an existing SLA with the cellular AN operator, but M2M SP supports ETSI M2M SL architecture. In this embodiment, regardless of the M2M SC deployment in the cellular access network and the M2M SP network, the interworking situation may be similar to that in the embodiments 5 and 6 discussed above—where the M2M SP network may need to provide the cellular AN with the needed Across-Layers information for all the registered M2M devices and/or gateways. In case the M2M SP network is able to establish a dynamic SLA with the cellular access network, then the M2M services enablement architecture may follow any of the other cases discussed above or below—depending on the deployment of the M2M SC Server/Proxy.

Embodiment 8

In this embodiment, M2M SP network—which does not have an existing SLA with the cellular AN, but supports an ETSI M2M SL architecture—uses a dynamically established SLA (e.g., at the time of facilitating M2M communication for an M2M communication entity) to enable an M2M SC server inside the cellular AN to have access to SP-based A-Layers information of M2M Devices and/or Gateways (which are associated/registered with the M2M SP) for purpose of M2M services enablement (e.g., routing, discovery and reachability, QoS, billing, etc.) over the cellular AN. The M2M SP network is allowed and able to establish a dynamic SLA with the cellular access network. At this point, this embodiment may be similar to Case 2 shown in FIG. 7 at block 127.

Embodiment 9

In this embodiment, M2M SP network—which does not have an existing SLA with the cellular AN, but supports an ETSI M2M SL architecture—uses a dynamically established SLA to enable an M2M SC proxy inside the cellular AN to have access to SP-based A-Layers information of M2M Devices and/or Gateways (which are associated/registered with the M2M SP) for purpose of M2M services enablement (e.g., routing, discovery and reachability, QoS, billing, etc.) over the cellular AN. The M2M SP network is allowed and able to establish a dynamic SLA with the cellular access network. In this embodiment, the M2M SP network, based on the dynamically established SLA with the cellular AN, uses the communication between the M2M SC Server inside its network and the M2M SC proxy in the cellular access network to provide the cellular access network an access to the needed Across-Layers information. At this point, this embodiment may be similar to embodiment 3 discussed above.

Embodiment 10

In this embodiment, the M2M SP network has a non-ETSI compliant M2M SL architecture and uses an M2M SC proxy inside the cellular AN to route services signaling (SL signaling) from/to M2M Device and/or Gateway, so as to allow the cellular AN to have access to the M2M Device and/or Gateway A-Layers information for M2M services enablement purposes (e.g., routing, discovery and reachability, QoS, billing, etc.). In this embodiment, the M2M SP network does not support ETSI M2M SL architecture but has an SLA with the cellular AN operator for the M2M SP network's M2M SL to interwork with the ETSI M2M SC proxy inside the cellular AN. In this embodiment, the M2M SP network is allowed to establish the SLA dynamically if means are available. In this embodiment, the M2M SP network—based on the established SLA with the cellular AN—may use the communication between its M2M SL and the cellular AN's M2M SC proxy to provide the cellular AN with an access to all Across-Layers information that are needed for all of the registered M2M Devices and/or Gateways for this M2M SP, so as to enable M2M Services over this cellular AN. When the M2M SP's non-ETSI M2M SL acts as or similar to an M2M SC server, this embodiment may be considered similar to embodiment 3 discussed above.

Embodiment 11

In this embodiment, M2M Services for a roaming M2M Device and/or Gateway is routed through the visited cellular AN directly to the relevant M2M SP Network (e.g., a home M2M SP network) based on home cellular AN operator policy and/or M2M Access/Transport subscription (of the roaming M2M device/gateway). Similar to Case 5 (block 130) in FIG. 7, in this embodiment, the M2M SP network (Home SP) may support ETSI M2M SL architecture (with an M2M server inside its network) and may have an SLA with the (visited) cellular AN operator to enable the home M2M SP network to use the M2M SC proxy deployed inside the (visited) cellular access network. In addition, the M2M SP network (Home SP) may have an SLA with the visited M2M SP network (Visited SP). Such an SLA may support usage of another M2M SC server inside the visited SP network. In addition, the cellular access network operator (i.e., the Home Access Operator (AO)) may have a roaming SLA with the visited cellular access network operator (Visited AO). This roaming SLA may allow the Home AO M2M Devices and/or Gateways to roam into the Visited AO network. Like Case 5 in FIG. 7, in this embodiment, the home cellular AN may not deploy M2M SC. When an M2M Device and/or Gateway that subscribes to M2M services offered by the Home SP roams into the Visited AO network, the Visited AO cellular access network will have the chance to route some of the M2M services directly to the Home SP (i.e., without going through the home AO network) using Home SP's M2M SC as an M2M SC Server. On the other hand, the Visited AO cellular access network will have the chance to route some M2M services to the Visited SP network using visited AN's M2M SC as an M2M SC Proxy to the M2M SC Server inside the visited M2M Services provider (Visited SP). The decision of routing the M2M Device and/or Gateway services directly from the visited cellular access network to the M2M Services Provider (Home SP) may be based on the Home AO policy and/or the M2M Access/Transport subscription (of an M2M device/gateway) and/or the M2M Services Provider (Home SP) policy and/or the M2M Services subscription (of an M2M device/gateway). The decision of routing the M2M Device and/or Gateway services directly from the visited cellular access network to the corresponding M2M SP (Visited SP) may be based on the M2M Services Provider (Home SP) policy and/or the M2M Services subscription. The flexibility of routing the M2M Services via the visited cellular AN provides greater flexibility and routing optimization.

Embodiment 12

In this embodiment, M2M Services for a roaming M2M Device and/or Gateway are routed through the visited cellular access network directly to its M2M SP network (i.e., visited SP) based on the roaming device's/gateway's home M2M SP network policy and/or the M2M Service subscription. This embodiment is covered in embodiment 11 discussed above. However, it is additionally noted here that this embodiment gives the flexibility of offering M2M services to M2M Devices and/or M2M Gateways via the closest geographically possible M2M Services Provider (e.g., the visited SP) that has an SLA with the device's/gateway's home M2M Services Provider (Home SP).

Embodiment 13

In this embodiment, the cellular AN uses an M2M SC proxy for the M2M SC Server inside the M2M SP network (that may be within the cellular AN—i.e., a part of the cellular AN) to have a direct access to the M2M Device and/or Gateway Across-Layers Information for M2M services enablement purposes (e.g., routing, discovery and reachability, QoS, billing, etc.). This embodiment covers the use of M2M SC Proxy by the cellular access network, which may also include the M2M SP network. Other than that, this embodiment is similar to embodiment 4 discussed above.

Embodiment 14

In this embodiment, cellular AN uses an M2M SC proxy as an M2M SC server for M2M services enablement purposes (e.g., routing, discovery and reachability, QoS, billing, etc.) to serve its own M2M Devices and/or Gateways. This embodiment covers the use of M2M SC proxy as an M2M server in the case when the cellular access network operator offers its own M2M Services (similar to Case 7 shown at block 132 in FIG. 7). The cellular AN operator may use the device's/gateway's M2M Access Subscription Identifier to reference the device's/gateway's M2M Services Subscription. Otherwise, this embodiment may be similar to embodiment 4 above when the M2M SP network is considered part of the cellular access operator network.

Embodiment 15

In this embodiment, any cellular wireless Access Network (not necessarily 3GPP) may use the M2M services enablement architecture according to the present disclosure (e.g., the generic architecture shown in FIG. 3) to support and use an ETSI SL-compliant architecture to provide transport and other services to an M2M SP network. Although this disclosure is primarily described in the context of using a cellular access network as an access for the M2M services enablement architecture, all aspects of the present disclosure discussed herein are equally applicable to any other IP-based access network (e.g., a BroadBand Forum (BBF) access network) that supports and uses ETSI M2M SL architecture.

Embodiment 16

In this embodiment, the teachings of the present disclosure may be applied to any M2M SL architecture that uses the concept of the separation/distribution of the common M2M Services Capabilities (e.g., the M2M SC 42 in FIG. 3) and the M2M Application(s) Server, and/or applies the earlier-mentioned principles of ETSI M2M TC. Although this disclosure is based on ETSI M2M SL architecture and various ETSI-compliant architectures are used throughout the discussion herein, this disclosure is equally applicable to any M2M SL architecture that uses the basic principles similar to those of ETSI M2M TC (discussed earlier). In other words, any M2M SL architecture that is mainly comprised of and assumes the separation of the common M2M SC from the M2M AS and that is inline with the basic principles of ETSI M2M TC may be configured to follow the same M2M services enablement architectures as discussed herein.

Part Two

This part provides examples of signaling and other implementation details for the M2M services enablement architecture of Part One in the context of a 3GPP access network. This part addresses different options for the M2M services enablement architecture (e.g., the architecture 60 in FIG. 3) that are possible when using an M2M SL architecture as per ETSI TS 102.69. As mentioned, this part addresses a specific exemplary situation when the cellular access network in FIG. 3 is a 3GPP cellular AN or other network that uses a 3GPP EPC (such as, for example, the EPC 78 shown in FIGS. 8A-8B) or another CN having similar attributes. The discussion below (in Sections I-III) proceeds with a brief overview of certain assumptions and pre-requisites for the M2M services enablement solution (for a 3GPP access) according to particular embodiments of the present disclosure. Thereafter, the present disclosure defines a solution—referred to herein as the M2M Services Enablement Solution (MSES)—that addresses the following two main aspects: (A) First Service Initial Attach of an M2M entity with the entity's per-choice M2M Service Provider (SP), and (B) consequent Regular Attach (of the M2M entity) with the same M2M SP used during the First Service Initial Attach. In the discussion below, it is assumed that the M2M Access Device (e.g., the M2M Access Device 158 in FIG. 9 discussed below) has an M2M Access Subscription with the 3GPP Access Operator (AO). This M2M Access Subscription may have some default configuration and can be updated automatically as per the Service Initial Attach procedure discussed below.

Figure 2:
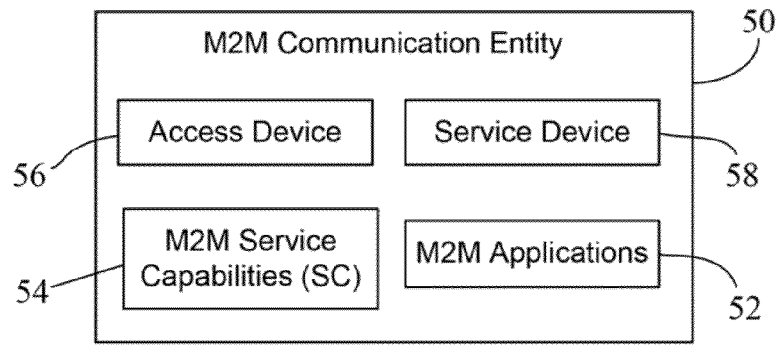
FIG. 2 shows a logical block diagram of an existing M2M communication entity that may operate from the M2M device domain.
Figure 9:
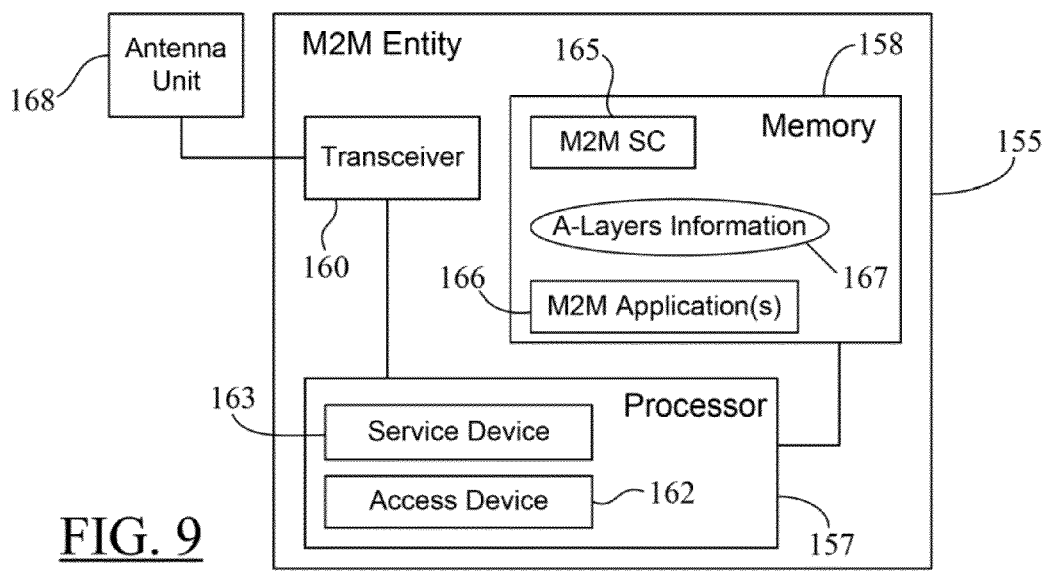
FIG. 9 shows a block diagram of an exemplary M2M communication entity according to one embodiment of the present disclosure.

FIG. 9 shows a block diagram of an exemplary M2M communication entity 155 according to one embodiment of the present disclosure. The M2M entity 155 may be substantially similar to the M2M entity 50 discussed earlier with reference to FIG. 2. Hence, a detailed discussion of various logical elements common between entities in FIGS. 2 and 9 is not provided herein for the sake of brevity. Referring now to FIG. 9, the M2M entity 155 may include a processor 157, a memory 158, and a transceiver 160. The processor 157 may include two logical M2M Devices—an M2M Access Device 162 and an M2M Service Device 163. These logical devices 162-163 may have functionality similar to corresponding logical devices 56 and 58 in FIG. 2. However, in certain embodiments, these logical devices may provide (based on suitable configuration of the processor 157 in hardware and/or software) additional functionalities discussed below with reference to FIGS. 10-16. In certain other embodiments, these logical devices 162-163 may be stored in the memory 158 and accessed by the processor 157 as needed. The memory 158 may store, for example, the entity-specific M2M SC 165, one or more M2M application(s) 166, and entity-specific A-Layers information/parameters 167 (which are already discussed before) as shown in FIG. 9. The M2M SC 165 may be similar to the M2M SC 54 in FIG. 2, and the M2M application(s) 166 may correspond to the M2M application(s) 52 in FIG. 2.

Hence, additional discussion of these elements is not provided herein. The transceiver 160 may communicate with the processor 157 to perform transmission/reception of data, control, or other signaling information (via an antenna unit 168) to/from the cellular AN (here, a 3GPP AN) with which the M2M entity 155 may communicate (using appropriate 3GPP access such as, for example, eHRPD, LTE, etc. as shown in FIGS. 8A-8B, 11, and 12) to access the entity-selected (i.e., per-choice) M2M SP to carry out M2M communications associated with corresponding M2M Services. Alternative embodiments of the M2M communication entity 155 may include additional components responsible for providing additional functionality, including any of the functionality identified herein and/or any functionality necessary to support the solution as per the teachings of the present disclosure.

In one embodiment, the M2M entity 155 may be configured (in hardware, via software, or both) to implement M2M services enablement as per teachings of the present disclosure. For example, when existing hardware architecture of the M2M entity 155 cannot be modified, the functionality desired of the entity 155 may be obtained through suitable programming of the processor 157. The execution of the program code (by the processor 157) may cause the processor to perform as needed to support the M2M services enablement solution as per the teachings of the present disclosure. In one embodiment, the logical devices 162-163 may be implemented in software and may be configured according to the teachings of the present disclosure. Thus, in the discussion below, although the M2M entity 155 may be referred to as "performing," "accomplishing," or "carrying out" (or similar such other terms) a function or process or method step, it is evident to one skilled in the art that such performance may be technically accomplished in hardware and/or software as desired. The AN operator and/or an M2M SP or a third party (e.g., manufacturer or supplier of the M2M entity 155) may suitably configure the M2M entity 155 (e.g., through hardware and/or software based configuration of the processor 157) as per the particular requirements discussed below.

As mentioned, the processor 157 may be in communication with the memory 158 to process/retrieve and store relevant information for the M2M entity 155 (e.g., entity-specific A-Layers parameters such as A-Layers M2M DIG Identifier, program code of an M2M application, etc.). The processor 157 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 155 may employ distributed processing in certain embodiments. Some or all of the functionalities described herein (e.g., with reference to FIGS. 10-16) as being provided by an M2M entity (e.g., the M2M entity 155) may be provided by the processor 157 executing instructions stored on a data storage medium or a computer-readable data storage medium, such as the memory 158 shown in FIG. 9. Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 158 may employ distributed data storage with/without redundancy.

Section-I: M2M Access Subscription Profile

For 3GPP accesses (e.g., E-UTRAN) and 3GPP2 accesses (e.g., CDMA2000 based eHRPD), the M2M Access Subscription Identifier (which may be stored in the M2M Device/Gateway using, for example, the memory 158 shown in FIG. 9) can be an M2M entity's International Mobile Subscriber Identity (IMSI) and/or Network Access Identifier (NAI), or similar other identifier. As is known, the IMSI is a unique identification associated with a mobile unit operating in GSM, CDMA, EVDO, or other mobile networks. The IMSI number may be stored inside the mobile unit itself (e.g., in a Subscriber Identity Module (SIM) card in case of a mobile phone or UE). The NAI is another way of identifying a user who requests access to a network (e.g., a wireless IP network, or a 3GPP EPC core). The NAI thus represents the user identity submitted by the client device (e.g., the M2M entity 155 in FIG. 9) during network access authentication. The M2M Access Subscription of an M2M entity may be stored in the 3GPP network (and on the M2M entity as well in certain embodiment) and may identify whether the entity's M2M Access Device 162 (FIG. 9) is being used for (or configured/authorized for) M2M services only, for M2M and regular Internet access, for regular Internet access only, or for any other combination. If the 3GPP/3GPP2 network identifies that the Access Subscription is for providing access and transport connection for the M2M entity, one embodiment of the present disclosure assumes that the following parameters are configured as part of the entity's Access Subscription profile (e.g., in the access network) in addition to other already-existing standard parameters:

(i) Access Point Name (APN) of default Access Network M2M Network Services Capabilities (N-SC). An N-SC APN identifies the N-SC and possible connectivity towards it. Thus, the default AN M2M N-SC APN may identify the 3GPP access network's default M2M SC that can be used for the Service Initial Attach (discussed later) and for provisioning of the M2M entity according to its per-choice M2M SR Because of frequent discussions of network-based SC and device/gateway based SC under this Part Two, the term "N-SC" is used to distinguish a network-based SC (whether in the AN and/or in the SP network) from an entity-specific SC (such as D/G-SC 165 in FIG. 9). In the context of the generic architecture in FIG. 3, such N-SC is the network-deployed version of the common M2M SC 42.

(ii) Whether this Access Subscription is for an M2M Device or M2M Gateway—i.e., whether the M2M entity 155 (FIG. 9) is a device (including, for example, an M2M communication capable UE, as mentioned earlier) or a gateway.

Section-II: M2M Service Device Pre-Provisioning

According to one embodiment of the present disclosure, the following is a list of pre-defined assumptions and prerequisites for the M2M Service Device (e.g., the service device 163 in FIG. 9) prior to its First Service Initial Attach (discussed later below) to its per-choice M2M Services Provider.

(i) It is assumed that the M2M Service Device is pre-provisioned (e.g., by the access network operator in which the corresponding M2M entity is a subscriber, M2M entity's manufacturer, or other third party configuring the M2M entity for M2M communications) with a D/G-SC that conforms with ETSI M2M SL.

(ii) It is assumed that the M2M Service Device is pre-provisioned/associated with at least one M2M application (e.g., the M2M application(s) 166 in FIG. 9), or such an application can be downloaded immediately after service device's Initial Attach (discussed later below).

(iii) It is assumed that the M2M Service Device is pre-provisioned with its per-choice M2M Service Provider information (e.g., SP name or identity) and associated M2M Service Subscription Identifier. In one embodiment, the M2M Service Subscription Identifier could be temporary (e.g., a contract number).

(iv) The M2M Service Device may be pre-provisioned with the A-Layers M2M Device/Gateway Identifier. This could be done by the M2M Service Provider alone, through coordination between the M2M Service Provider and the access network operator, and/or by some other entity (e.g., M2M device/gateway manufacturer) that is trusted by the M2M Service Provider and/or the Access Network Operator.

(v) In one embodiment, the M2M Service Device D/G-SC may be pre-provisioned with N-SC information of M2M entity's per-choice M2M Service Provider and its reachability (e.g., APN of such SP N-SC). However, this may not be required for the M2M services enablement solution discussed herein.

(vi) It is assumed that the M2M Service Device D/G-SC may dynamically and mutually authenticate with the 3GPP Access Network default M2M N-SC. The mutual authentication with the 3GPP access network default N-SC may enable the D/G-SC to provide its Service Provider reachability information to the access network default N-SC. The reachability information may include only public information that reflects the identity of the Service Provider.

Section-III: M2M Service Subscription Profile

It is noted here that the discussion of M2M Service Device pre-provisioning is primarily relative to the Service Initial Attach procedure discussed below. In that regard, it is assumed that the M2M Service Device is pre-provisioned with an M2M Service Subscription Identifier that is unique within the Service Provider network. As mentioned before, in one embodiment, such M2M Service Subscription Identifier may be temporary (e.g., a Service Provider contract number that can be used during initial attach to configure the M2M Service Device with its permanent M2M Service Subscription Identifier and the A-Layers M2M Device/Gateway Identifier). It is further assumed that the M2M Service Device is pre-provisioned or is dynamically able to retrieve (e.g., from a corresponding M2M Service Provider) or be provisioned with security credentials that can be used to secure communication with the M2M Service Provider and at the same time mutually authenticate with the M2M Service Provider network.

Section-IV: M2M Entity Attaches to a 3GPP/3GPP2 Access Network

Some of the basic aspects of the M2M services enablement solution (in the context of a 3GPP AN as an example) according to particular embodiments of the present disclosure are as follows. (A detailed discussion of the device attachment procedure is provided later below.)

(i) Force the M2M entity's (device/gateway) first attach to the Access Network to be directed to the Access Network default M2M N-SC.

(ii) M2M entity's Service Device registers with the Access Network default N-SC based on the M2M entity's Service Subscription and the network architecture of the M2M entity's per-choice Services Provider.

(iii) Provision the M2M entity (as discussed in more detail, for example, in Section-V below) and consequently inform the Access Network with the details of the entity-specific A-Layers parameters including, for example, the A-Layers M2M Device/Gateway Identifier.

(iv) Update the M2M entity's Access Subscription (e.g., as part of the entity's Access Subscription profile in the access network) with the regular M2M N-SC APN that is based on the M2M entity's per-choice M2M Services Provider. This may include a possible update to the corresponding Access Subscription (stored) on the M2M entity.

(v) Future M2M Regular Attaches (to the M2M entity's per-choice M2M SP) may be directed to the new (regular) M2M N-SC APN, which directs the M2M entity to the respective M2M N-SC inside the Access Network or the Services Provider network.

Figure 10:
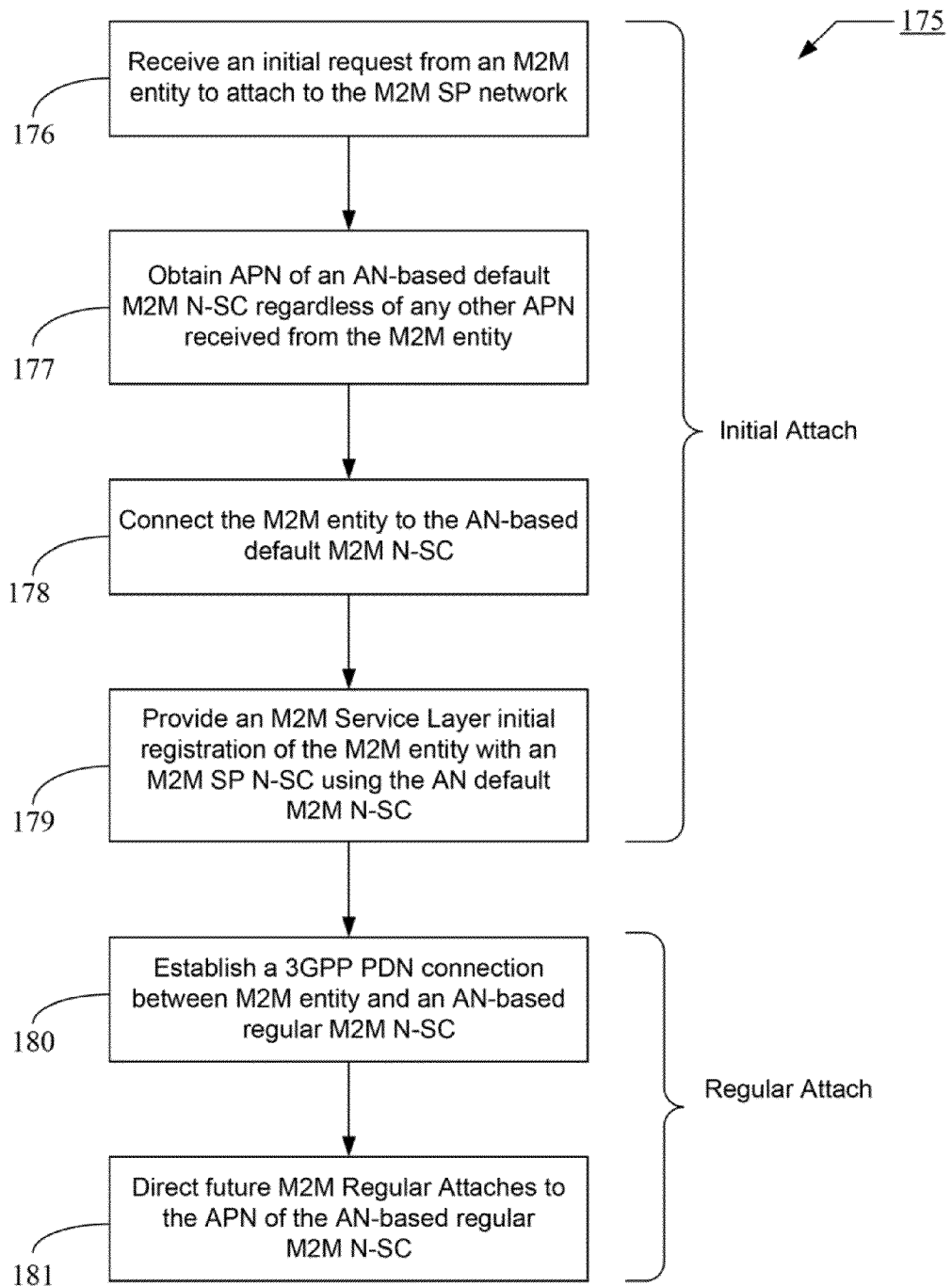
FIG. 10 depicts an exemplary flowchart providing an overview of how an M2M entity attaches to a per-choice M2M SP network in a 3GPP M2M services enablement solution according to one embodiment of the present disclosure.

FIG. 10 depicts an exemplary flowchart 175 providing an overview of how an M2M entity (e.g., the M2M entity 155 in FIG. 9) attaches to a per-choice (i.e., entity-selected) M2M SP network in a 3GPP M2M services enablement solution according to one embodiment of the present disclosure. In one embodiment, various exemplary steps illustrated in FIG. 10 (and discussed in detail later with reference to FIGS. 11-16) may be performed by a 3GPP access network. Examples of high-level messaging flows associated with Initial and Regular Attach procedures are discussed later with reference to FIGS. 14-16. As mentioned before, the discussion under this Part Two focuses on the M2M services enablement solution for 3GPP accesses and other accesses that use 3GPP EPC (e.g., CDMA2000 eHRPD). As part of the Initial Attach procedure (blocks 176-179 in FIG. 10) according to one embodiment, the 3GPP AN receives an initial request from the M2M entity to attach to the entity-selected M2M SP network (block 176). The initial request may include an entity-specific M2M Access Subscription Identifier (e.g., IMSI and/or NAI as mentioned before). In response, at block 177, the 3GPP AN may obtain an APN of an AN-based default M2M N-SC (i.e., N-SC residing in, located in, or deployed in the AN) regardless of any other APN received from the M2M entity as part of the initial request. Thereafter, the access network may connect the M2M entity to the AN-based default M2M N-SC using the APN of the AN default M2M N-SC (block 178). The 3GPP AN may then use the AN-based default M2M N-SC to provide an M2M SL initial registration of the M2M entity with an M2M SP N-SC (block 179). The Regular Attach (blocks 180-181) may begin after the M2M SL initial registration. As part of the Regular Attach according to one embodiment, the AN may establish a 3GPP PDN connection between the M2M entity and an AN-based regular M2M N-SC serving the M2M entity-chosen M2M SP (block 180). Thereafter, the 3GPP AN may register the M2M entity with the AN-based regular M2M N-SC using M2M SL signaling. As mentioned before, future M2M Regular Attaches may be now directed to the (new) regular M2M N-SC APN, which directs the M2M entity to the respective M2M N-SC inside the Access Network or the Services Provider network (block 181).

Section-V: Details of M2M Entity's First SP Network Initial Attach and Consequent Regular Attach This section provides technical details of different aspects of the 3GPP M2M services enablement solution in the context of how an M2M entity's Service First Initial Attach and the consequent Regular Attach are performed in particular embodiments of the present disclosure. The subsection V(A) below details the Initial Attach aspect, whereas the subsection V(B) below discusses the Regular Attach aspect. It is noted here that the terms "Service First Initial Attach," "First SP Network Initial Attach," "Initial Attach", "First Initial Attach," or terms having similar import (as evident from their context of discussion) are used interchangeably herein to refer to a process when a new M2M entity registers with the M2M SP network for the first time (e.g., when powered-up for the first time). Generally, such Initial Attach procedure may be performed only once during the lifetime of the M2M entity. In other words, once the M2M entity successfully concludes its First Initial Attach, subsequent network attachment requests from the M2M entity may be processed using a Regular Attach procedure, different embodiments of which are discussed below.

Subsection V(A): M2M Entity's First SP Network Initial Attach

Figure 11:
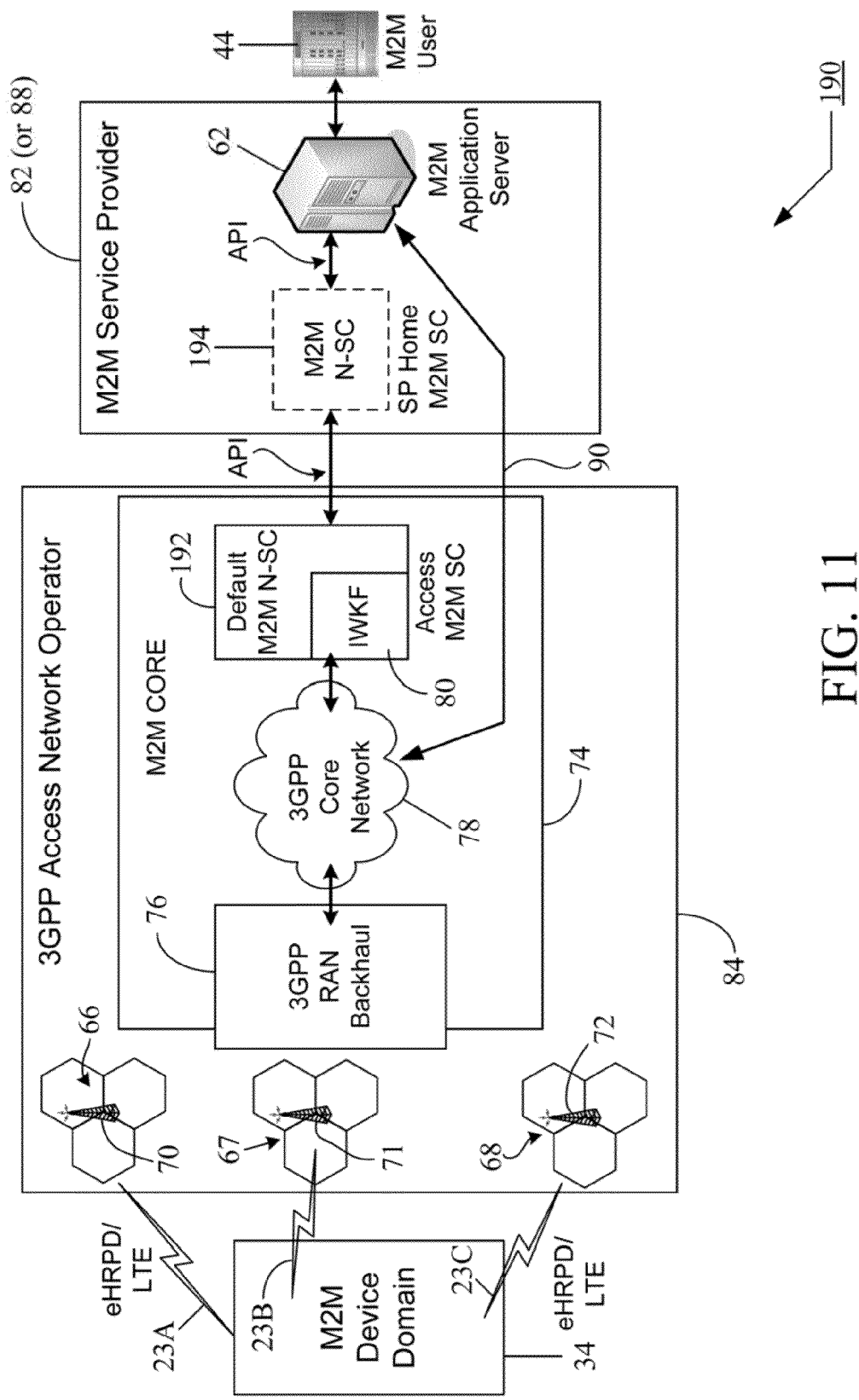
FIG. 11 shows an exemplary network architecture depicting usage of an AN-based default M2M N-SC during an M2M entity's SP network Initial Attach according to one embodiment of the M2M services enablement solution for 3GPP accesses.

FIG. 11 shows an exemplary network architecture 190 depicting usage of an AN-based default M2M N-SC 192 during an M2M entity's SP network Initial Attach according to one embodiment of the M2M services enablement solution for 3GPP accesses (or other accesses that use 3GPP EPC such as, for example, CDMA2000 eHRPD). The M2M entity may be any of the M2M communication entities 24-32 operating in the M2M device domain 34 as illustrated in FIG. 1. As mentioned before (e.g., with reference to FIGS. 4 and 8A-8B), for ease of discussion and context, similar reference numerals are used for functionally-similar network elements/components (e.g., backhaul, core network, AS, etc.) between the generic configuration in FIG. 3 and specific 3GPP-based configuration in FIG. 11. Thus, for example, reference numeral "84" is used to refer to the 3GPP Access Network in FIG. 11 which can be considered as a specific implementation (here, a 3GPP-based implementation) of the generic cellular access network 84 in FIG. 3. Similarly, the same reference numeral "74" is used to conveniently refer to the M2M cores in FIGS. 3 and 11, even when, strictly speaking, the technical configurations of the two M2M cores may be different (e.g., the M2M core in FIG. 11 contains a default M2M N-SC 192 which is not the case in case of the M2M core in FIG. 3). Similar reasoning applies to other network elements (e.g., M2M device domain, backhaul, CN, SP network, AS, etc.) as well. The use of common reference numerals (to the extent relevant or desirable) between the generic configuration 60 in FIG. 3 and its exemplary implementations through the specific configurations in FIGS. 4, 8A-8B, and 11-12 is merely to provide easy contextual reference and illustrate overall similarities between the architectures in FIG. 3 and in such other figures—i.e., how the architectures in FIGS. 4, 8A-8B, and 11-12 are based on the generic architecture in FIG. 3; it does not necessarily imply that architectures in FIGS. 3-4, 8A-8B and 11-12 are all identical or virtually similar in all aspects without any distinctions.

As with other figures, no further details of previously-discussed network elements/components are repeated herein for the sake of brevity. It is noted, however, that in the configuration 190 in FIG. 11, the 3GPP AN 84 deploys the common M2M SC 42 (as a default M2M N-SC 192 during Initial Attach, and as a regular M2M N-SC during Regular Attach), but the deployment of the common M2M SC 42 (FIG. 3) in the M2M SP network may be optional (as shown by the dotted block 194) based on a specific M2M services enablement architecture configuration (from different configurations shown in FIG. 3) supported by the M2M SP. Thus, depending on whether the M2M SP deploys the M2M SC 42 in its network, the M2M SP network may be referred to using reference numerals "82" (with M2M SC) or "88" (without M2M SC) (in the context of different SP network configurations shown in FIG. 3). It is observed here that the terms "default M2M N-SC" and "regular M2M N-SC" do not imply existence of different N-SCs within the AN 84; rather, the same M2M SC (e.g., the common M2M SC 42 in FIG. 3) may be deployed in the AN 84 with different functionalities—as a "default" M2M N-SC every time an M2M entity (e.g., the M2M entity 155 in FIG. 9) attempts an Initial Attachment (e.g., upon power-up), and as a "regular" M2M N-SC for subsequent Regular Attaches. Thus, a "regular" M2M N-SC may be considered as a subset of the "default" M2M N-SC. The default M2M N-SC may be used as a "default" (to provide "default" functionalities) for all Initial Attach requests and may have additional functionalities than the "regular" M2M N-SC to be able to handle Initial Attachment for all M2M entities. On the other hand, the "regular" M2M N-SC functionality may be specific to a given M2M entity and may be "triggered" (or "activated") to serve the M2M entity's per-choice M2M Service Provider during Regular Attach. However, in one embodiment, the default M2M N-SC functionality and the regular M2M N-SC functionality may be the same for an M2M entity. Furthermore, in one embodiment, where the M2M SC 42 is deployed in both the networks—i.e., in the 3GPP AN 84 (e.g., as an M2M SC proxy) as well as in the M2M SP network 82 (e.g., as an M2M SC server)—the overall architectural configuration in FIG. 3 may be similar to that shown in FIG. 4.

The following is an exemplary sequence of events detailing how an M2M entity first attaches (referred to here as "Initial Attach" or "First Initial Attach" as mentioned earlier) to the M2M SP network 82 (or 88) according to one embodiment of the present disclosure. In other embodiments, the sequence of steps below may be performed in a different order.

(1) As mentioned in Section-I under this Part Two, the M2M Access Device (e.g., the M2M Access Device 162 in FIG. 9) may be preconfigured with an Access Network Subscription Identifier (which may identify an M2M Access Subscription of the corresponding M2M entity 155).

(2) The M2M Access Subscription Identifier may point to the M2M entity's Access Subscription, which may contain the APN of the AN-based default M2M N-SC 192 (FIG. 11) as also mentioned in Section-I (Part Two) above. The M2M Access Device may be pre-configured with this APN of the default AN N-SC or may not be pre-configured with any such APN.

(3) Upon receiving the M2M entity's request (which may be sent using entity's M2M access device) for the Service First Initial Attach, the 3GPP AN 84 (FIG. 11) may use the Access Network default M2M N-SC APN to establish a connection to the Access Network default M2M N-SC Platform 192. In other words, regardless of the APN the M2M entity may provide during its first Service Attach attempt, the 3GPP AN 84 may override this entity-supplied APN with the AN default M2M N-SC APN that is configured as part of the M2M entity's M2M Access Subscription stored in the 3GPP AN 84. [In one embodiment, the 3GPP AN 84 may recognize the First Initial Attach when the M2M entity's AN-based M2M Access Subscription does not contain any APN other than the Access Network default M2M N-SC APN.]

(4) When the M2M entity connects to the Access Network default M2M N-SC 192 (e.g., using entity's M2M access device), it may present (e.g., using entity's M2M service device) the M2M Services Subscription Identifier (mentioned in Sections II and III above under this Part Two) to the 3GPP AN 84. This Services Subscription Identifier may help the AN default M2M N-SC 192 to identify the M2M entity's per-choice M2M Services Provider and to also consequently identify—based on the Service Level Agreement (SLA)—the M2M services enablement architecture that is supported by the entity-selected M2M SP network with respect to the common M2M N-SC (or M2M SC) 42 in FIG. 3 (e.g., whether SP network implements an ETSI-compliant or non-compliant M2M services enablement architecture, whether the SP network also deploys its M2M N-SC, etc.).

(5) The Access Network default M2M N-SC 192 may execute the initial M2M SL Registration (for the M2M entity 155) based on the M2P SP's respective M2M services enablement architecture and may communicate with the M2M SP N-SC 194 (if available) for the following: (a) The configuration and allocation of the A-Layers M2M Device/Gateway Identifier. (b) The configuration, allocation and registration of the D/G-SC Identifier. (c) The identification of the possible M2M Application Identifiers that are supported on the M2M Service Device 163 (FIG. 9) that is using this M2M Access Device 162 (FIG. 9) which is currently communicating with the 3GPP AN 84. (d) All other A-Layers required parameters. (It is noted here that although an M2M D/G's External Identifier is used herein as an example of an A-Layers parameter, the present disclosure contemplates usage of other A-Layers parameters (if needed) that may be specified in future by 3GPP, 3GPP2, or other cellular specifications.)

In the embodiment in which the M2M SP does not deploy M2M SP N-SC (e.g., the embodiment shown in FIG. 12), the AN default M2M N-SC may still obtain the above mentioned information as discussed below under Case 1 in Section-VI.

(6) After the above step (5) or in parallel thereto, the AN default M2M N-SC 192 may update the M2M Access Device Subscription (i.e., M2M Access Subscription of the M2M Access Device 162 in the M2M entity 155) in the home access network (i.e., the 3GPP AN 84). This entity-specific M2M Access Subscription may reside in, for example, a Home Subscriber Server (HSS) (not shown in FIG. 11, but shown in FIG. 12), and may be updated there with the following information: (a) The A-Layers M2M DIG Identifier. (b) The M2M N-SC APN (for SL signaling and data to the respective M2M N-SC). This APN may refer to the AN regular M2M N-SC (e.g., the M2M N-SC 198 in FIG. 12) that is associated with or that specifically serves the M2M entity's per-choice M2M SP and that is to be used during "Regular Attach" (described below). (c) Other relevant and necessary information to support M2M communications from the M2M entity 155.

This step (6) also may include dynamic update (by the AN default M2M N-SC) of the M2M Access Subscription on the M2M entity with the same information.

(7) In addition, the AN default M2M N-SC 192 may communicate to the Subscriber Profile Repository (SPR) (not shown) in the AN's HSS to update the M2M Access Policy Subscription (also referred to as "M2M Access Subscription") with the respective QoS that are required to support the M2M Services applications 166 hosted by the M2M Service Device 163 (FIG. 9). Similarly, the M2M SP network also may be updated with similar information (e.g., the M2M SP N-SC 194 may be updated if deployed).

Subsection V(B): M2M Entity's subsequent Regular Attach

After the First Service Initial Attach is performed (as discussed under subsection V(A) above) and the M2M entity is provisioned with all needed parameters related to M2M Access Subscription, A-Layers parameters, and all other parameters, the M2M entity may reboot or re-attach to its per-choice SP network for all the provisioning changes to take place. This means, in one embodiment, the M2M entity may perform a Regular Attach (as part of its reboot or re-attachment) as given below.

Figure 12:
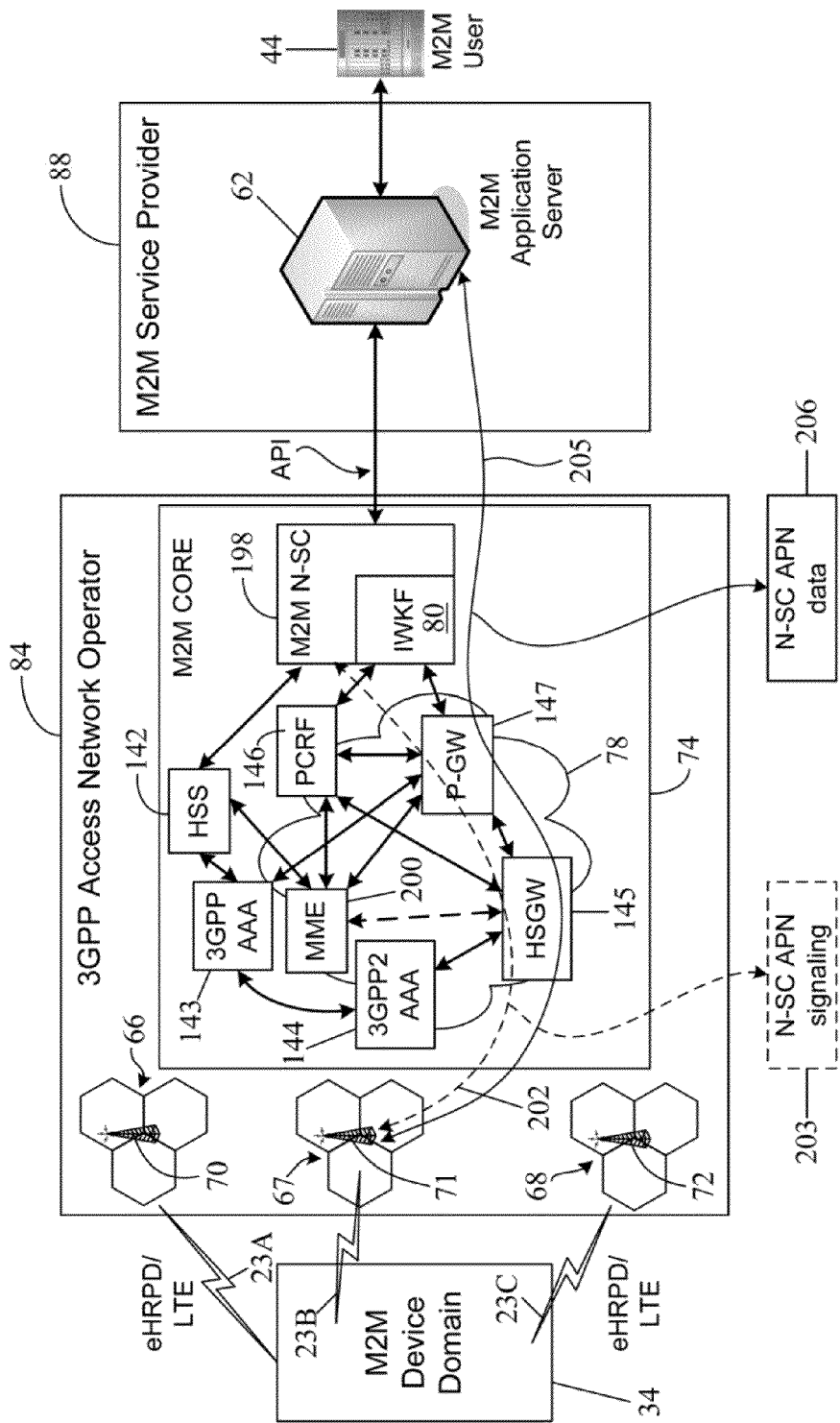
FIG. 12 depicts an exemplary network architecture illustrating usage of an AN-based regular M2M N-SC during an M2M entity's Regular Attach with an M2M SP network according to one embodiment of a 3GPP M2M services enablement solution as per teachings of the present disclosure.

FIG. 12 depicts an exemplary network architecture 196 illustrating usage of an AN-based regular M2M N-SC 198 during an M2M entity's (e.g., the M2M entity 155 in FIG. 9) Regular Attach with an M2M SP network 88 according to one embodiment of a 3GPP M2M services enablement solution as per teachings of the present disclosure. In the embodiment of FIG. 12, the M2M N-SC (i.e., the common M2M SC 42 in the context of the generic architecture in FIG. 3) resides in the 3GPP AN 84 only (e.g., as an M2M N-SC server). Although FIGS. 8A-8B relate to a non-ETSI SP network 150, the same reference numerals are used for the 3GPP AN elements in FIGS. 8A-8B and 12 for ease of discussion and to denote same/similar elements in the access network portion of these figures. However, a Mobility Management Entity (MME) 200 is additionally shown as part of the 3GPP core network 78 in FIG. 12 to provide context for various messaging flows discussed later with reference to FIGS. 14-16. As before, discussion of network components/elements addressed earlier is not repeated here for the sake of brevity. Prior to continuing discussion of the Regular Attach mechanism, it is emphasized here that different reference numerals "192" and "198" are used to refer to AN default M2M N-SC and AN regular M2M N-SC, respectively, for ease of discussion only. As mentioned earlier, the terms AN "default" M2M N-SC and AN "regular" M2M N-SC refer to different functionalities of the same N-SC; the default M2M N-SC 192 being used for the SP network Initial Attach (e.g., until the identity of the M2M entity's per-choice M2M SP is made known to the 3GPP AN) and the regular M2M N-SC 198 (that is associated with or that specifically serves the M2M SP identified by the M2M entity during Initial Attach, for example) being used for the subsequent Regular Attach to the SP network. Furthermore, whether M2M N-SC is deployed as a proxy or server within the 3GPP AN, such M2M N-SC proxy/server may be suitably configured to perform the functionality of a default M2M N-SC and/or a regular M2M N-SC.

The following is an exemplary sequence of events detailing how an M2M entity accomplishes Regular Attach to its per-choice M2M SP network (here, the SP network 88 in FIG. 12) according to one embodiment of the present disclosure. In other embodiments, the sequence of steps below may be performed in a different order.

(1) As part of the Regular Attach, the M2M Access Device (e.g., the M2M access device 162 in the M2M entity 155 in FIG. 9) may use the N-SC APN (i.e., the APN of the AN-based regular M2M N-SC 198, which may function as an AN M2M N-SC server in one embodiment) that was provisioned (e.g., as part of update of M2M Access Subscription residing on the M2M entity) during the Service First Initial Attach. However, if the M2M entity is somehow not configured with this APN (of the AN regular M2M N-SC), its M2M Access Device may use the NULL APN. The M2M access device may follow all the details of the respective 3GPP protocol to establish a 3GPP Packet Data Network (PDN) connection to the M2M N-SC 198 (FIG. 12).

(2) The M2M entity (e.g., through its M2M Access Device) may use the M2M SL signaling to register with the AN-based M2M N-SC 198 that serves the M2M entity-selected SP 88. The 3GPP AN may then direct future communications (including future requests for Regular Attaches) from the M2M entity to the APN of this regular M2M N-SC 198, thereby establishing regular attachment of the M2M entity with the M2M entity's per-choice SP 88. In FIG. 12, the SL signaling APN may refer to the AN-based M2M N-SC 198. Hence, SL signaling from an M2M entity (not specifically shown in FIG. 12) in the M2M device domain 34 to the AN-based M2M N-SC 198 is indicated by the bi-directional dotted arrow 202 and block 203. On the other hand, SL data APN may refer to the SP-based AS 62. Hence, in FIG. 12, subsequent SL data transfer between the M2M entity and its per-choice M2M SP 88 (with which the M2M entity is now attached) through the AN-based regular M2M N-SC 198 is illustrated using the bi-directional arrow 205 and block 206.

Section-VI below describes how different M2M services enablement architecture options work as per various embodiments of the present disclosure.

(3) During M2M entity's registration with the assigned N-SC (i.e., the M2M N-SC 198) as per the N-SC APN, the M2M entity may provide (e.g., through its M2M access device) its A-Layers M2M D/G Identifier, which may be used across the Service and Transport layers to identify the M2M entity and its reachability at all times as long as the M2M D/G-SC is registered with the AN regular M2M N-SC 198. It is observed here that, in one embodiment, if an M2M entity is not registered with the AN, it may not be reachable by the M2M SP network for M2M services.

(4) In one embodiment, as a result of the Initial Attach procedure mentioned before, the AN regular M2M N-SC 198 may have access to the A-Layers M2M Device/Gateway Identifier and may also have mapping of this A-Layers M2M D/G Identifier to one or more of the following parameters that are related to the M2M Access Device (e.g., access device 162 in FIG. 9) and/or M2M Service Device (e.g., service device 163 in FIG. 9):

(a) M2M D/G Access Subscription Identifier (e.g., IMSI and/or NAI);

(b) M2M Device/Gateway Transport Address, which may be, for example, an Internet Protocol (IP) version 6 (IPv6) address, an IPv6 Network Prefix, an IPv4 address, an IPv4 address along with a port number, etc.;

(c) M2M Device/Gateway Circuit Switched (CS) Transport Address such as, for example, a Mobile Subscriber ISDN number (MSISDN) (where "ISDN" refers to "Integrated Services Digital Network"), a Mobile Directory Number (MDN), etc. This may be possible if the M2M Device/Gateway supports CS access via Short Message Service (SMS); and (d) Any other relevant parameter selected/needed by the 3GPP AN operator for 3GPP M2M services enablement solution according to particular embodiments of the present disclosure.

Figure 13:
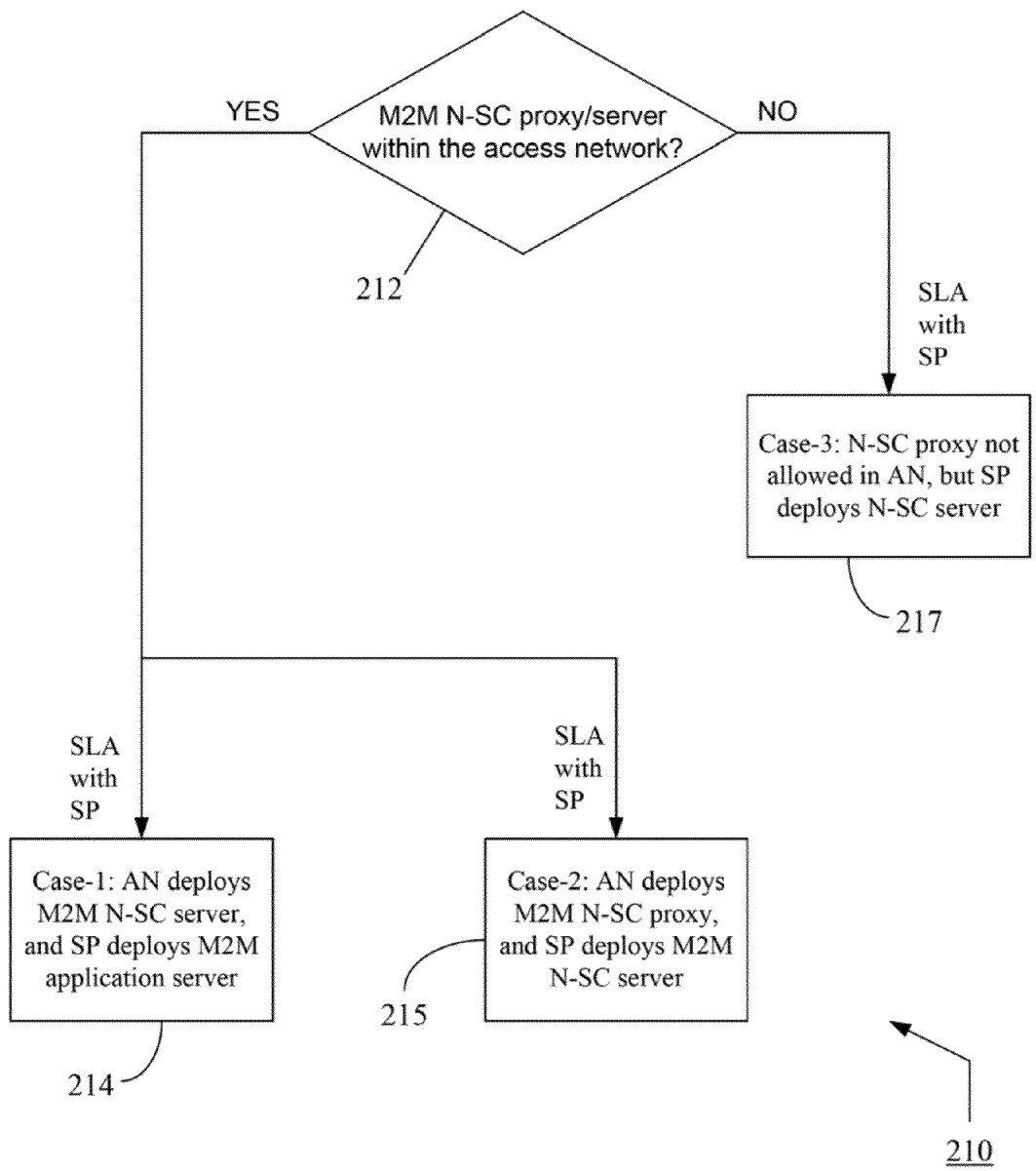
FIG. 13 provides an overview of exemplary architectural cases that address M2M services enablement for a 3GPP AN.

Section-VI: Exemplary Architecture Cases for 3GPP M2M Services Enablement Solution FIG. 13 provides an overview of exemplary architectural cases that address M2M services enablement for a 3GPP AN (e.g., 3GPP versions of the AN 84 or 86 in FIG. 3). FIG. 13 is a simplified illustration for easy reference when discussing each case in detail below. As shown at block 212 in FIG. 13, the architectural cases may be divided into two broad categories based on whether the common M2M SC (e.g., the M2M SC 42 in FIG. 3) is deployed (as M2M N-SC proxy and/or server) within the 3GPP AN or not. If the M2M N-SC is within the 3GPP AN, then two cases 214-215 address the situation where 3GPP AN operator has a Service Level Agreement (SLA) with the M2M Service Provider (SP): Case 1 (block 214) addresses the situation in which M2M SC is deployed within the 3GPP AN only—as an M2M N-SC server, while M2M SP deploys M2M AS 62; in Case 2 (block 215), the M2M N-SC is deployed within the 3GPP AN as an M2M N-SC proxy, whereas the M2M SP deploys a corresponding M2M N-SC server—i.e., the 3GPP AN and the M2M SP both deploy M2M SC (e.g., the common M2M SC 42 shown in FIG. 3). On the other hand, Case 3 (block 217) addresses the situation where 3GPP AN has an SLA with the M2M SP (which deploys its M2M SC as an M2M N-SC server), but M2M N-SC proxy may not be allowed in the 3GPP AN.

It is noted here that discussion in Section-V (including sub-sections V(A) and V(B)) above under this Part Two assumes that the M2M N-SC belongs to the 3GPP AN operator 84 and performs functionality of the M2M N-SC server and/or proxy. For example, in the embodiment of FIG. 11, the default M2M N-SC 192 may function as an M2M N-SC proxy when the M2M SP also deploys M2M N-SC as M2M N-SC server 194. On the other hand, in the embodiment of FIG. 12, the AN regular M2M N-SC 198 may function as an N-SC server. As mentioned earlier with reference to FIG. 7, when an M2M SC is deployed within the 3GPP AN, the M2M SC may be deployed either as an M2M N-SC server or as an M2M N-SC proxy or both (as an M2M N-SC server for one Service Provider and as an M2M N-SC proxy for another Service Provider). Thus, in the discussion in Section-V, the 3GPP AN 84 may have a dynamic access to all A-Layers information of the registered M2M service device (e.g., the service device 163 of the M2M entity 155 in FIG. 9), which uses corresponding M2M access device (e.g., the access device 162 in FIG. 9) that utilizes an Access Subscription (of the M2M entity 155) that belongs to the 3GPP AN operator. However, as discussed under Part One above, there are several architectural options that use different deployments of the M2M N-SC and that are based on whether there is an SLA between the 3GPP AN operator and the per-choice M2M SP. From these different deployment options, this Section-VI relates to those M2M services enablement architecture options that use 3GPP Access Network with an assumption that an SLA exists between the 3GPP AN operator and the M2M Services Provider. Each of the architectural cases identified in FIG. 13 is now described in detail.

Case 1:

In this case (block 214, FIG. 13), SLA exists between the 3GPP AN operator and M2M entity's per-choice M2M SP, an M2M N-SC server is deployed inside the 3GPP AN, and the M2M SP deploys the M2M AS. Architecturally, this case may be similar to the configuration 196 in FIG. 12.

(A) Service First Initial Attach: In this case, during M2M entity's Initial Attach, the AN-based M2M N-SC server (which may function as AN default M2M N-SC 192 discussed with reference to FIG. 11) may communicate with the M2M SP (e.g., the M2M SP 88 in FIGS. 11-12) using the M2M SL API to communicate all information related to A-Layers M2M D/G Identifier, other information that may be needed by the M2M SP (e.g., M2M Service Subscription Identifier), and other information that may relate to the M2M Service Device (in the M2M entity) such as, for example, M2M D/G-SC Identifier and whether it needs to be dynamically configured, etc. Overall, the Initial Attach mechanism in this Case 1 is very similar to the details and scenario discussed under sub-section V(A) above (in this Part Two) and, hence, such details are not repeated here for the sake of brevity.

(B) Consequent Regular Attach:

The Regular Attach under this Case 1 may be exactly like what is described in sub-section V(B) above (under this Part Two) and, hence, such details are not repeated here for the sake of brevity.

Case 2: In this case (block 215, FIG. 13), SLA exists between the 3GPP AN operator and M2M entity's per-choice M2M SP, an M2M N-SC server is deployed inside the M2M SP (e.g., the M2M N-SC 194 in FIG. 11 deployed as an N-SC server), and the 3GPP AN deploys M2M N-SC proxy (e.g., the default M2M N-SC 192 in FIG. 11 functioning as N-SC proxy). Architecturally, this case may be similar to the configuration 95 in FIG. 4.

(A) Service First Initial Attach: Overall, the Initial Attach mechanism in this case is very similar to the details and scenario described under sub-section V(A) above, and, hence, only a brief discussion of certain additional aspects is given here. In this case, the 3GPP AN default M2M N-SC may be the same as the default M2M N-SC 192 in FIG. 11, but it may perform the functionality of an M2M N-SC proxy (within the 3GPP AN). During M2M entity's Initial Attach, the AN-based M2M N-SC proxy may communicate with the M2M SP N-SC server (e.g., the M2M N-SC server 194 in FIG. 11) using the M2M SL API to communicate all SL signaling messages, while being able to receive or intercept all the A-Layers M2M Device/Gateway information as described under sub-section V(A) above. After Initial registration (during Service First Initial Attach), the M2M Access Device Subscription may be updated with the M2M N-SC APN, which, in this case, may reference the M2M SP's M2M N-SC 194 (FIG. 11) as the N-SC server. In one embodiment, it also may be possible to reference the N-SC proxy in the 3GPP Access Network which proxies signaling information to the M2M N-SC server in the SP network.

(B) Consequent Regular Attach:

The Regular Attach under this Case 2 may be exactly like what is described in sub-section V(B) above, except that the M2M N-SC inside the 3GPP AN now performs as an M2M N-SC proxy. In other words, the M2M N-SC proxy inside the 3GPP AN in this case performs the same functionality as those of the M2M N-SC server discussed under sub-section V(B) above.

Case 3: In this case (block 217, FIG. 13), SLA exists between the 3GPP AN operator and M2M entity's per-choice M2M SP and an M2M N-SC server is deployed inside the M2M SP (e.g., the M2M N-SC 194 in FIG. 11 deployed as an N-SC server), but the 3GPP AN M2M N-SC proxy may not be allowed (i.e., the M2M SP N-SC 194 may not have access to or authorization to use the proxy functionality that may be supported, for example, by the AN default M2M N-SC). Architecturally, this case may be similar to Option-1 discussed earlier with reference to FIG. 3.

(A) Service First Initial Attach:

After the AN default M2M N-SC identifies that the M2M SP SLA indicates that the SP network allows only an M2M N-SC server inside the SP network, but does not allow any M2M N-SC proxy inside the 3GPP Access Network (i.e., the AN default M2M N-SC may not function as a proxy like in Case-2 discussed above), the AN default M2M N-SC may perform one of the following two options:

(i) Option 1: In this option, the AN default M2M N-SC may provide the (M2M entity's) D/G-SC (e.g., the entity-specific M2M SC 165 shown in FIG. 9) with the Services Provider N-SC identity and/or reachability information and instruct the D/G-SC that it must update the Access Network default M2M N-SC with the needed (across layers) information after it successfully completes its initial registration with its SP N-SC (which is deployed as an N-SC server as mentioned above). Thus, instead of obtaining such A-Layers parameters and other information from the M2M SP N-SC (as discussed under sub-section V(A) above), in this option, the AN default M2M N-SC may obtain relevant information from the D/G-SC.

After the M2M entity completes the procedure of initial attach registration, the D/G-SC may perform an SL initial registration update with the Access Network default M2M N-SC. In this step, the D/G-SC may provide the needed (A-Layers) information to the Access Network default M2M N-SC to perform M2M Access Subscription Update (MASU). This MASU may include the AN default M2M N-SC updating, for example, the (home) 3GPP AN with the AN regular M2M N-SC APN that points to the proper P-GW which will serve the M2M signaling and data traffic between this M2M entity and its M2M Service Provider.

After successfully performing the M2M Access Subscription Update, the Access Network default M2M N-SC may indicate success to the D/G-SC and update the M2M Device/ Gateway Access Subscription on the M2M Device/Gateway if possible (as mentioned in sub-section V(A) above).

(ii) Option-2:

In this option, the Access Network default M2M N-SC may provide the (M2M entity's) D/G-SC with the Services Provider N-SC identity and/or reachability information as in Option-1 above (under this Case 3) and may also provide an indication for the SP N-SC (which is deployed as an N-SC server as mentioned above) to update Access Network default N-SC (with the needed A-Layers information) after the completion of the steps of the Service first Initial Registration, but before the SP N-SC sends Initial Registration Success to the D/G-SC.

In one embodiment, the SP N-SC may initiate a session to update the 3GPP Access Network default M2M N-SC with the needed information based on the M2M entity's Service Device's Service First Initial Attach.

The Access Network default M2M N-SC may then perform the MASU procedure discussed above. After successfully performing the MASU procedure, the Access Network default M2M N-SC may indicate success to the SP N-SC (and not to the D/G-SC as under Option-1 discussed above). Then, the SP N-SC may indicate Initial Registration success to the corresponding D/G-SC.

(B) Consequent Regular Attach: The Regular Attach procedure under this Case 3 may be exactly like what is described under sub-section V(B) above, except that the M2M N-SC Server is the N-SC inside the SP network and the M2M N-SC inside the 3GPP Access Network (if present) is not allowed (i.e., the M2M SP N-SC 194 may not have access to or authorization to use the proxy functionality in the AN as mentioned before).

Here, the APN that is provisioned or updated based on, for example, the MASU procedure during Service First Initial Attach may point to the P-GW that is associated with the SP network. Hence, when the PDN connection is established, the P-GW may receive the M2M Device/Gateway Access Subscription profile that includes the A-Layers M2M D/G Identifier and other parameters that are needed for the A-Layers interworking with the SP network's M2M N-SC server.

Section-VII: Exemplary HO Level Call Flows

Figure 14:
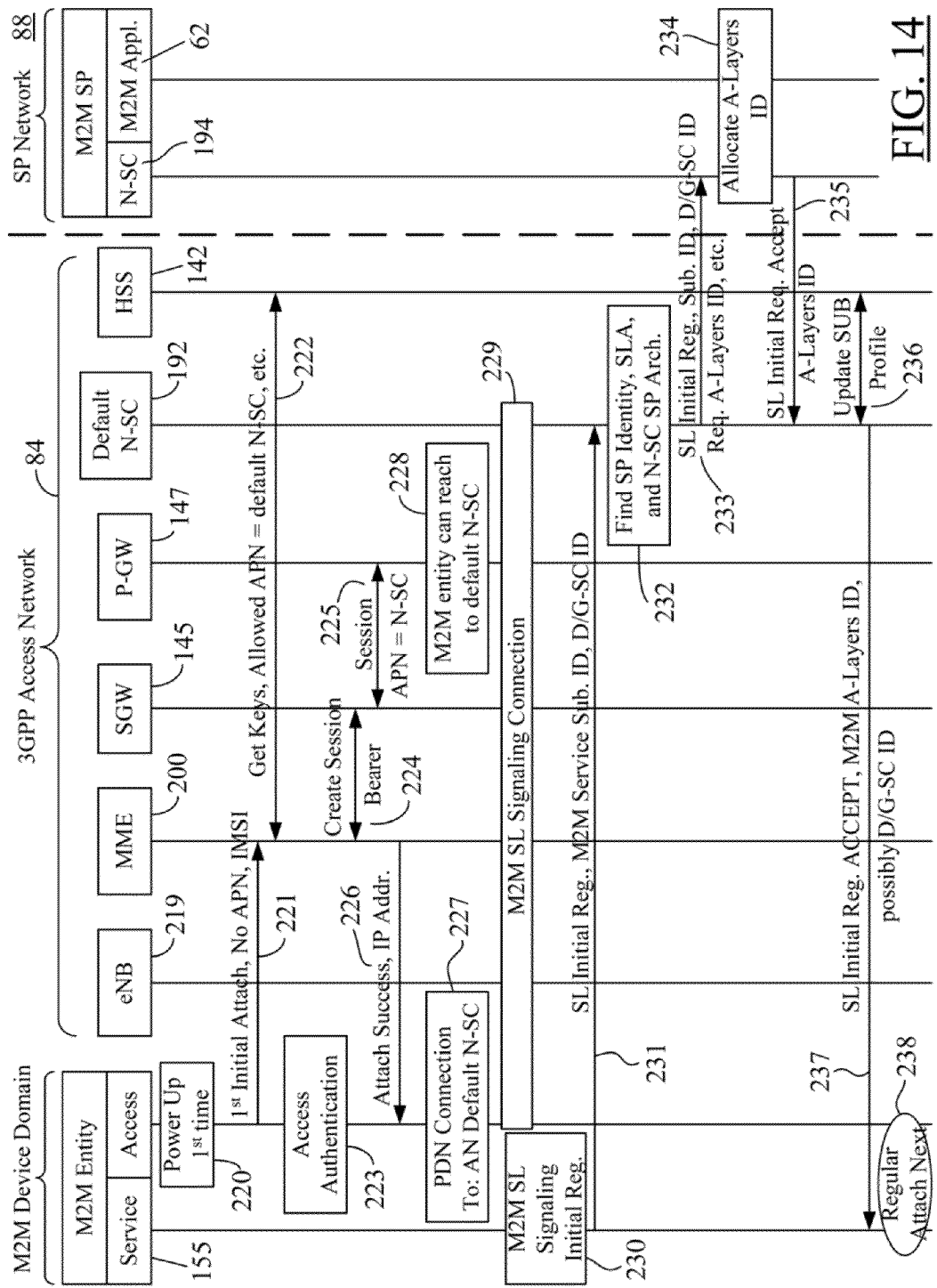
FIG. 14 illustrates exemplary high level call flows according to one embodiment of the present disclosure for an M2M entity's Initial Attach to its per-choice M2M SP via a 3GPP AN.
Figure 15:
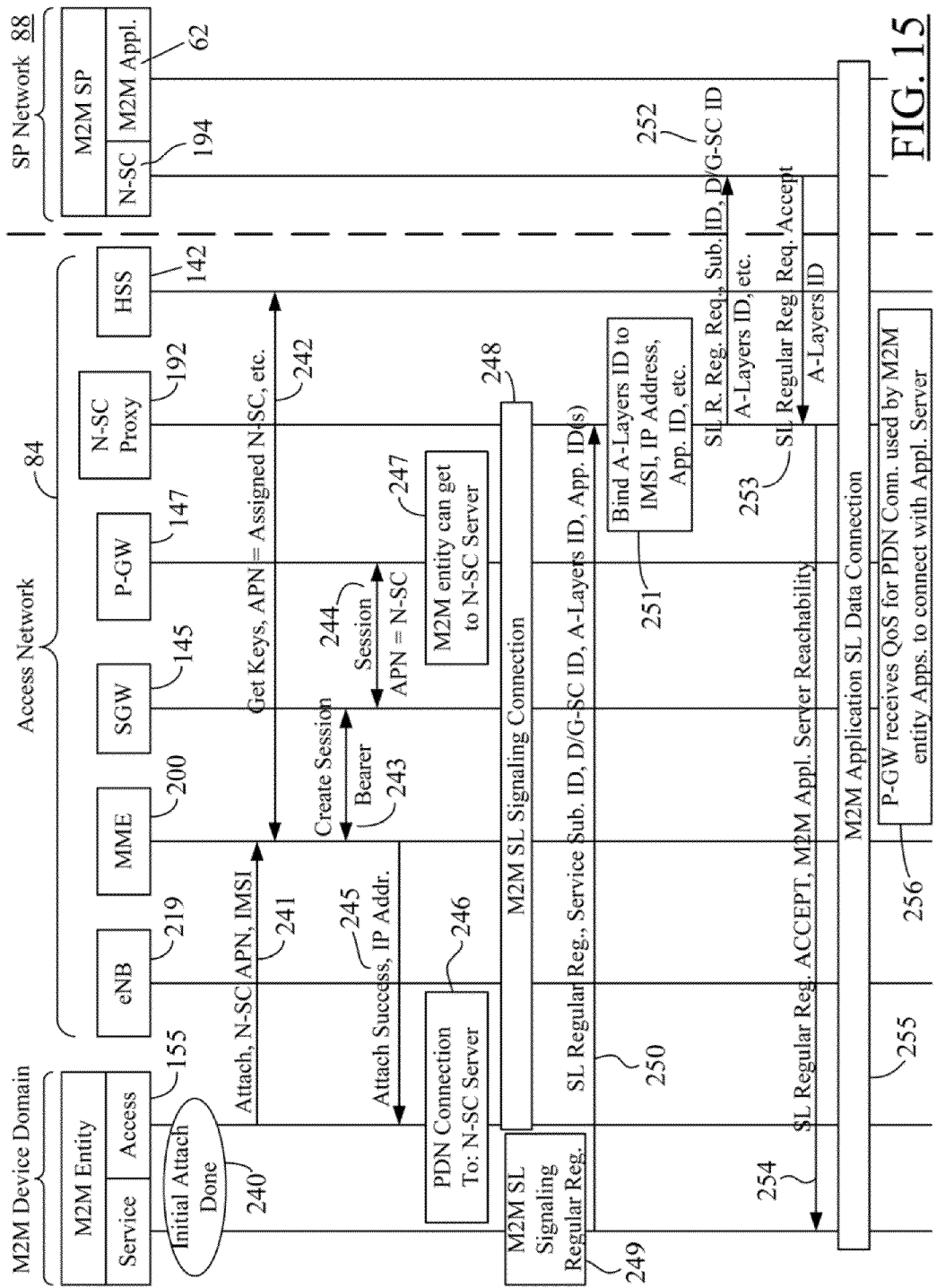
FIG. 15 illustrates exemplary high level call flows according to one embodiment of the present disclosure for an M2M entity's Regular Attach to its per-choice M2M SP via a 3GPP AN.
Figure 16:
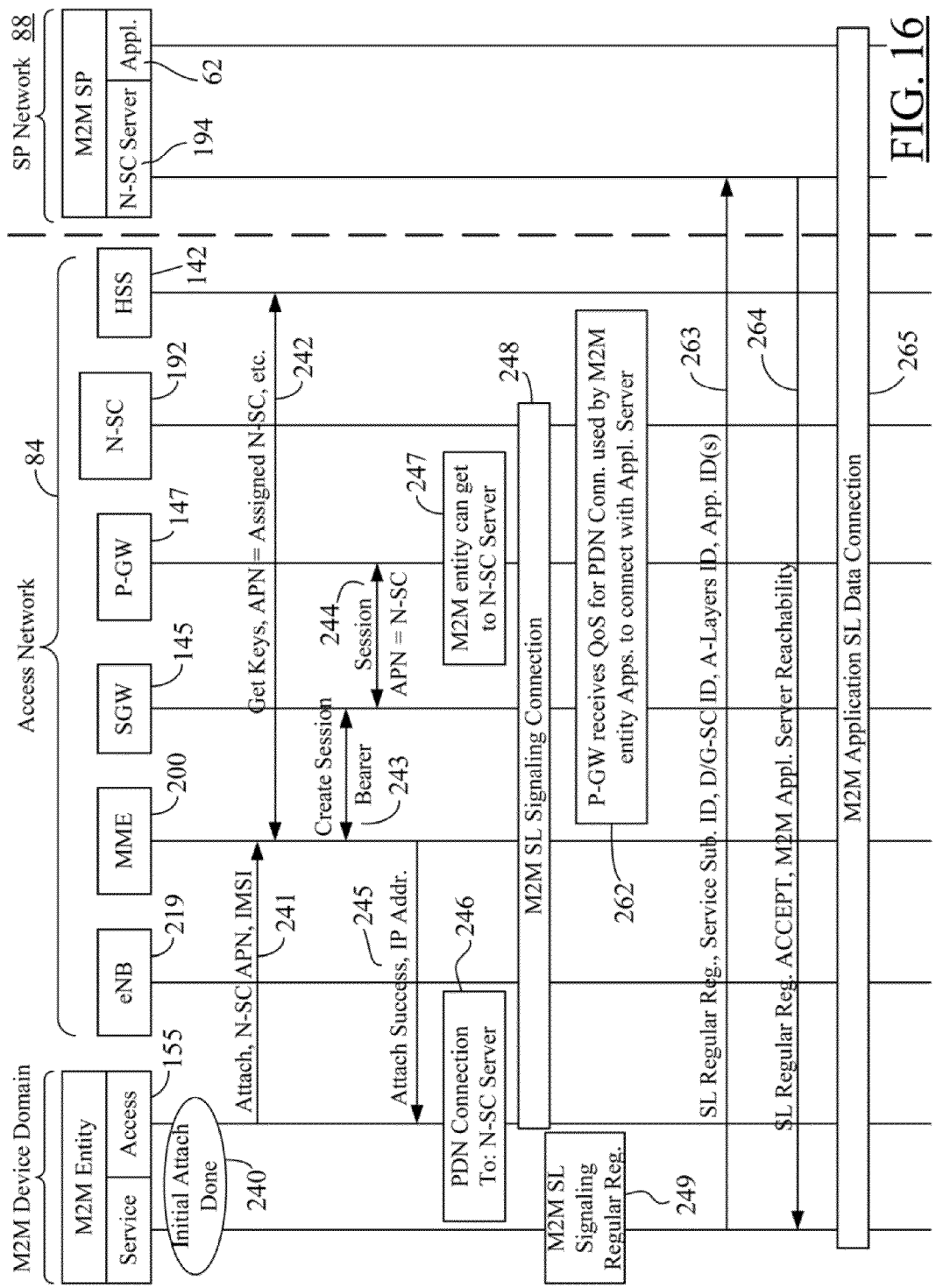
FIG. 16 depicts another exemplary set of high level call flows according to one embodiment of the present disclosure for an M2M entity's Regular Attach to its per-choice M2M SP via a 3GPP AN.

FIGS. 14-16 present examples of high level call flows for an M2M entity's Service First Initial Attach and consequent Regular Attach to entity's per-choice M2M Service Provider using a 3GPP Access Network as per an M2M Services Enablement Solution (MSES) according to particular embodiments of the present disclosure. The examples in FIGS. 14-16 assume that the M2M Access Device (e.g., the access device 162 in the M2M entity 155 of FIG. 9) has a valid subscription with the 3GPP AN using "IMSI1" as the IMSI allocated for this M2M Access Device. It is also assumed that the 3GPP AN operator has an M2M Access Subscription Profile for this M2M Access Device based on the "IMSI1" allocated for it. This initial Access Subscription Profile has the AN default M2M N-SC APN configured (at least to facilitate Initial Attach with the SP network) along with other parameters as per the home AN operator policy. Because of earlier extensive discussion of initial and regular attachment (in Sections V and VI under this Part Two), FIGS. 14-16 will be discussed only briefly below. It is noted here that different sequences of steps illustrated in FIGS. 14-16 are exemplary in nature. In certain other embodiments, these sequences may be altered, modified, or re-ordered as per desired implementation.

FIG. 14 illustrates exemplary high level call flows according to one embodiment of the present disclosure for an M2M entity's (e.g., the M2M entity 155 in FIG. 9) Initial Attach to its per-choice M2M SP (e.g., the M2M SP 82 in FIG. 11) via a 3GPP AN (e.g., the 3GPP AN 84 in FIG. 11). It is noted here that because of N-SC deployment in the SP network in FIGS. 14-16, these figures may be considered as representative of the M2M services enablement architecture in FIG. 11. However, details of 3GPP core network 78 in FIG. 11 are provided in FIG. 12, which shows various components/elements (e.g., MME, PCRF, etc.) of the core network 78. Therefore, for ease of discussion, FIGS. 14-16 are treated as a "combination" of FIGS. 11 and 12 so that the same reference numerals from FIGS. 11-12 can be used to identify the components/elements in FIGS. 14-16 having the same or similar functionality. Except for the eNB 219 and Serving Gateway (SGW) 145 in FIGS. 14-16, all other AN components in FIGS. 14-16 are shown in FIG. 12. As can be observed from the earlier discussion, the eNB 219 may be any of the base stations 70-72 that provides wireless communication interface to the M2M entity 155 operating in the M2M device domain 34. On the other hand, for ease of discussion, the same reference numeral "145" is used to refer to SGW in FIGS. 14-16 and its specific eHRPD-based version HSGW in FIG. 12 because of their essentially similar nature and utility.

Referring now to FIG. 14, after initial power up (block 220), the M2M entity's Access Device (e.g., the access device 162 in FIG. 9) may send its Initial Attach request to 3GPP AN's MME 200 as indicated at step 221. This Initial Attach request may include the IMSI of the Access Device 162 (here, "IMSI1" as mentioned earlier). In the embodiment of FIG. 14, the Access Device 162 is not pre-configured with 3GPP AN default M2M N-SC. Therefore, the Initial Attach request at step 221 does not include any APN (e.g., the request may be sent with a null APN). Upon receipt of the Initial Attach request, the MME 200 may fetch this M2M Access Device's AN Subscription Profile (i.e., the M2M Access Subscription Profile discussed under Section I of this Part Two) and other relevant information (e.g., device authentication keys) from the HSS 142 based on IMSI1 allocated to this device as indicated at step 222. The MME 200 receives the APN of the AN default M2M N-SC 192 as part of this AN Subscription Profile. The Access Device 162 may wait for access authentication (block 223), while the MME 200 uses the AN default M2M N-SC APN to create a session at the proper SGW 145 and the proper P-GW 147 as indicated at steps 224-225. Upon creation of desired sessions at SGW and P-GW, the MME 200 may report AN attachment success to the Access Device and also assign it an IP address at step 226. The M2M entity 155 may then attempt to establish a PDN connection to the AN default M2M N-SC 192 (block 227) through the P-GW 147 (block 228). In the embodiment of FIG. 14, the Access Device may establish an M2M SL signaling connection (block 229) with the AN default M2M N-SC 192 to facilitate M2M SL signaling by the Service Device (e.g., the service device 163 in FIG. 9) for M2M entity's initial registration with its per-choice M2M SP 82 (block 230). The M2M entity's 155 Service Device may then send an SL initial registration request to the default N-SC 192 at step 231. This request may include the M2M entity's M2M Services Subscription Identifier and, possibly, D/G-SC Identifier (depending on whether the M2M entity 155 is an M2M Device or an M2M Gateway). The M2M Services Subscription Identifier helps the AN default M2M N-SC 192 to identify M2M entity's per-choice M2M SP 82 and the relevant SLA between the 3GPP AN operator and the M2M SP, and to also identify the M2M services enablement architecture supported by the M2M SP network based on the SLA (block 232). The AN default M2M N-SC 192 may then request SL initial registration of the M2M entity 155 with its per-choice M2M SP 82 at step 233. At step 233, the AN default N-SC 192 may provide the M2M entity's M2M Services Subscription Identifier and D/G-SC Identifier to the M2M SP N-SC 194 (which may be deployed as an M2M SP N-SC server), and may request A-Layers M2M D/G Identifier and other parameters from the M2M SP N-SC 194. After the SP network 82 allocates the necessary A-Layers M2M DIG Identifier (block 234), the M2M SP N-SC 194 may acknowledge acceptance of the SL initial registration request (at step 233) and provide the needed A-Layers ID to the AN default M2M N-SC 192 at step 235. In response, at step 236, the AN default N-SC 192 may update M2M Access Device's AN Subscription Profile in the HSS 142 with the A-Layer D/G Identifier and, possibly, with the APN of the relevant AN-based regular M2M N-SC to facilitate future Regular Attach of the M2M entity 155 to its per-choice M2M SP 82. As mentioned earlier, in one embodiment, the AN-based default M2M N-SC may also function as the regular M2M N-SC for a given M2M entity and its per-choice M2M SP. At step 237, the success of the Initial Attach is acknowledged by the AN default M2M N-SC 192, which also assigns to the M2M entity 155 the APN of the AN regular M2M N-SC for future Regular Attach. The M2M entity 155 may then perform the SP network Regular Attach (block 238) as discussed below with reference to FIGS. 15-16.

FIG. 15 illustrates exemplary high level call flows according to one embodiment of the present disclosure for an M2M entity's (e.g., the M2M entity 155 in FIG. 9) Regular Attach to its per-choice M2M SP (e.g., the M2M SP 82 in FIG. 11) via a 3GPP AN (e.g., the 3GPP AN 84 in FIG. 11). The call flows in FIG. 15 are related to Case-2(B) described under Section VI above (in this Part Two of the present disclosure) and relate to an M2M services enablement architecture similar to the architecture 190 in FIG. 11—i.e., the AN deploys its M2M N-SC as an N-SC proxy 192, whereas the SP network deploys its N-SC as an N-SC server 194. Because the AN default M2M N-SC 192 in FIG. 11 may be configured to perform as AN-based M2M N-SC proxy, for ease of discussion, the same reference numeral "192" is used for the N-SC proxy shown in FIG. 15 and for the AN default M2M N-SC shown in FIG. 11. As mentioned earlier, when the common M2M SC 42 in the generic architecture of FIG. 3 is deployed in the 3GPP AN, such M2M SC may be deployed as an AN-based default/regular M2M N-SC, which may, in turn, perform the functionality of an N-SC server or an N-SC proxy depending on the architectural configuration. Thus, for ease of context and discussion, the common reference numeral "192" is used in FIGS. 14-16 to identify all such AN-based N-SC deployments.

Referring now to FIG. 15, after Initial Attach is successfully concluded (block 240), the M2M Access Device in the M2M entity 155 may request Regular Attach at step 241 using the N-SC APN that was provisioned during the Service First Initial Attach (i.e., at step 237 in FIG. 14). As mentioned before, the N-SC APN at step 241 may relate to AN regular M2M N-SC (here, the AN M2M N-SC proxy 192) serving the M2M entity's per-choice M2M SP 82. (However, in other embodiments, the N-SC APN at step 241 may reference the SP's M2M N-SC as the N-SC server 194, as mentioned in Case-2 described under Section VI above.) The MME 200 may then communicate with the HSS 142 to fetch the M2M Access Device's AN Subscription Profile (and other relevant information) from the HSS 142 at step 242. Since, the HSS has both the default as well as the regular M2M N-SC APNs configured, the MME concludes that this attach is the Service Regular Attach. The next steps 243-245 in the context of the APN of the N-SC proxy in FIG. 15 are substantially similar to the steps 224-226 in the context of the APN of the default N-SC in FIG. 14 and, hence, are not described in any detail here. The M2M entity 155 may then attempt to establish a PDN connection to its per-choice SP's M2M N-SC server 194 (block 246) through the P-GW 147 and the N-SC proxy 192 (block 247). The M2M entity's Access Device may establish an M2M SL signaling connection (block 248) with the AN M2M N-SC proxy 192 to facilitate M2M SL signaling by the Service Device (e.g., the service device 163 in FIG. 9) for M2M entity's regular registration with its per-choice M2M SP 82 (block 249). The M2M entity's 155 Service Device may then send an SL regular registration request to the AN N-SC proxy 192 at step 250. This request may include the M2M entity's M2M Services Subscription Identifier, D/G-SC Identifier (depending on whether the M2M entity 155 is an M2M Device or an M2M Gateway), A-Layers M2M D/G Identifier, and IDs of any M2M Application(s) (e.g., M2M application(s) 166 in FIG. 9) being hosted by the Service Device (and to be supported by the M2M AS 62 in the M2M SP network 82). Upon receiving the SL regular registration request from the M2M entity 155, the AN-based M2M N-SC proxy 192 may bind A-Layers M2M D/G Identifier to M2M entity's IMSI, IP address, and received Application ID(s) (block 251) and issue a SL regular registration request to the SP-based M2M N-SC server 194 at step 252. The regular registration request at step 252 may contain M2M entity's M2M Services Subscription Identifier, the M2M D/G-SC Identifier, A-Layers M2M D/G Identifier and other relevant parameters (or A-Layers information). Based on the M2M entity's subscription information/status at step 252, the M2M SP's N-SC server 194 may accept the SL regular registration request at step 253. The AN M2M N-SC proxy 192 may then send the SL regular registration Accept/Success message to the M2M entity 155 at step 254, thereby responding to the M2M entity's SL regular registration request at step 250. The SL regular registration Accept message at step 254 may also provide the M2M entity 155 with the reachability information for the SP-based M2M AS 62. Thereafter, at step 255, the M2M entity 155 (through its service device) may establish SL data connection with the M2M SP network 82 for the desired M2M Application(s). In one embodiment, using the existing/currently-known 3GPP procedures (which are not described herein for the sake of brevity), the P-GW 147 may receive QoS information for the PDN connection used by the M2M entity's Application(s) to connect with SP's M2M AS 62, as indicated at block 256.

FIG. 16 depicts another exemplary set of high level call flows according to one embodiment of the present disclosure for an M2M entity's (e.g., the M2M entity 155 in FIG. 9) Regular Attach to its per-choice M2M SP (e.g., the M2M SP 82 in FIG. 11) via a 3GPP AN (e.g., the 3GPP AN 84 in FIG. 11). The call flows in FIG. 16 are related to Case-3(B) described under Section VI above (in this Part Two of the present disclosure) and relate to an M2M services enablement architecture similar to the architecture 190 in FIG. 11—i.e., M2M N-SC 192 may be present in the AN (but no M2M N-SC proxy is allowed in the AN), whereas the SP network deploys its N-SC as an N-SC server 194. Steps 240-249 are similar between FIGS. 15 and 16 and, hence, are not discussed again here. As mentioned in Case-3(B) under Section VI above, the assigned N-SC APN (during Service First Initial Attach) used at step 241 may point to the P-GW 147 that is associated with the SP network 82. Hence, when the PDN connection is established at block 246 as per existing/known 3GPP procedures, the P-GW 147 may receive the M2M Device/Gateway Access Subscription profile that includes the A-Layers M2M D/G Identifier and other parameters that are needed for the A-Layers interworking with the SP network's M2M N-SC server 194. Similarly, using the existing 3GPP procedures, the P-GW 147 may receive QoS information for the PDN connection used by the M2M entity's Application(s) to connect with SP's M2M AS 62, as indicated at block 262. Because N-SC 192 in the 3GPP AN is not allowed (even if present and deployed in the AN as in the embodiment of FIG. 16), the M2M entity's Service Device (e.g., the service device 163 in case of the M2M entity 155 in FIG. 9) may directly send an SL regular registration request to the SP network's M2M N-SC server 194 at step 263. The parameters contained in this request may be identical to those shown at step 250 in FIG. 15 and, hence, are not described here any further. The M2M SP N-SC server 194 may then directly respond to the M2M entity, as indicated at step 264. Because of substantial similarity between the contents of response at step 264 in FIG. 16 and that at step 254 in FIG. 15, further discussion of step 264 in FIG. 16 is not provided herein for the sake of brevity. Thus, instead of receiving response from the AN N-SC proxy (as indicated at step 254 in FIG. 15), the M2M entity 155 receives response to its SL regular registration request directly from the M2M SP N-SC server 194 in the embodiment of FIG. 16. Thereafter, at step 265, the M2M entity 155 (through its service device) may establish SL data connection with the M2M SP network 82 for the desired M2M Application(s).

Section-VIII: How 3GPP an Differentiates Between Service Initial Attach Vs. Regular Attach It may be quite important for the 3GPP AN to be able to recognize the M2M entity's Service First Initial Attach from the subsequent Regular Attach. Such distinction between the Service First Initial Attach and Regular Attach is important because of different procedures involved in each aspect (as discussed in detail before)—the special procedures of an Initial Attach are normally done only once during the lifetime of an M2M entity as mentioned before, whereas the Regular Attach may be frequently invoked. This section briefly discusses how this differentiation (between an Initial Attach and a Regular Attach) may be achieved by the 3GPP Access Network (e.g., the AN 84 in FIGS. 11-12).

Service First Initial Attach: Case-1 (M2M entity is provisioned with NULL APN). The 3GPP AN may perform the following steps to conclude that the current Attach request (from an M2M entity such as, e.g., the M2M entity 155 in FIG. 9) is for the Service First Initial Attach.

(1) Since the M2M entity has not performed the Services First Initial Attach yet, the M2M entity's Access Subscription profile in the HSS (e.g., the HSS 142 in FIGS. 12, 14, etc.) may have only the AN default M2M N-SC APN.

(2) The M2M entity uses NULL APN (or no APN) in the Initial Attach (because, in this case, the M2M entity is not provisioned with APN of the AN default M2M N-SC).

(3) The MME (e.g., the MME 200 in FIGS. 12, 14, etc.) may fetch the M2M entity's Access Subscription profile from HSS, among other information. Since the HSS has only the AN default M2M N-SC APN configured (see step (1) above), the MME may conclude—based on the information received from the HSS—that this attach is to be considered the Service First Initial Attach.

(4) The MME may use the AN default M2M N-SC APN to create a session at the proper SGW (e.g., the HSGW 145 in FIG. 12 or the SGW 145 in FIG. 14) and proper P-GW (e.g., the P-GW 147 in FIGS. 12, 14, etc.).

(5) After the Service Initial Attach is successfully completed, the HSS and the M2M entity may be updated (e.g., by the AN default M2M N-SC) with the Regular M2M N-SC APN to be added to the M2M entity's Access Subscription profile.

Service First Initial Attach: Case-2 (M2M entity is provisioned with AN default M2M N-SC APN). Contrary to case-1 above, in this case-2, the M2M entity is provisioned with the APN of the AN default M2M N-SC (e.g., the N-SC 192 in FIGS. 11 and 14). The 3GPP AN may then perform the following steps to conclude that the current Attach request from an M2M entity is for the Service First Initial Attach.

(1) Since the M2M entity has not performed the Services First Initial Attach yet, the M2M entity's Access Subscription profile in the HSS may have only the AN default M2M N-SC APN.

(2) The M2M entity uses the AN default M2M N-SC APN in the Initial Attach.

(3) The MME may fetch the M2M entity's Access Subscription profile from HSS, among other information. Since the HSS has only the AN default M2M N-SC APN configured (see step (1) above), the MME may conclude—based on the information received from the HSS—that this attach is to be considered the Service First Initial Attach.

(4) The MME may use the AN default M2M N-SC APN to create a session at the proper SGW and proper P-GW.

(5) After the Service Initial Attach is successfully completed, the HSS and the M2M entity may be updated (e.g., by the AN default M2M N-SC) with the Regular M2M N-SC APN to be added to the M2M entity's Access Subscription profile.

Service Regular Attach: Case-1 (M2M entity is updated with AN Regular M2M N-SC APN). This case-1 relates to the situation when the M2M entity and the HSS both are updated with AN regular M2M N-SC APN during Service First Initial Attach. The 3GPP AN may then perform the following steps to conclude that the current Attach request from an M2M entity is for the Regular Attach to its per-choice M2M SP.

(1) Since the M2M entity has performed the Services First Initial Attach already, the M2M entity's Access Subscription profile in the HSS may have both the APNs—the AN default M2M N-SC APN and the AN regular/assigned M2M N-SC APN (e.g., APN of AN-based N-SC that is deployed as a regular M2M N-SC to serve the M2M entity's per-choice M2M SP).

(2) The M2M entity may use the assigned/regular APN in the re-attach (or Regular Attach) or attaching after reboot.

(3) The MME may fetch the M2M entity's Access Subscription profile from HSS, among other information. Since the HSS has both the AN default and regular M2M N-SC APNs configured (see step (1) above), the MME may conclude—based on the information received from the HSS—that this attach is to be considered the Service Regular Attach.

(4) The MME may then use the AN regular M2M N-SC APN to create a session with the proper SGW and proper P-GW.

Service Regular Attach: Case-2 (M2M entity is not updated with AN Regular M2M N-SC APN). Contrary to case-1 above, this case-2 relates to the situation when the M2M entity is not (but the HSS is) updated with AN regular M2M N-SC APN during Service First Initial Attach. The 3GPP AN may then perform the following steps to conclude that the current Attach request from the M2M entity is for the Regular Attach to its per-choice M2M Service Provider.

(1) Since the M2M entity has performed the Services First Initial Attach already, the M2M entity's Access Subscription profile in the HSS may have both the AN default and the AN regular M2M N-SC APNs.

(2) Since the M2M entity has not been updated with the AN regular M2M N-SC APN after the Services First Initial Attach, the M2M entity may use the NULL APN (or no APN) in the Regular Attach.

(3) The MME may fetch the M2M entity's Access Subscription profile from HSS, among other information. Since the HSS has both the AN default and regular M2M N-SC APNs configured (see step (1) above), the MME may conclude—based on the information received from the HSS—that this attach is to be considered the Service Regular attach.

It is noted here that, in particular embodiments, the MME may fetch the M2M entity's Access Subscription profile from HSS (as discussed above for each case under this Section VIII) only if MME's record shows that the M2M entity profile has the AN default M2M N-SC configured.

Section-IX: Exemplary Embodiments of M2M Services Enablement for an M2M Entity that Uses a 3GPP Access or a Non-3GPP Access The following summarizes certain salient aspects of the teachings of the present disclosure, which provides a solution for using M2M services enablement for M2M entities that use a 3GPP access and a 3GPP EPC. The teachings of the present disclosure are also applicable to non-3GPP accesses (e.g., eHRPD) that use 3GPP EPC. Particular embodiments of the present disclosure also define a dynamic mechanism for aligning both the Access Network Transport and the M2M Services layers with respect to handling M2M Services offering to an M2M Device/Gateway using 3GPP Access Network and 3GPP EPC. The present disclosure allows the deployment of M2M SL architecture (to be used by the 3GPP AN operator) that is inline with ETSI M2M SL architecture, with enough freedom (for the 3GPP AN operator) for the choice of M2M Services Provider while ensuring that the 3GPP AN operator has full control of its own network and able to dynamically share the Across-Layers M2M Device/Gateway information with the M2M SP.

Embodiment-1

This embodiment relates to a solution according to the teachings of the present disclosure that is applicable to an M2M Device/Gateway that supports a 3GPP access (e.g., E-UTRAN) and uses a 3GPP EPC and/or an M2M Device/Gateway that supports a non-3GPP access (e.g., cdma2000 eHRPD) but uses a 3GPP EPC.

Embodiment-2

This embodiment relates to a solution according to the teachings of the present disclosure that enables M2M Services Initial Attach for M2M Devices/Gateways—which use a 3GPP Access (e.g., E-UTRAN) or a non-3GPP Access (e.g., cdma200 eHRPD) to be connected and serviced by a 3GPP EPC—in which an M2M Device/Gateway may be dynamically configured by its per-choice M2M Services Provider with Across-Layers M2M Device/Gateway Identifier while the 3GPP access network operator is fully aware of such dynamic configuration and has access to the relevant A-Layers information.

Embodiment-3

This embodiment relates to a solution according to the teachings of the present disclosure that provides M2M services enablement—after Initial Attach—for M2M Devices/Gateways (whether they use a 3GPP Access or a non-3GPP Access to be connected and serviced by a 3GPP EPC) in which a transport connection with the M2M D/G's per-choice M2M Services Provider's M2M Application Server is provided (via the 3GPP EPC).

Embodiment-4

This embodiment relates to a solution according to the teachings of the present disclosure that enables the 3GPP EPC anchor point (e.g., a P-GW and/or an SGW) to be aware of the type of traffic and M2M applications that use the transport connection provided to an M2M entity (which may use a 3GPP Access or a non-3GPP Access to be connected and serviced by a 3GPP EPC) to connect the M2M entity with its per-choice M2M SP's M2M Application Server.

Embodiment-5

This embodiment relates to a solution according to the teachings of the present disclosure that dynamically updates the 3GPP Access Network's home Subscription Data Base (e.g., an HSS) with the M2M Access Subscriber's (i.e., an M2M entity subscribed with the 3GPP AN for M2M Services) updated Subscription Profile. Such updated Subscription Profile may include the dynamically allocated Across-Layers M2M D/G Identifier and the Updated N-SC APN(s) (e.g., SL signaling and SL Data APNs) that are used to identify the connection(s) of the M2M Device/Gateway to its per-choice M2M SP's M2M N-SC and Application Server.

Embodiment-6

This embodiment relates to a solution according to the teachings of the present disclosure that dynamically updates the 3GPP Access Network Policy Server (e.g., a PCRF) with the M2M Access Subscriber's updated policy profile that includes the dynamically allocated Across-Layers M2M D/G Identifier, and the allowed M2M Application(s) and their associated QoS rules.

Embodiment-7

This embodiment relates to a solution according to the teachings of the present disclosure that enables an M2M Services Provider to offer its Initial M2M services enablement (during Service First Initial Attach) to an M2M entity (which may use a 3GPP Access or a non-3GPP Access to be connected and serviced by a 3GPP EPC) and to dynamically configure this M2M entity with the M2M SP-selected Across-Layers M2M Device/Gateway Identifier.

Embodiment-8

This embodiment relates to a solution according to the teachings of the present disclosure that enables an M2M Services Provider to offer its Initial M2M services enablement (during Service First Initial Attach) to an M2M entity (which may use a 3GPP Access or a non-3GPP Access to be connected and serviced by a 3GPP EPC) and to dynamically update the 3GPP Access Network Operator with the M2M SP's per-choice Across-Layers M2M Device/Gateway Identifier configured for this M2M entity.

Embodiment-9

In this embodiment, the M2M Service Provider may coordinate with the 3GPP Access Network and have the AN regular M2M N-SC APN and the A-Layers M2M Device/Gateway Identifier pre-provisioned on the M2M entity, in the M2M Services Provider, and in the 3GPP Access Network. In this case, the M2M entity may not require the Service First Initial Attach because the purpose of that procedure is being accomplished via pre-provisioning. In this embodiment, the M2M services enablement architecture that the M2M SP uses is reflected in the SLA between the 3GPP Access Operator and the M2M SP, and also may be consequently reflected in the AN regular M2M N-SC APN that is pre-provisioned in the M2M entity's Access Device as part of the M2M entity's 3GPP Access Subscription.

Although features and elements are described above in particular combinations, each feature or element can be used alone without the other features and elements or in various combinations with or without other features and elements. It is noted here that the deployment of M2M SC Proxy and enablement of M2M services in a cellular AN (including a 3GPP access network), and related call flows/messaging may be implemented in hardware and/or software (which can be a computer program, executable code, firmware, etc., incorporated in a computer-readable data storage medium such as a RAM, ROM, semiconductor memory, or other data storage media/memory mentioned before).

The foregoing describes an M2M services enablement architecture for a cellular AN that allows the cellular AN operator to not only deploy its M2M SC as an M2M SC server within its network domain, but to also use its M2M SC to work as an M2M SC proxy when communicating with an M2M SP network that also deploys an M2M SC server. The M2M SC proxy in the cellular AN relays all signaling plane communications between an M2M device's/gateway's SC and the SP's M2M SC server. Furthermore, the M2M SC proxy provides the cellular AN with an access to all of the Across-Layers (Transport and Service Layers) information needed for the M2M services enablement in the cellular AN. This proxy-based solution allows the cellular AN to serve all types of M2M SPs, and relieves the M2M SP from the need to support different cellular AN interworking interfaces.

As discussed herein, the M2M services enablement architecture according to certain embodiments of the present disclosure provides the flexibility and means for a cellular AN operator to offer its access network services—including transport layers—to be used for serving M2M Services according to the ETSI M2M SL architecture and in a way that allows the cellular AN operator to achieve the following: (a) Use a single deployment model by deploying M2M SC within its network while being able to serve all types of M2M Service operators. (b) Have an easy access to all information that is required for across-layers functionalities. This information can be used to help the cellular AN operator to offer its AN in a more intelligent bit-pipe. (c) Serve other M2M Service Providers who use non-ETSI M2M SL architecture. (d) Have the flexibility to route M2M traffic in the visited network based on (home) cellular AN operator policy and M2M subscription. The common M2M services enablement architecture according to particular embodiments of the present disclosure also allows the M2M SP to deploy its services on multiple access technologies simultaneously with the same deployment model.

The foregoing also describes an M2M Services Enablement Solution for offering M2M services enablement to an M2M entity that supports a 3GPP or a non-3GPP access for connection and service by a 3GPP EPC. This solution allows an AN to offer a transport connection for the M2M entity over its 3GPP EPC to M2M entity's per-choice M2M SP. The M2M entity's first attach to the AN is forced to be directed to the APN of the AN default M2M N-SC regardless of any other APN received from the M2M entity. The AN default M2M N-SC facilitates M2M SL initial registration of the M2M entity with its per-choice M2M SP. M2M entity's future Regular Attach to the SP network may be directed to the APN of an AN-based regular M2M N-SC that serves the M2M SP.

Thus, in the exemplary case of a 3GPP Access Network, certain embodiments of the present disclosure:

(a) Allow a 3GPP AN operator to be fully aware of the A-Layers identity of the M2M entity, the type of the traffic that is being used over the AN's transport connection, and the M2M applications that use the provided transport connection;

(b) Allow the M2M SP to offer its Initial Services Enablement to an M2M entity that uses any cellular access, and to dynamically configure the M2M SP's per-choice A-Layers M2M D/G Identifier and at the same time to be able to reach the M2M entity as long as it is registered;

(c) Provide a dynamic solution for updating the M2M entity's Access Subscription with the dynamically allocated A-Layers M2M D/G Identifier and the updated M2M N-SC APNs (i.e., SL signaling and SL Data APNs); and (d) Provide a dynamic solution for updating the M2M Access Subscriber policy profile with the PCRF using the dynamically-allocated A-Layers M2M D/G Identifier, and the M2M Applications and their associated QoS.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A cellular Access Network (AN) operatively coupled to a Machine-to-Machine (M2M) Service Provider (SP), wherein the cellular AN comprises:
    an M2M Services Capabilities (SC) enablement application deployed inside the cellular AN and configured to function as an M2M SC Proxy when the M2M SP deploys a first M2M SC Server and no M2M SC Server is deployed in the cellular AN, wherein the M2M SC Proxy is configured to act on behalf of the first M2M SC Server and to relay signaling plane communication between an entity-specific SC in an M2M communication entity and the first M2M SC Server in the M2M SP, wherein the M2M communication entity is in wireless communication with the cellular AN and accesses the M2M SP via the cellular AN; and
    an InterWorking Function (IWKF) configured to provide an interworking interface between the cellular AN and the M2M SP;
    wherein the M2M SC enablement application deployed inside the cellular AN is further configured to function as a second M2M SC Server instead of the M2M SC Proxy under one of the following conditions:
        when the M2M SP does not deploy the first M2M SC Server; and
        when the M2M SP is an integral part of the cellular AN.

2. The cellular AN of claim 1, wherein the M2M communication entity is one of the following:
    an M2M Device; and
    an M2M Gateway.

3. The cellular AN of claim 1, wherein the IWKF is co-located within the M2M SC Proxy.

4. The cellular AN of claim 1, wherein the M2M SC Proxy is further configured to enable the cellular AN to have direct access to entity-specific Across-Layers (A-Layers) information in the M2M SP for the M2M communication entity.

5. The cellular AN of claim 1, wherein, as part of supporting an M2M Service requested by the M2M communication entity, the M2M SC Proxy is further configured to facilitate routing of packet traffic associated with the M2M Service to the M2M SP.

6. The cellular AN of claim 5, wherein one of the following applies:
    the cellular AN is a visited cellular AN and the M2M SP is a visited SP; and
    the cellular AN is the visited cellular AN and the M2M SP is a home SP.

7. The cellular AN of claim 1, wherein the IWKF is co-located within the second M2M SC Server.

8. The cellular AN of claim 1, wherein the cellular AN is configured to dynamically establish a Service Level Agreement (SLA) with the M2M SP at the time of facilitating M2M communication for the M2M communication entity.

9. The cellular AN of claim 1, wherein the first M2M SC Server supports a non-European Telecommunications Standards Institute (non-ETSI) compliant M2M Service Layer (SL) in the M2M SP.

10. A cellular Access Network (AN) operatively coupled to a Machine-to-Machine (M2M) Service Provider (SP), wherein the cellular AN comprises:
    an M2M Services Capabilities (SC) enablement application deployed inside the cellular AN and configured to function as an M2M SC Proxy when the M2M SP deploys a first M2M SC Server and no M2M SC Server is deployed in the cellular AN, wherein the M2M SC Proxy is configured to act on behalf of the first M2M SC Server and to relay signaling plane communication between an entity-specific SC in an M2M communication entity and the first M2M SC Server in the M2M SP, wherein the M2M communication entity is in wireless communication with the cellular AN and accesses the M2M SP via the cellular AN; and
    an InterWorkinq Function (IWKF) configured to provide an interworkinq interface between the cellular AN and the M2M SP;
    wherein the M2M SC enablement application is further configured to function as:
        the M2M SC Proxy to the first M2M SC Server; and
        a second M2M SC Server when the cellular AN is operatively coupled to another M2M SP that does not deploy an M2M SC Server.

11. In a Machine-to-Machine (M2M) communication configuration based on separation between a Transport Layer supported by a cellular Access Network (AN) and a Service Layer supported by an M2M Service Provider (SP) and usage of a common M2M Services Capabilities (SC) enablement application for all M2M applications, an improvement comprising:
    a processing and control unit (PCU) that executes the M2M SC enablement application to provide an M2M SC Server inside the cellular AN;
    wherein the M2M SC enablement application is executed to provide the M2M SC Server inside the cellular AN when the M2M SP does not deploy any M2M SC Server outside the cellular AN, and when the M2M SP is an integral part of the cellular AN; and
    an IWKF co-located within the M2M SC Server, wherein the IWKF is configured to provide an interworking interface between the cellular AN and the M2M SP.

* * * * *